US006493686B1

(12) United States Patent
Francone et al.

(10) Patent No.: US 6,493,686 B1
(45) Date of Patent: Dec. 10, 2002

(54) COMPUTER IMPLEMENTED MACHINE LEARNING METHOD AND SYSTEM INCLUDING SPECIFICALLY DEFINED INTRONS

(76) Inventors: Frank D. Francone, 4806 Fountain Ave., Suite 77, Los Angeles, CA (US) 90029; Peter Nordin, Dacapo Ab Torggatan 8, S-411 05 Goteborg (SE); Wolfgang Banzhaf, Ackerstr. 16 44575, Castrop-Rouxel (DE)

( * ) Notice: Subject to any disclaimer, the term of this patent is extended or adjusted under 35 U.S.C. 154(b) by 925 days.

(21) Appl. No.: 09/078,923

(22) Filed: May 14, 1998

Related U.S. Application Data

(63) Continuation of application No. 08/679,555, filed on Jul. 12, 1996, now Pat. No. 5,946,673.

(51) Int. Cl.[7] .............................................. G06F 9/445
(52) U.S. Cl. .............................. 706/12; 700/48; 700/29
(58) Field of Search ....................... 706/12, 13; 700/48, 700/29

(56) References Cited

U.S. PATENT DOCUMENTS

| | | | | |
|---|---|---|---|---|
| 5,390,282 A | * | 2/1995 | Koza et al. | ..................... 706/13 |
| 5,742,738 A | * | 4/1998 | Koza et al. | ..................... 706/13 |

OTHER PUBLICATIONS

LEGO Advertisement, Technotown: The Technology Teacher 43, Oct. 1994.*
LEGO Mindstorms Robotics Invention System: User's Manual 24–25, 1998.*
LEGO Mindstorms Robotics Discovery Set, Product Box, 1999.*
LEGO Robolab: Robotics in the Classroom 2–7, 1998.*
LEGO Mindstorms Droid Developer Kit, Product Box, 1999.*
LEGO Mindstorms Robotics Discovery, Product Box, 1999.*

(List continued on next page.)

*Primary Examiner*—Thomas Black
*Assistant Examiner*—Michael B. Holmes
(74) *Attorney, Agent, or Firm*—Arter & Hadden LLP

(57) ABSTRACT

In a computer implemented learning and/or process control system, a computer model is constituted by the most currently fit entity in a population of computer program entities. The computer model defines fitness as a function of inputs and outputs. A computing unit accesses the model with a set of inputs, and determines a set of outputs for which the fitness is highest. This associates a sensory-motor (input-output) state with a fitness in a manner that might be termed "feeling".

The learning and/or control system preferably utilizes a Compiling Genetic Programming System (CGPS) in which one or more machine code entities such as functions are created which represent solutions to a problem and are directly executable by a computer. The programs are created and altered by a program in a higher level language such as "C" which is not directly executable, but requires translation into executable machine code through compilation, interpretation, translation, etc. The entities are initially created as an integer array that can be altered by the program as data, and are executed by the program by recasting a pointer to the array as a function type. The entities are evaluated by executing them with training data as inputs, and calculating fitnesses based on a predetermined criterion. The entities are then altered based on their fitnesses using a genetic machine learning algorithm by recasting the pointer to the array as a data (e.g. integer) type. This process is iteratively repeated until an end criterion is reached.

22 Claims, 49 Drawing Sheets

OTHER PUBLICATIONS

D. Psaltis, et al., "A Multilayered Neural Network Controller," IEEE Control Systems Magazine, vol. 8(2), pp. 17–21, Apr. 1988.*

R.K. Elsley, "A Learning Architecture for Control Based on Back–propagation Neural Networks," IEEE Int'l. Conf. on Neural Networks, vol. 2, pp. 587–594, Jul. 1988.*

M. Khalid and S. Omatu, "Control of Real–time Processes Using Backpropagation Neural Networks," Proc. Int'l. Conf. on Industrial Electronics, Control and Instrumentation, vol. 2, pp. 1443–1448, Nov. 1991.*

T.S. Ray, "Is it Alive or is it GA?," School of Life & Health Sciences, University of Deleware, XP 002047764, pp. 527–534, Jul. 1991.*

M. Wineberg and F. Oppacher, "A Representation Scheme to Perform Program Induction in a Canonical Genetic Algorithm," Proc. Int'l. Conf. on Evolutionary Computation, The Third Conf. on Parallel Problem Solving from Nature, pp. 292–301, Oct. 1994.*

P. Nordin, "A Compiling Genetic Programming System that Directly Manipulates the Machine Code," from Advances in Genetic Programming, K.E. Kinnear, Jr., ed., MIT Press, Chapt. 14, pp. 311–331, Dec. 1994.*

P. Nordin, and W. Banzhaf, "Evolving Turing–Complete Programs for a Register Machine with Self–modifying Code," Proc. Int'l. Conf. on Genetic Algorithms, Jul. 1995.*

P. Nordin and W. Banzhaf, "Complexity Compression and Evolution," Proc. Int'l. Conf. on Genetic Algorithms, Jul. 1995.*

P. Nordin and W. Banzhaf, "Genetic Programming Controlling a Miniature Robot, " AAAI Fall Symposium Series, Symposium on Genetic Programming, pp. 61–67, Nov. 1995.*

J.B. Golden III, et al., "Genome Organization and Evolutionary Search in the Design of Neural Networks," Proc. Fifth Annual Conf. on Evolutionary Programming, MIT Press, pp. 397–404, Mar. 1996.*

* cited by examiner

Parents

Children

PARENTS

CHILDREN

PARENTS

CHILDREN

General Operation of the System

Details of System Definition

Initialization

"Solution" means entity or individual

Learn for One Iteration

General Operation of the Invention As Repetitive Computation System

System Definition

Initialization

"Solution" means entity or individual

Evaluate or Modify Function

Setup

Initialization

Create Instruction

Main CGPS Loop

Calculate Indiv[n] Fitness

Perform Genetic Operations

Fig. 19 though the LISP List is itself the subject of learning
COMPUTER IMPLEMENTED MACHINE LEARNING METHOD AND SYSTEM INCLUDING SPECIFICALLY DEFINED INTRONS This application is a continuation of U.S. patent application Ser. No. 08/679,555, entitled COMPUTER IMPLEMENTED MACHINE LEARNING AND CONTROL SYSTEM filed Jul. 12, 1996 by Frank D. Francone, et al. now U.S. Pat. No. 5,446,673.

BACKGROUND OF THE INVENTION

1. Field of the Invention

The present invention generally relates to the art of computerized computation as applied to the control of a process such as real-time control of a robot or other autonomous agent. The present invention relates also to the art of computerized learning systems (which are usually characterized by the need to perform repeated computations on run-time data) and more specifically to a register machine learning method in which the information and/or the computer program(s) that constitute solutions to a problem are created, initialized, stored, altered and executed in native machine code by using a higher level programming language to produce an optimized solution through the direct application of learning algorithms to the information stored in the native machine code.

In a preferred form of the invention, a computerized computation system performs repeated computations on data that is not known until a computer user is running the system ("run-time", and "run-time data") and more specifically creates, initializes, stores, alters and executes both the run-time data and the computer code necessary to execute the repeated computations (the "related code") in native machine code operating on a register machine.

2. Description of the Related Art

The use of an evolutionary method to evolve controller architectures has been reported previously in a number of variants. Robotic controllers have, for instance, been evolved using dynamic recurrent neural nets. Several experiments have also been performed where a controller program has been evolved directly through genetic programming.

Previous experiments with genetic programming and robotic control, however, have been performed with a simulated robot and a simulated environment. In such a set-up, the environment and the robot can be reset easily to an initial state in order to ensure that each individual in the population is judged starting from the same state. Apart from being practically infeasible for a real robot, this method could result in over-specialization and failure to evolve a behavior that can generalize to unseen environments and tasks. To overcome the latter problem noise is sometimes artificially added to the simulated environment.

Machine learning systems in general have been proposed in the art for the solution of problems such as classification, prediction of time-series data, symbolic regression, optimal control, etc. Examples of various machine learning systems are neural networks, fuzzy networks, genetic algorithms (including genetic programming and classifier systems), Evolutionary Strategies, Evolutionary Programming, ADATE program induction, cellular automata, Box Jenkins optimization, ARMA optimization and many others. Rather than applying a direct computational approach, these systems create one or more proposed solutions in the form of data and computer program entities, and iteratively alter the data and/or entities for the purpose of finding an optimal solution to a problem. One such approach is described in, for example, U.S. Pat. No. 4,935,877, entitled "NON-LINEAR GENETIC ALGORITHMS FOR SOLVING PROBLEMS", issued Jun. 19, 1990 to John Koza.

The set of practically solvable problems is highly related to the efficiency of the algorithm and implementation. It is therefore important to minimize the overhead involved in executing any machine learning system.

Machine learning systems create learned solutions to problems. These solutions have two elements: (1) Elements that hold the information that is learned during the execution of the machine learning system (the "Learned Elements"); and (2) Elements that are necessary to convert the Learned Elements into meaningful action or output by the computer (the "Conversion Elements"). Existing machine learning approaches other than the present invention can be classified into two categories in terms of how they store and execute both the Learned Elements and the Conversion Elements. Those two categories are compiler based systems and interpreted systems.

An interpreted system is written in a high level language such as LISP and both the Learned and Conversion Elements are held in data-like structures such as LISP lists, which are converted ("interpreted") into native machine code at run-time by an interpreter. The interpreter, itself, also contains Conversion Elements for such interpreted, systems. So for example, U.S. Pat. No. 4,935,877 uses, as its Learning Elements various high level LISP expressions, customized for the problem at hand, to represent, symbolically, a "computer program." That is, a high level "program" structure symbolized by the LISP List, is itself the subject of learning in that system. In this system, the Learned Elements are represented as a hierarchical tree structure. This solution gives good flexibility and the ability to customize the language depending on the constraints of the problem at hand.

The principal disadvantage of this interpreting approach to machine learning is that the Learned Elements and many of the Conversion Elements are stored in high level, symbolic data-like structures. Computers can operate only by executing native machine code. Thus, interpreting machine learning systems learn by modifying high level symbolic representations (the Learned Elements) that are, ultimately, converted into machine code by the interpreter at run-time. The need to convert (interpret) the Learned Elements and some of the Conversion Elements into native machine code at run-time before any useful action or output may be had from a computer is very time consuming and involves a large amount of overhead in machine resources such as CPU time, RAM memory, and disk space. In effect, all of the Learned Elements and the Conversion Elements in the LISP List are treated as run-time data that must be accessed and converted to machine code before any useful action or output may be had. Simply put, interpreted systems are slow and use a lot of a computer system's resources.

Other machine learning systems are written in high level compiled computer languages such a C, C++, Pascal and so forth. This is the "compiler based" approach to machine learning. Large amounts of the Conversion Elements in such systems are compiled before run-time into native machine code in such a compiler based approach. Because those compiled Conversion Elements are already in native machine code at run-time, there is no need to interpret these Conversion Elements at run-time. Using a compiler based approach instead of an interpreted approach usually results in a substantial speed-up of the execution of the machine learning system, often increasing the speed of learning by a factor of ten times. Examples of such compiler based systems are GPC by Walter Tackett (genetic programming), Lil-GP (genetic programming), and EvoC (evolutionary strategies).

The compiler based approach to machine learning, while faster than the interpreted approach, must still access runtime data that is stored in data structures held in RAM memory or in some other form of memory such as hard disk. The reason that run-time data structures must be accessed in compiler based machine learning systems (or any machine learning system other than the present invention) is that the process of learning involves initializing and then altering the Learned Elements at run-time.

For example, the weights in a neural network are Learned Elements for neural network applications. Compiler based neural network systems hold those weights in data structures such as arrays or linked lists. Similarly, compiler based genetic programming systems store symbolic representations of program structures (the Learned Elements in genetic programming) in RAM data structures such as arrays, linked lists or parse trees. In all compiler based machine learning systems, the already compiled Conversion Elements must repeatedly access the Learned Elements (weights or symbolic representations of program structures) from the data structures in RAM memory in order to execute and evaluate the Learned Elements and to modify the Learned Elements according to the learning algorithm that is being used to modify the Learned Elements during learning. Such repeated access is necessary before any meaningful output or action may be had from a computer based on the Learned Elements. Such repeated accesses to RAM data structures is time consuming and uses extensive amounts of RAM to hold the Learned Elements.

More generally, computing systems that perform repeated calculations on run-time data may also be categorized as compiler based systems or interpreted systems. They store access, alter and execute run-time data in a manner similar to the storage, access, alteration and execution of the Learned Elements in the systems described above and are subject to the same limitations of slow execution and system overhead as the systems described above. By the phrase, "repeated calculations (or computations) on (or of) run-time data," this application means the execution of one or more instructions that must access one or more elements of run-time data (from data storage such as RAM or hard disk) more than once on the same values of the run-time data.

SUMMARY OF THE INVENTION

The present invention overcomes the drawbacks of the prior art by providing a computerized computation system for a process such as real-time control of a robot or other autonomous agent. The present system avoids overspecialization, and is effective in evolving a behavior that can generalize to unseen environments and tasks. In addition, the present system operates much faster than any comparable system which has been proposed heretofore.

In accordance with the invention, a very general form of representing and specifying an autonomous agent's behavior is by using a computer language. The task of planning feasible actions is then reduced to an instance of automatic programming. In a preferred embodiment of the invention, an evolutionary technique called Genetic Programming (GP) is used to directly control a miniature robot.

Two embodiments of the invention are presented. The objective of the GP-system in the first approach is to evolve real-time obstacle avoiding behavior from sensorial data. This technique enables real time learning with a real robot using genetic programming.

A population of computer programs or other entities is evolved using the GP-system by allowing selected entities to control the robot for brief periods of time and evaluating the effectiveness or fitness of the entities. The more fit entities are bred using genetic operators such as crossover and mutation to produce offspring which replace the less fit entities. In accordance with the present invention, the learning is distributed or stored in the population of entities.

In the first embodiment, the learning time is limited by the response dynamics of the environment. To overcome this problem, the second embodiment learns from past experiences stored in memory. In this aspect of the invention, vectors including sensor inputs, control outputs and empirically derived fitnesses which are generated during the real-time control of the robot are stored and updated in a memory, and used as a training set for the GP-system.

In the second embodiment of the present process control system, a computer model is constituted by the most currently fit entity in the population. As opposed to a conventional control system in which an output is defined as a function of an input, the present computer model defines fitness as a function of inputs and outputs. A computing unit accesses the model with a set of inputs, and determines a set of outputs for which the fitness meets a predetermined criterion, normally the best fitness. The present system does not merely mechanically calculate an output in response to an input as in the prior art, but associates a sensory-motor (input-output) state with a fitness in a manner that might be termed "feeling".

In a preferred embodiment, the present invention utilizes the lowest level binary machine code as the "entities" or individuals or solutions. Every individual is a piece of machine code that is called and manipulated by the genetic operators.

There is no intermediate language or interpreting part of the program. The machine code program segments are invoked with a standard C function call. Legal and valid C-functions are put together, at run time, directly in memory by the genetic algorithm. The present system can therefore be considered as a "compiling" machine learning implementation.

The present system generates binary code directly from an example set, and there are no interpreting steps. The invention uses the real machine instead of a virtual machine, and any loss in flexibility will be well compensated for by increased efficiency.

More specifically, one or more machine code entities such as functions are created which represent (1) solutions to a problem or (2) code that will perform repeated calculations on "run-time data" that is encapsulated into the machine code. These entities are directly executable by a computer. The programs are created and altered by a program in a higher level language such as "C" which is not directly executable, but requires translation into executable machine code through compilation, interpretation, translation, etc.

The entities are initially created as an integer array that can be altered by the program as data, and are executed by the program by recasting a pointer to the array as a function type. The entities are evaluated by executing them with training data (as defined elsewhere) as inputs, and calculating "fitnesses" based on a predetermined criterion or by recovering the output as the result of one of the repeated calculations on run-time data.

After one or more "executions," the entities are then altered by recasting the pointer to the array as a data (e.g. integer) type. Or the original data pointer to the array may have been typecast earlier to a function pointer in a way that did not permanently change the type of the pointer. In that case, the original data pointer is used in its original form. This process is iteratively repeated until an end criterion is reached.

In the case of machine learning, the entities change in such a manner as to improve their fitness, and one entity is ultimately produced which represents an optimal solution to the problem. In the case of repeated calculations on run-time data, the entity permits very rapid calculations to be performed generating usable output from the run-time data.

Each entity includes a plurality of directly executable machine code instructions, a header, a footer, and a return instruction. The alteration process is controlled such that only valid instructions are produced. The headers, footers and return instructions are protected from alteration.

The system can be implemented on an integrated circuit chip, with the entities stored in high speed memory in a central processing unit.

The present invention overcomes the drawbacks of the prior art by eliminating all compiling, interpreting or other steps that are required to convert a high level programming language instruction such as a LISP S-expression into machine code prior to execution.

Experiments have demonstrated that the present approach can speed up the execution of a machine learning or a repeated calculation system by 1,000 times or more as compared to systems which provide potential solutions in the form of high level "program expressions in the interpreted approach. The speedup is in excess of 60 times over the compiler based approach. This makes possible the practical solutions to problems which could not heretofore be solved due to excessive computation time. For example, a solution to a difficult problem can be produced by the present system in hours, whereas a comparable solution might take years using conventional techniques.

These and other features and advantages of the present invention will be apparent to those skilled in the art from the following detailed description, taken together with the accompanying drawings, in which like reference numerals refer to like parts.

DESCRIPTION OF THE DRAWINGS

FIGS. 19 to 21 are diagrams illustrating the use of functions and registers in accordance with the invention.

DETAILED DESCRIPTION OF THE INVENTION

Figure 1:
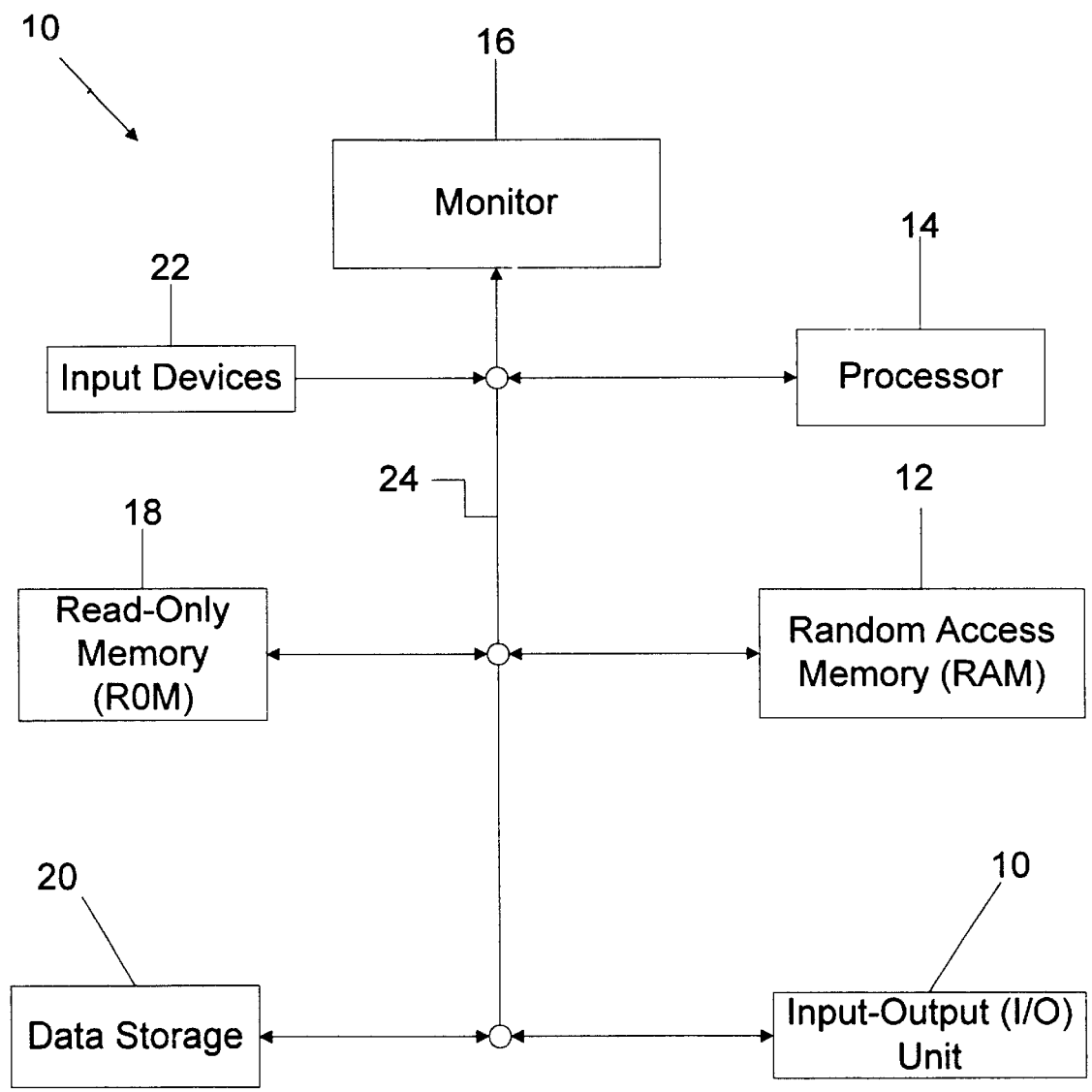
FIG. 1 is a block diagram illustrating a machine learning system according to the present invention as implemented on a general purpose computer.

The present method must be implemented using a computer due to the immense number of complex computations that must be made. The computer can be a general purpose computer, with the functionality of the method being implemented by software. Alternatively, as will be described below, part or all of the functionality of the system can be implemented on a specially designed integrated circuit chip.

Learning and Control System

The present invention provides a system and method to perform a learning task and/or control a process. In its exemplary embodiments presented herein, the invention provides a general method for performing real time or online learning tasks such as control of an autonomous agent. In the exemplary embodiments presented below, the autonomous agent is a propelled object, more specifically a robot. However, it will be understood that the invention is not so limited, and the present invention can be applied to any applicable learning task, any applicable real time or online learning task, or to control any applicable autonomous object or process.

Two preferred embodiments of the present invention are described herein. The first is a non-memory method or system. The second is memory-based method or system.

The two preferred embodiments of the invention utilize a fitting algorithm that is able to derive a computer entity (function or program) that takes one set of data as input and predicts the value of another set of data. A fitting algorithm which is preferred for practicing the present invention is a symbolic regression algorithm that will be referred to as a Compiling Genetic Programming System (CGPS) and described in detail below. However, the present invention is not limited to an implementation using the CGPS system, and any other fitting algorithm can be used which is applicable to a particular application.

The non-memory embodiment of the present invention includes the following elements:

1. A population of solution candidates where population size can vary between 30 and 50,000 individuals. The population is normally initiated to a random content. The solution candidates are referred to elsewhere in this application as "individuals," "entities," "solutions," and computer programs.

2. A fitness measure defining the desired task of the evolved programs.

3. A recombination or crossover operator allowing for exchange of solution segments.

4. A mutation operator for changing code more locally than the crossover operator.

5. A set of basic constants, instructions, procedures or functions used as the atomic parts of the evolved programs.

Genetic Programming and Machine Code

The CGPS system used in the preferred embodiment of the present invention to perform symbolic regression is a variant of GP that uses a linear genome, and stores the individuals of the population as binary machine code in memory. This results in a speed-up of several orders of magnitude. The method is also memory efficient requiring only 32 KB for the GP kernel. The individuals can be stored in an economic way, and memory consumption is stable during evolution without any need for garbage collection etc. All of these properties make the system ideally suited for real-time control in low-end processor architectures such as one-chip embedded control.

The present CGPS system uses variable length strings of 32 bit instructions for a register machine. Each node in the genome is an instruction for a register machine. The register machine performs arithmetic operations on a small set of registers. Each instruction might also include a small integer constant of maximal 13 bits. The 32 bits in the instruction thus represent simple arithmetic operations such as "a=b+c" or "c=b*5". The actual format of the 32 bits corresponds to the machine code format of a SUN-4, which enables the genetic operators to manipulate binary code directly.

The set-up is motivated by fast execution, low memory requirements and a linear genome which makes reasoning about information content less complex. This compact system is a prerequisite for a micro-controller version.

The machine code manipulating GP system uses two-point string crossover. A node is the atomic crossover unit in the GP structure. Crossover can occur on either or both sides of a node but not within a node. Because our particular implementation of GP works with 32 bit machine code instructions, a node is a 32 bit instruction. Mutation flips bits inside the 32-bit node. The mutation operator ensures that only instructions in the function set with valid ranges of registers and constants are the result of a mutation. All genetic operators ensure syntactic closure during evolution.

The instructions are all low-level machine code instructions. An exemplary function set consists of the arithmetic operations ADD, SUB and MUL, the shift operations SLL and SLR, and finally the logic operations AND, OR and XOR. All these instructions operate on 32-bit registers.

The following illustrates how an individual program may look if printed as a 'C' program.

a=s3+4;
d=s2>>s1;
b=s1−d;
d=s2+2;
c=d>>1;
b=d−d;
a=c−3;
c=s4<<a;
d=a*4;
a=a~5;
e=d+s4;
c=b & c;
d=d+d;
c=d|8;
d=d*10;
b=e>>6;
d=b&0;
e=c>>b;
motor2=a|e;
c=d|7;
motor1=c*9;
c=e & e;
(">>", ">>"=Shift "|"=Or "&"=And "~"=Exor Each individual is composed of simple instructions (program lines) between variables and input and output parameters. The input is in the form of sensor values, and is represented as register variables ($s_i$). The resulting output or action in the form of propulsion control parameters or motor speeds is also given as registers (motor1 and motor2). The same basic evolutionary algorithm is at the heart of both a first system (the non-memory system) which learns directly from actual sensor input, and a second system (the memory system) which learns indirectly from stored experiences.

In the preferred embodiment of the memory system, the population of programs is initialized with random content at the outset. A simple tournament is used for the competitive selection of individuals to produce the right distribution of offspring. The GP-system with its simple steady state tournament selection algorithm has the following execution cycle:

1. Select four arbitrary programs from the population.
2. For each of the programs calculate fitness.
3. Make two copies (offspring) of the two individuals with highest fitness and let the copies be subject to crossover and mutation.
4. Replace the two individuals with worst fitness with the two new offspring.
5. Repeat step 1 to 4.

Symbolic Regression

Both of the preferred embodiments of the present invention, the memory system and the non-memory system, use a fitting algorithm. For both embodiments, the preferred fitting algorithm is a symbolic regression algorithm. Symbolic regression is the procedure of inducing a symbolic equation, function or program which fits given numerical data. Genetic programming is ideal for symbolic regression, and most GP applications could be reformulated as a variant of symbolic regression. A GP system performing symbolic regression takes a number of numerical input/output relations, called fitness cases, and produces a function or machine language computer program that is consistent with these fitness cases. Consider for example the following fitness cases:

f(2)=6
f(4)=20
f(5)=30
f(7)=56

These input/output pairs or fitness cases are consistent with the function below:

f(x)=x*x+x

This very simple example would, in register machine language, look as:

a=x*x;
y_out=a+x;
or:
a=x+1;
 y_out=x*a;

Here the input and the expected output both consist of a single number, but in many cases symbolic regression is performed with vectors specifying the input/output relation of the sought function. In the examples below the input vector has more than 10 components, and the output vector has in some cases two outputs. The fitness used to guide the system during evolution is often some kind of error summation of the expected values versus the actual values produced by an individual program.

Khepera Robot Experiments

Figure 23:
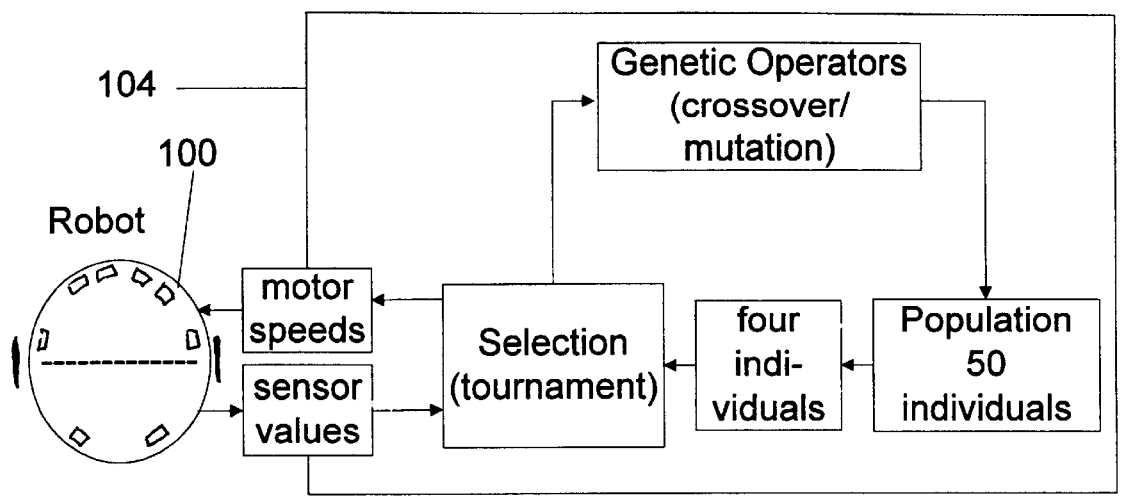
FIG. 23 is a diagram illustrating non-memory control of an autonomous agent such as a robot according to the present invention.

Experiments for both the memory and non-memory embodiments of the present invention were performed with a standard autonomous miniature robot, the Swiss mobile robot platform Khepera, which is illustrated in FIG. 23 and designated by the reference numeral 100. It is equipped with eight infrared proximity sensors. The mobile robot has a circular shape, a diameter of 6 cm and a height of 5 cm. It possesses two motors and an on-board power supply. The motors can be independently controlled by a PID controller. The eight infrared sensors are distributed around the robot in a circular pattern. They emit infrared light, receive the reflected light and measure distances in a short range: 2–5 cm. The robot is also equipped with a Motorola 68331 micro-controller which can be connected to a workstation via a serial cable.

It is possible to control the robot in two ways. The controlling algorithm can be run on a workstation, with data and commands communicated through a serial line. Alternatively, the controlling algorithm can be cross-compiled on the workstation and down-loaded to the robot which then runs the complete system in a stand-alone fashion. At present, two versions of the system have been developed; one where the controlling GP-system is run on the workstation, and another where the system is down-loaded and run autonomously on the micro-controller of the robot.

The micro-controller has 250 KB of RAM and a large ROM containing a small operating system. The operating system has simple multi-tasking capabilities and manages the communication with the host computer. The robot has several extension ports where peripherals such as grippers and TV cameras can be attached.

Training Environment

The training environment used for the obstacle avoiding task used in experiments on both the non-memory and memory embodiments of the present invention was about 70 cm×90 cm. It has an irregular boarder with different angles and four deceptive dead-ends in each corner. In the large open area in the middle, movable obstacles can be placed. The friction between wheels and surface was low, enabling the robot to slip with its wheels during a collision with an obstacle. There is an increase in friction with the walls making it hard for the circular robot to turn while in contact with a wall.

Objectives

The goal of the GP systems in the experiments was to evolve obstacle avoiding behavior in a sense-think-act context. Both the memory and non-memory systems operate in real-time and aim at obstacle avoiding behavior derived from real noisy sensorial data. The sensorial data for both systems comes from eight proximity sensors mounted on the circular platform.

Symbolic regression is, as mentioned above, the procedure of inducing a symbolic equation fitting given numerical data. Genetic programming is ideal for symbolic regression, and most GP applications could be reformulated as variants of symbolic regression. In the non-memory embodiment of the present invention, which involves obstacle avoidance, we approximate a function that takes the sensor values as an input vector and returns an action in the form of a vector of two motor speeds:

$$f(s_1,s_2,s_3,s_4,s_5,s_6,s_7,s_8)=\{m_1,m_2\} \quad \text{(equ. 1)}$$

This vector models the simple stimulus-response behavior of the robot. The first system (the non-memory embodiment of the present invention) evolves the function directly through interaction with the environment. The second approach (the memory embodiment of the present invention) evolves a simulation or world computer model which defines a relationship between inputs (sensor values), outputs (motor speeds) and corresponding predicted fitness values as follows:

$$f(s_1,s_2,s_3,s_4,s_5,s_6,s_7,s_8,m_1,m_2)=\text{predicted fitness} \quad \text{(equ. 2)}$$

The second embodiment of the invention is memory-based in that a sensory-motor (input-output) state is "associated" with a fitness, that might be termed "feeling".

Fitness Calculation

The preferred fitness function for the present embodiments of the present invention is an empirically derived fitness function defining the obstacle avoiding task as having a pain and a pleasure part. The negative contribution to fitness, called pain, is the sum of all proximity sensor values, and increases as the behavior of the autonomous agent becomes less desirable. The closer the robot's sensors are to an object, the more pain it experiences.

In order to keep the robot from standing still or gyrating, it has a positive contribution to fitness, called pleasure, as well. It receives pleasure from going straight and fast. Both motor speed values minus the absolute value of their difference is thus added to the fitness. The "pleasure" component increases as the behavior of the autonomous agent becomes more desirable.

Let $s_i$ be the values of the proximity sensors ranging from 0–1023, where a higher value means closer proximity to an object. Let $m_1$ and $m_2$ be the left and right motor speeds resulting from an execution of an individual. The values of $m_1$ and $m_2$ are in the range of zero to 15. The empirical fitness value can then be expressed more formally as:

$$f=\Sigma s_i+|8-m_1|+|8-m_2|+|m_1-m_2| \quad \text{(equ. 3)}$$

The Non-Memory Method

The first method of the invention evolves the controlling function using (equ. 1) directly, and the fitness is calculated from the current event. In the preferred embodiment of the non-memory method, the fitting algorithm used is symbolic regression using CGPS and the evolved programs are true functions; no side-effects are allowed.

The learning algorithm had a small population size, typically less than 50 individuals. The individuals use the eight values from the sensors as inputs and produce two output values which are transmitted to the robot as motor speeds. Each individual program does this manipulation independent of the others, and thus represents an individual behavior of the robot when it was invoked to control the motors. Table 1 gives a summary of the problem and its parameters.

Figure 24:
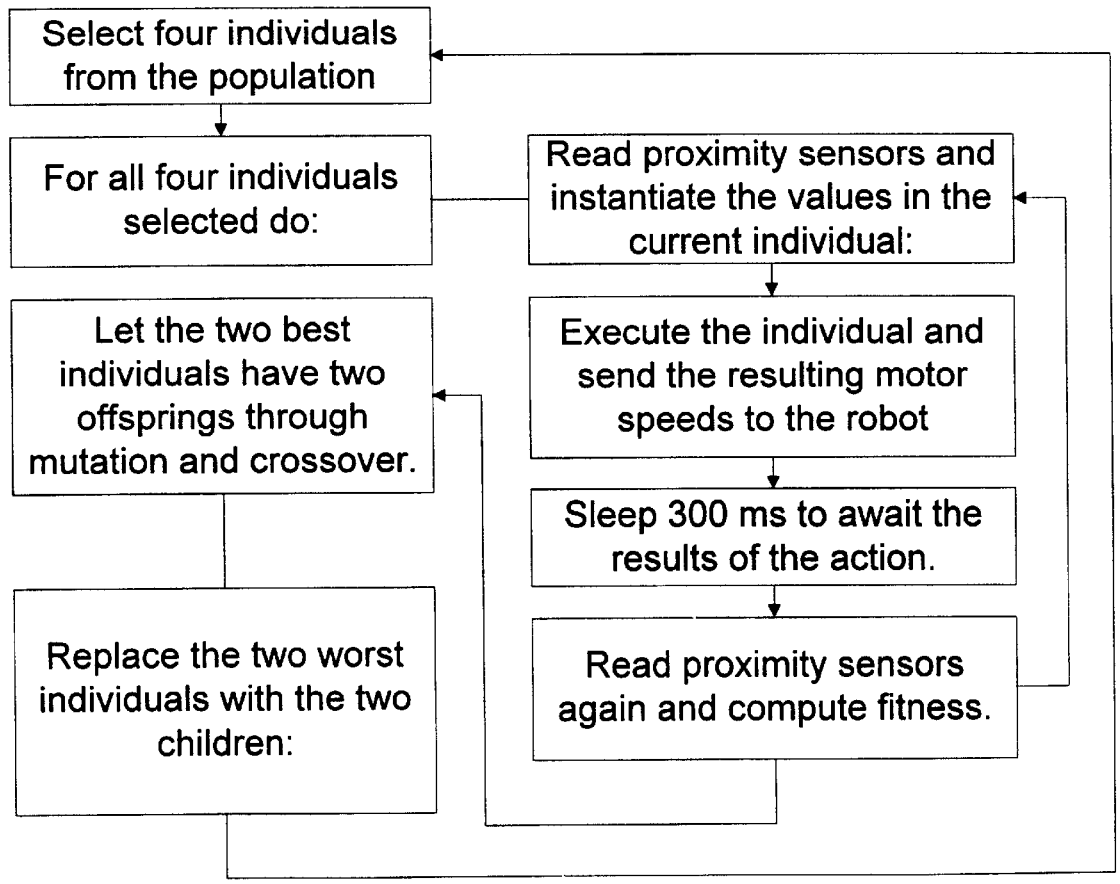
FIG. 24 is a flowchart illustrating the non-memory control process of FIG. 23.

The modules of the learning system and the execution cycle of the GP system are illustrated in FIGS. 23 and 24 respectively.

In both methods, each individual is tested against a different real-time fitness case. This could result in "unfair" comparison where individuals have to maneuver in situations with very different possible outcomes. However, experiments show that over time this probabilistic sampling will even out the random effects in learning, and a set of good solutions survive.

TABLE 1

Table:

| | |
|---|---|
| Objective: | Obstacle avoiding behavior in real-time |
| Terminal set: | Integers in the range 0–8192 |
| Function set: | ADD, SUB, MUL, SHL, SHR, XOR, QR, AND |
| Raw and standardized fitness: | Pleasure subtracted from pain value desired value |
| Wrapper: | None |
| Parameters: | |
| Maximum population size: | 50 |
| Crossover Prob: | 90% |
| Mutation Prob: | 5% |
| Selection: | Tournament Selection |
| Termination criteria: | None |
| Maximum number of generations: | None |
| Maximum number of nodes: | 256 (1024) |

Results Using Non-Memory Method

Using the non-memory method, the robot shows exploratory behavior from the first moment. This is a result of the diversity in behavior residing in the first generation of programs which has been generated randomly. Naturally, the behavior is erratic at the outset of a run.

During the first minutes, the robot keeps colliding with different objects, but as time goes on the collisions become more and more infrequent. The first intelligent behavior usually emerging is some kind of backing up after a collision. Then the robot gradually learns to steer away in an increasingly more sophisticated manner.

After about 40–60 minutes, or 120–180 generation equivalents, the robot has learned to avoid obstacles in the rectangular environment almost completely. It has learned to associate the values from the sensors with their respective location on the robot and to send correct motor commands. In this way the robot is able, for instance, to back out of a corner or turn away from an obstacle at its side. Tendencies toward adoption of a special path in order to avoid as many obstacles as possible can also be observed. The number of collisions per minute diminishes as the robot learns and the population becomes dominated by good control strategies.

Despite only processing results for less than 0.1% of the CPU time, the method competes well with other paradigms. It is for instance 100 times faster than a related evolutionary approach evolving Neural Network controllers on the same robot platform.

The moving robot gives the impression of displaying a very complex behavior. Its behavior resembles that of a bug or an ant exploring an environment, with small and irregular moves around the objects.

The Memory-Based Method

The memory-based embodiment of the present invention consists of two separate processes or units. A computing or planning unit 101 communicates with inputs and outputs (sensors and motors) as well as storing events in a memory buffer. A learning unit 103 is continuously learning and deriving (inducing or evolving) a model of the world consistent with the entries in a memory buffer.

The former process is called the planning process because it is involved in deciding what action to perform given a certain model of the world. The latter process is called the learning process because it consists of trying to derive a model (in the form of a function) from memory data.

Figure 25:
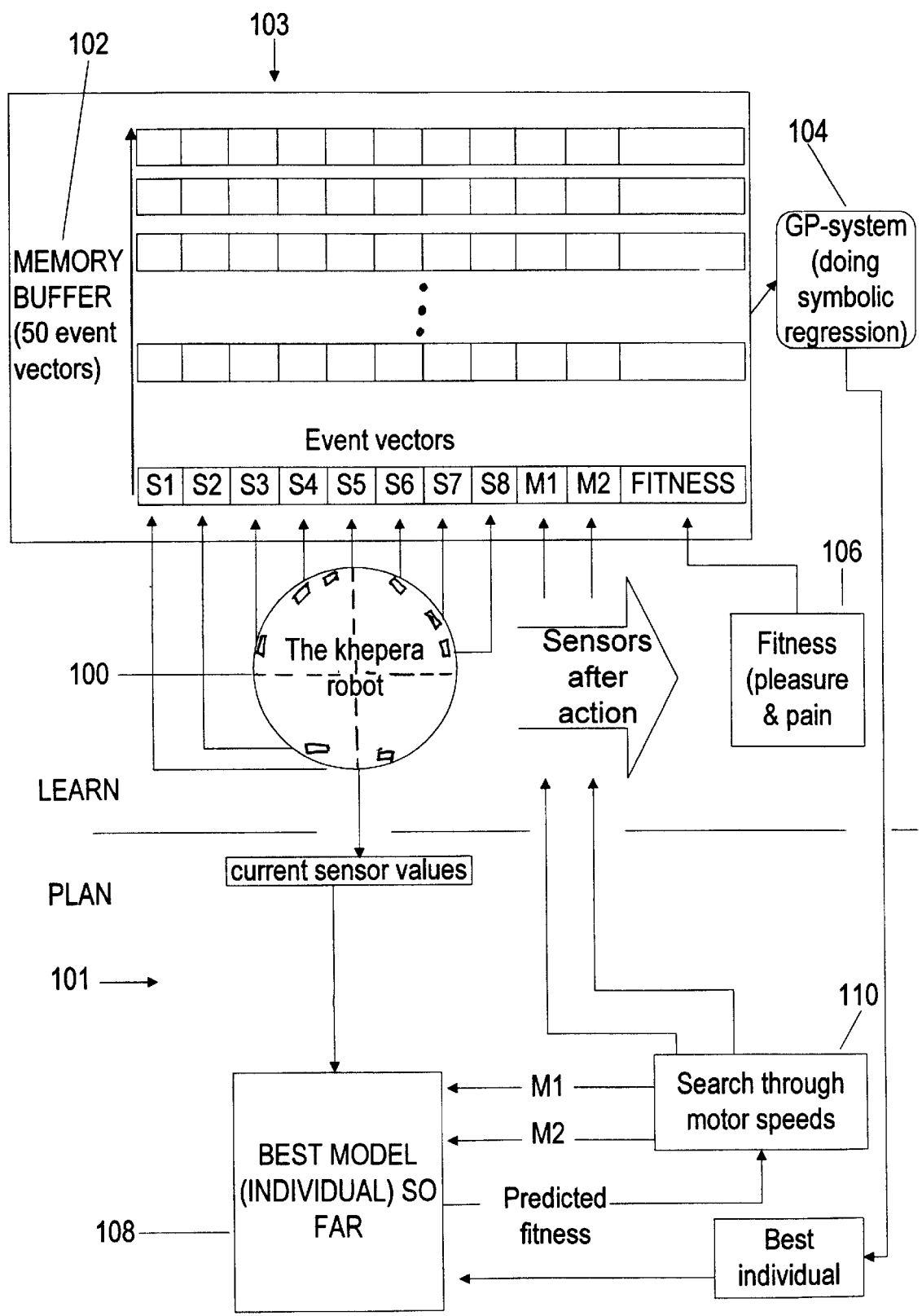
FIGS. 25 and 26 are diagrams illustrating control of an autonomous agent using a learning unit and a memory.

The present invention, in its embodiment as a memory based control system as illustrated in FIG. 25, includes six major components.

1. The robot 100 with sensors and actuators.
2. A memory buffer 102 which stores event vectors representing events in the past.
3. An derivation unit in the form of a GGPS system 104 which derives a model of the world that fits the information of the event vectors.
4. A fitness calculation module 106 which calculates an empirical fitness.
5. A currently best induced individual computer model 108.
6. A search module 110 that determines the best action given the currently best world model.

The Planning Process

Figure 27:
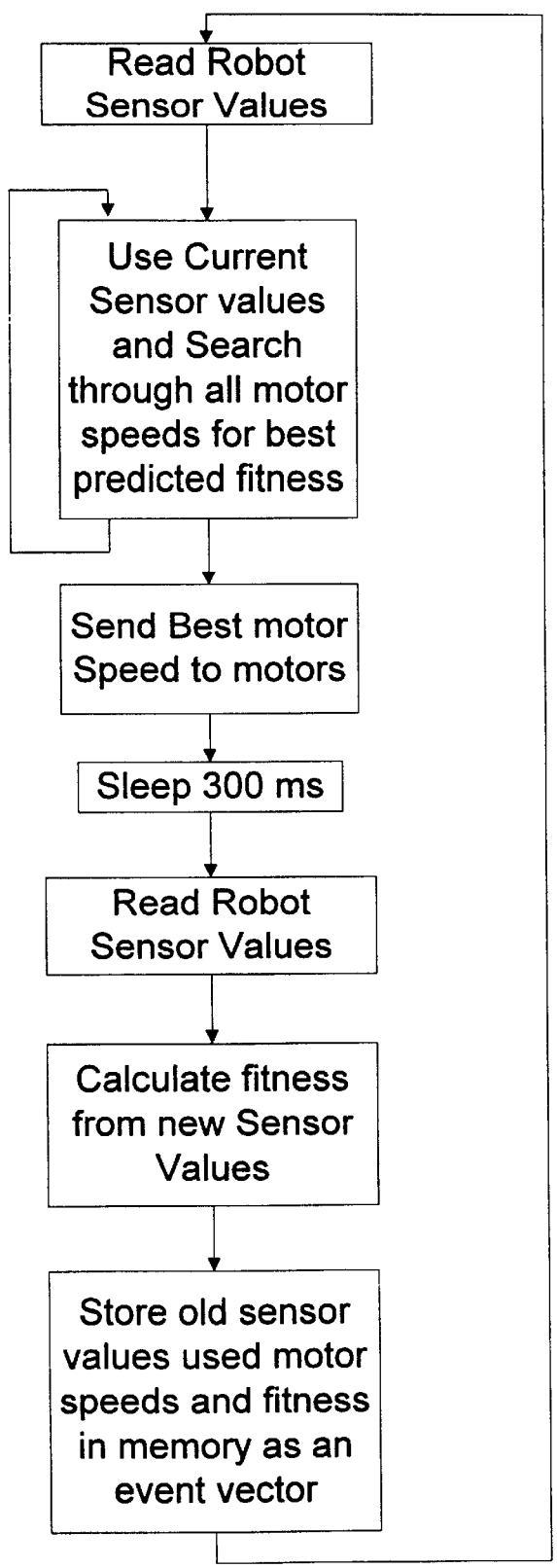
FIGS. 27 and 28 are flowcharts illustrating the control process of FIGS. 25 and 26.

The main execution cycle of the planning process is illustrated in FIG. 27, and has several similarities with the execution cycle of the simple genetic control architecture. The planning unit 101 has actual communication with the robot 100 and decides what action should be performed next. It accesses the best model 108 of the world supplied by the learning unit 103. The planning unit 101 has three main objectives. It communicates with the robot 100, finds a feasible action, and stores the resulting event in the memory buffer 102.

As illustrated in FIG. 27, the process starts with reading all eight infrared proximity sensors. These values are used to instantiate the corresponding variables in the currently best world model 108. The next objective is to find a favorable action given the current sensor values. In the obstacle avoiding task used here the possible actions are 16 different motor speeds for each of the two motors. Each motor has 8 forward speeds, 7 backward speeds, and a zero speed. Combining all alternatives of the two motors, there are 256 different actions altogether to choose from.

This comparatively small figure means that we can easily afford to search through all possible actions or combinations of motor speeds while the world model 108 provides a predicted fitness for each of them. The induced model in the form of a computer program 108 from the learning unit 103 can thus be seen as a simulation of the environment consistent with past experiences, where the robot 100 can simulate different actions. The combination of motor speeds which gives the best fitness is remembered and sent as motor speeds to the robot 100.

If an autonomous agent (e.g. robot 100) had so many possible atomic actions that an exhaustive search would be infeasible, we could use a heuristic search method to find an action that gives good predicted fitness. We would, for instance, have another genetic programming system evolving a stepwise plan which optimizes fitness according to the currently best world model.

In order to get feedback from the environment, the planning unit 101 has to sleep and await the result of the chosen action.

The planning unit 101 sleeps 300 ms while the robot 100 performs the movement defined by the motors speeds. This time is an approximate minimum in order to get usable feedback from changes in the sensor values in the present example. Thus, the main operation of the planning unit 103 is the sleeping period waiting for feedback from the environment and it, therefore, consumes less than 0.1% of the total CPU time of the system.

After the sleeping period the sensor values are read again. These new values are used to compute a new empirical fitness value using (equ. 3). This fitness value is stored, together with the earlier sensor values and the motor speeds as an event vector. The event vector consists of 11 numbers; the eight sensor values, the two motor speeds, and the resulting calculated (empirical) fitness. This vector represents what the agent experienced, what it did, and what the results were of its action. The memory buffer stores 50 of these events and shifts out old memories according to a predetermined schema.

It is then the responsibility of the learning unit 103 to evolve a program that simulates the environment as good and as consistent as possible with respect to the events in the memory buffer 102. As will be seen below, this can be done by a straight-forward application of symbolic regression through genetic programming.

The Learning Process

The objective of the learning unit 103 is to find a function or a program which will calculate the predicted fitness of an action (set of motor speed outputs), given the initial conditions in form of the sensor values:

$$f(s_1,s_2,s_3,s_4,s_5,s_6,s_7,s_8,m_1,m_2) = \text{predicted fitness} \quad \text{(equ. 4)}$$

In most cases an additional state variable is used as part of the program. This is simply a memory cell allowing the possibility to use side-effects in evolved solutions. This feature significantly improves performance in the complex environment used throughout these experiments.

$$f(s_1,s_2,s_3,s_4,s_5,s_6,s_7,s_8,m_1,m_2,\text{state}_t) = \{\text{predicted fitness}, \text{state}_{t+1}\} \quad \text{(equ. 5)}$$

Each event vector stores an instance of the values; the inputs (sensor values), outputs (motor speeds) and the resulting empirical fitness.

Figure 26:
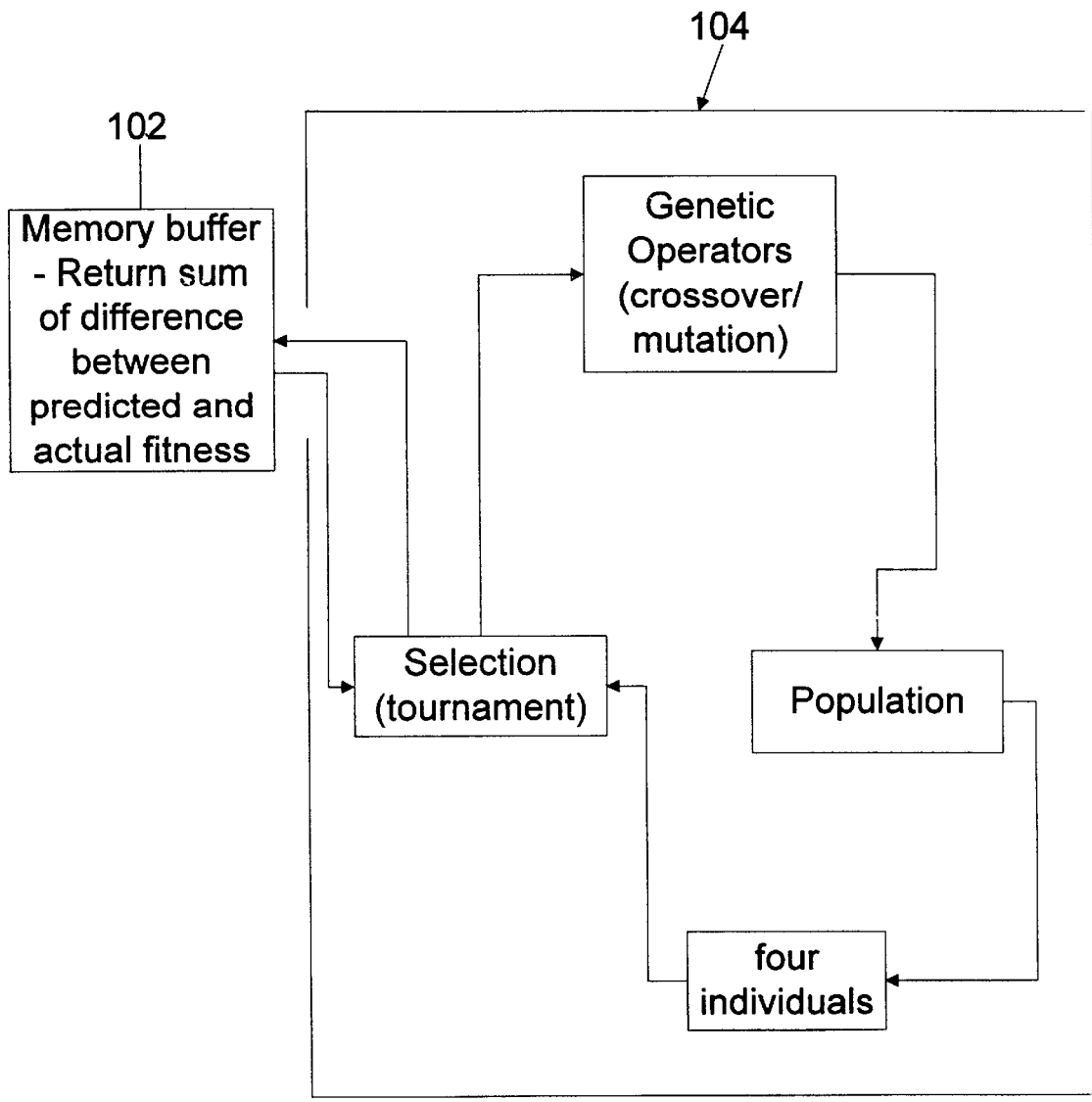

FIG. 26 illustrates the interactions between the GP system 104 and the memory buffer 102 in the learning process.

Figure 28:
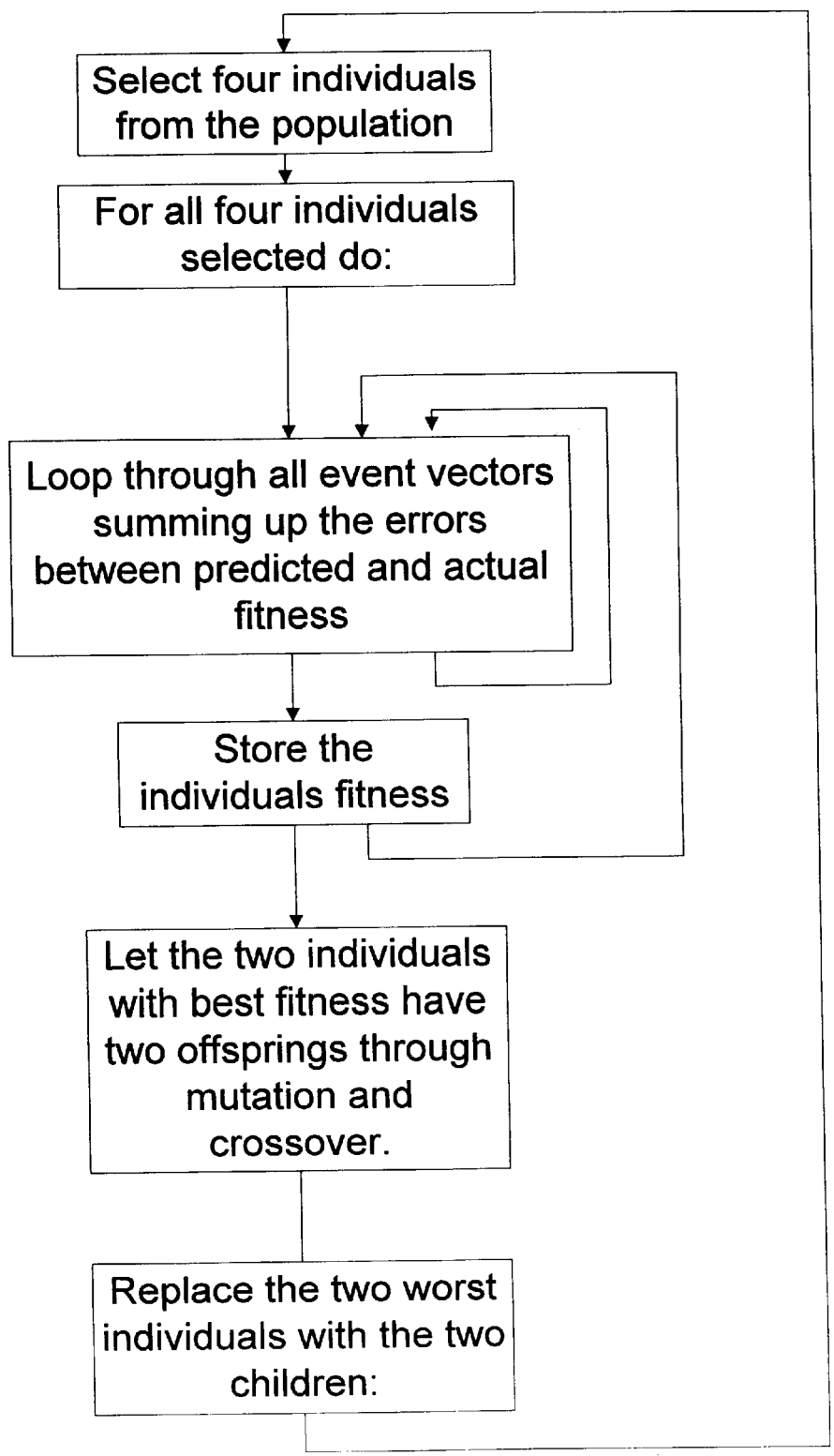

As illustrated in FIG. 28, the learning process performs a tournament selection similar to that of the non-memory method. Four entities or individual computer programs are selected at random or in accordance with another selection criterion. The vectors in the memory are used as a training set for each of the four entities.

More specifically, the sensor inputs $s_1$ to $s_8$ and motor speeds $m_1$ and $m_2$ of the first vector are instantiated into the entity which is being evaluated, and the predicted fitness is calculated as a function of these variables. The difference between the calculated predicted fitness and the empirical fitness value in the vector is then calculated. This process is repeated for all of the vectors. Then, the sum of the differences is calculated for the entity.

This process is performed for all four of the selected entities. The two selected entities which have the lowest sum of differences (best fitnesses) are then copied and subjected to genetic operations such as crossover and mutation as in the non-memory embodiment. The altered copies then replace the two selected entities which had the highest sum of differences (worst fitnesses) in the population.

The present memory method is especially advantageous in that the learning process can be performed continuously using the vectors in the memory 102 as a training set. The actual control of the robot 100 only uses a small fraction of real time. The present system does not waste the time between control functions, but instead uses this time to derive a continuously improving computer model 108.

Giving the System a Childhood

A simple approach to managing the memory buffer 102 when all 50 places have been filled is to shift out the oldest memories as the new entries come in. However, it was determined that the system then forgot important early experiences. Early mistakes, made before a good strategy was found, are crucial to remember in order to not evolve world models that permit the same mistakes to be made again. Therefore, the robot is given a childhood—an initial period whose memories were not so easily forgotten. The childhood also reduces the likelihood that the system displays a strategy sometimes seen even in humans—it would only perform actions which confirmed its current (limited) world model.

Another important factor for successfully inducing an efficient world model is to have a stimulating childhood. It is important to have a wide set of experiences to draw conclusions from. Noise is therefore added to the behavior in the childhood to avoid stereotypic behavior very early in the first seconds of the system's execution. As long as experiences are too few to allow for a meaningful model of the world, this noise is needed to assure enough diversity in early experiences. The childhood of the system is defined as the time before the memory buffer is filled which takes about 20 seconds.

Results

The memory based system quickly learns the obstacle avoiding task in most individual experiments. It normally takes only a few minutes before the robot displays a successful obstacle avoiding behavior. The obvious reason for the speed up using memory can be identified in the flowchart of the algorithms.

In the second (memory) method, there is no "sleeping" period which means that the genetic programming system can run at the full speed possible for the CPU. This results in a speed up of more than 2000 times in the GP system. On the other hand, there is now a more complex task to learn. Instead of evolving an ad-hoc strategy for steering the robot, the system now has to evolve a complete model of relationships between the eight input variables, the two action variables and the fitness.

The population size is preferably increased from 50 individuals to 10,000 to ensure robust learning in the memory-based system as illustrated in TABLE 2. The system still has to wait for the robot 100 to collect enough memory events to draw some meaningful conclusions. Yet the speed-up with memory exceeds a factor of 40 which makes it possible for the system to learn a successful behavior in less 1.5 minutes on average. This means that the behavior emerges 4000 times faster than in similar approaches.

TABLE 2

| | |
|---|---|
| Objective: | Symbolic regression of environment simulation |
| Terminal set: | Integers in the range 0–8192 |
| Function set: | ADD, SUB, MUL, SHL, SHR, XOR, OR, AND |
| Raw and standardized fitness: | The sun taken over 50 fitness cases of the absolute value of difference between the actual and desired value predicting the fitness. |
| Wrapper: | None |
| Parameters: | |
| Maximum population size: | 10000 |
| Crossover Prob: | 90% |
| Mutation Prob: | 5% |
| Selection: | Tournament Selection |
| Termination criteria: | None |
| Maximum number of generations: | None |
| Maximum number of nodes: | 256 (1024) |

The behavior of the robot is very different between the two systems (memory and non-memory) discussed here. The system without memory behaves in a very complex way and gives the impression of a small bug which randomly runs around avoiding obstacles, but with little overall strategy.

The memory system, on the other hand, displays a set of very "thought through" behaviors. The robot always displays a clear strategy and travels in straight lines or smooth curves. Some of the behaviors evolved show an almost perfect solution to the current task and fitness function.

The robot usually demonstrates a limited set of strategies during evolution in our experiments. Some of the emerging intelligent strategies might be described as belonging to different behavioral classes (ordered according to increasing success).

1. The straight and fast strategy: This is the simplest "intelligent" behavior. The induction process has only seen the pattern arising from the pleasure part of the fitness function. The model of the robot and its environment thus only contains the relationship expressing that going straight and fast is good. The robot consequently heads into the nearest wall and continues to stand there spinning its wheels. This strategy sometimes emerges right after the childhood when the noise is removed and the system is solely controlled by inferences from the induced model.

2. The turning behavior: The second simplest strategy is based on the experience that turning often improves fitness. The robot starts spinning around its own axis and does avoid all obstacles but also ignores the pleasure part of the fitness rewarding it for going straight and fast.

3. The dancing strategy: This strategy uses the state information in the model and navigates to the open space where it starts to move in an irregular circular path avoiding obstacles. Most of the time the robot moves around keeping a distance to the obstacles big enough to avoid any reaction from its sensors. If this strategy worked in all cases it would be nearly perfect because it keeps obstacles out of reach of the sensors and the robot is totally unexposed to pain. In most cases, however, the robot wanders off its path and comes too close to an obstacle where it then is unable to cope with the new situation and experiences collisions.

4. The backing-up strategy: This is the first effective technique that allows the robot to avoid obstacles while moving around to some extent. The path the robot travels is, however, very limited and it is not a preferred solution.

5. The bouncing strategy. Here the robot gradually turns away from an obstacle as it approaches it. It looks as if the robot bounces like a ball at something invisible close to the obstacle. This behavior gives a minimum speed change in the robot's path.

6. The perfect or nearly perfect strategy: The robot uses the large free space in the middle of the training environment to go straight and fast, optimizing the pleasure part of the fitness. As soon as the robot senses an object it quickly turns 180 degrees on the spot and continues going straight and fast. This strategy also involves state information because turning 180 degrees takes several events in the robot's perception, and that cannot be achieved without states.

Most of the experiments displayed a simple behavior very early after the childhood, just to realize a more successful pattern a few seconds later and change its strategy correspondingly. The change in strategy was always accomplished by a new best individual and fitness value displayed by the GP algorithm.

TABLE 3 illustrates the results of 10 evaluation experiments with the memory based system. The results were produced by timing the robot's behavior in 10 consecutive experiments. In each experiment the robot was watched for 20 minutes before the experiment was terminated. Each time the behavior changed was noted. The table gives the number of the experiment, the strategy displayed when the experiment was terminated and the time when this strategy first appeared.

It is not completely evident what really constitutes an autonomous agent. Some would argue that the autonomy is a property of the controlling algorithm while others would argue that physical autonomy is needed.

In order to try the fully autonomous paradigm, a special version of the system was ported to the micro-controller.

TABLE 3

| Run number | Result | Time (minutes) |
|---|---|---|
| 1 | perfect | 1.5 |
| 2 | perfect | 1.5 |
| 3 | perfect | 0.5 |
| 4 | perfect | 3.0 |
| 5 | perfect | 2.0 |
| 6 | perfect | 2.0 |
| 7 | perfect | 1.5 |
| 8 | perfect | 2.0 |
| 9 | perfect | 1.0 |
| 10 | dancing | 0.5 |

It is possible to download these systems via the serial cable to the robot. With the accumulators switched on, the robot can then be disconnected from the workstation and can run fully autonomous. The Motorola 68331 micro-controller then runs the complete GP learning system.

As mentioned earlier, the micro controller has 256 KB of RAM memory. The kernel of the GP system occupies 32 KB, and each individual 1 KB, in the experimental setup. The complete system without memory consists of 50 individuals and occupies 82 KB which is well within the limits of the on-board system. The more complex system, learning from memory, has to use a smaller population size than the desired 10,000 individuals. This results in less robust behavior with a more frequent convergence to local optima such as displayed by the first strategies in FIG. 15.

In either case, it is demonstrated herewith that the compactness of the compiling GP system enables relatively powerful solutions in weak architectures such as those used in embedded control.

Summary of Autonomous Agent Control System Experimental Results

It has been demonstrated that a GP system can be used to control an existing robot in a real-time environment with noisy input. The evolved algorithm shows robust performance even if the robot is lifted and placed in a completely different environment or if obstacles are moved around. It is believed that the robust behavior of the robot partly could be attributed to the built-in generalization capabilities of the genetic programming system.

We have also cross-compiled the GP-system and run it in the same set-up on the micro-controller on board the robot. This demonstrates the applicability of Genetic Programming to control tasks on low-end architectures. The technique could potentially be applied to many one-chip control applications in, for instance, consumer electronics devices.

It has been demonstrated that the use of memory with a real robot and a GP based control system could speed up learning by a factor of 40. Furthermore, the strategies evolved with the memory based system display a smoother, less chaotic behavior, undisturbed by the internal dynamics of the GP system. The memory-based system could also be expected to scale up better because training times are not directly related to the dynamics of the agent and its environment, but instead almost completely depend on the difficulty of the induction problem in the application domain.

Compiling Genetic Programming System (CGPS)

The CGPS system which was discussed above as a preferred method of implementing the present learning and control system will now be described in detail.

Introduction

The present invention utilizes the lowest level native machine code with no immediate step of compilation or interpretation to store, access, initialize, create, alter and execute run-time data and related code where repeated computations (embodied in the related code) must be performed using that run-time data. In the context of machine learning, the run-time data (the Learned Elements) and the computations that are to be performed on the run time data (the Conversion Elements) are created, initialized, stored, altered and executed directly in native machine code with no intermediate step of compilation or interpretation. Thus, in the context of machine learning, the present invention stores both Learned Elements and the Conversion Elements in native machine code. All or many of the Learned Elements and all of the Conversion elements are created, initialized, stored, altered and executed directly in the native machine code with no intermediate step of compilation or interpretation.

The present invention is not limited to any particular machine learning paradigm such as, and by way of example only, genetic programming, genetic algorithms, simulated annealing or neural networks. Rather, it is a method of creating, initializing, storing, altering and executing all or part of the Learned Elements and the Conversion Elements in any machine learning paradigm directly in native machine code.

For example, when the present invention is applied to evolving native machine code structure and contents, it creates, initializes, stores, alters and executes the programs structures that are to be evolved (the Learned Elements) directly in native machine code. The approach of the present invention is completely unlike the compiler based and interpreting approaches to evolving "computer programs," which only create, store, alter and (with the aid of a compiler or an interpreter) execute high level symbolic representations of high level "program structures" in a high level programming language that, ultimately, represent and are converted into actual machine code by an interpreter or that are executed by compiled code making repeated accesses to the run-time Learned Elements (the representations of high level "program structures") in RAM.

As a further example, when the present invention is applied to neural networks, it creates, initializes, stores, alters and executes the weights of the network (the Learned Elements) and the code that executes a network characterized by those weights (the Conversion Elements) directly in native machine code. This is completely unlike the compiler based and interpreting approaches to neural networks, which create, initialize, store, alter and (with the aid of a compiler or an interpreter) execute high level symbolic representations of weights and. network structures that, ultimately, represent and are converted by an interpreter into the actual machine code that executes the neural network or that are executed by compiled code making repeated accesses to the run-time Learned Elements in RAM.

The present invention utilizes functions created in the lowest level machine code as the "learning entity" for machine learning or as the "computation entity" for repeated computations based on run-time data. Every such learning entity or computation entity (also referred to as an "entity" or an "individual" or a "solution") in the present invention is a complete, executable native machine code function that can be executed from a higher level language such as C or assembler by a simple standard function call ("Native Functions"). All of the run-time data and related code, the Learned Elements and the Conversion Elements are assembled by the present invention at run time into Native Functions, which constitute the learning entity or the computation entity, and the learning entity or computation entity are then stored, altered and executed directly as Native Functions. When the run-time data or the Learned Elements change, the learning entities or the computation entities must also be changed because the previous run-time data, including the previous Learned Elements, are already included in the Native Function learning entity. The present invention is, in part, a method of making such changes directly in the learning and computation entities. In a sense, the present system acts as an on-the-fly compiler of both real time data and related code (for computation entities), and of Learned Elements, and Conversion Elements (for learning entities). The present system can therefore be loosely considered as a "compiling" machine learning implementation. In the specific case of evolving machine code structures and contents as the Learned Elements, the present methodology can be loosely described as a "Compiling Genetic Programming System (CGPS)".

The present system generates low level machine code directly from an example set, and there are no interpreting or compiling steps. The invention uses the real machine instead of a virtual machine, and any loss in flexibility will be well compensated for by increased efficiency.

More specifically, one or more individuals (or "entities" or "solutions") are created which represent solutions to a problem and are directly executable by a computer as Native Functions. The programs are created, initialized, stored, altered and executed by a program in a higher level language such as "C" which is not directly executable, but requires translation into executable machine code through compilation, interpretation, translation, etc.

The entities are initially created as an integer array that can be created, initialized, stored and altered by the higher level program as data. Although the present implementation of the system uses arrays of integers, the system could be implemented as arrays of any other data type and such implementations are within the scope and spirit of the present invention.

To understand how the system chooses what integers are included in this array, one must understand what a low level machine instruction looks like. The low level instructions on all existing CPU's are groups of binary bits. On the Sun system for which most of the development of the present system has taken place, all instructions are 32 bits long. In low level machine code, each bit has a particular meaning to the CPU. In the present system, the integers chosen for the integer arrays that constitute the entities are integers that, when viewed in binary format, correspond to valid low level machine code instructions for the CPU used in the computer system to which the present invention is being applied. Although the present system is implemented on Sun and Intel systems, it could be implemented on any CPU and many other chips. Such alternative implementations are within the scope and spirit of the present invention.

In the present implementation of the invention in C, the entities are executed by type casting a pointer to the array of integers that constitute the entity to be a pointer to a function. The function pointed to by the entity is then executed by calling the function using the function pointer like a regular C function. The important point here is that the entities are viewed, alternatively, as data and as functions at different times in the system. At the time the entities are created, initialized, stored and altered, the entities are viewed by the system as data-an array of integers. At the time the entities are executed, they are viewed as Native Functions. So if the present system was implemented in assembler, the entities would be created as integers (as data) and they would be executed as Native Functions. No typecast would be required in assembler but such an implementation is within the scope and spirit of the present invention.

When the entities are executed, they use training data (defined below) as inputs. The results of the execution are converted into some measure of how well the problem is solved by the entity, said measure being determined by the machine learning paradigm or algorithm being used. Said measure will be referred to herein as "fitness" regardless of the machine learning paradigm or algorithm being used. Many machine learning algorithms take the measure of fitness and feed it back into the algorithm. For example, evolutionary based learning algorithms use fitness as the basis for selecting entities in the population for genetic operations. On the other hand simulated annealing uses fitness, inter alia, to determine whether to accept or reject an entity as being the basis for further learning. After entities are initialized, most machine learning algorithms, go through repeated iterations of alteration of entities and execution of entities until some termination criterion is reached.

In the particular implementation of the present invention, the entities are initially created and initialized as an integer array that can be altered by the program as data and are executed by the program by recasting a pointer to the array as a pointer to a function type. The entities are evaluated by executing them with training data as inputs, and calculating fitnesses based on a predetermined criterion applied to the output of an entity after execution.

The entities are then altered based on their fitnesses using a machine learning algorithm by recasting the pointer to the array as a data (e.g. integer) type or by using the original data pointer. This process is iteratively repeated until an end criterion is reached.

The entities evolve in such a manner as to improve their fitness, and one entity is ultimately produced which represents the best solution to the problem.

Each entity includes a plurality of directly executable machine code instructions, a header, a footer, and a return instruction. The alteration process is controlled such that only valid instructions are produced. The headers, footers and return instructions are protected from alteration.

The system can be implemented on an integrated circuit chip, with the entities stored in high speed memory or in special on chip registers in a central processing unit and with the creation initialization, storage, alteration and execution operators stored in chip based microcode or on ROM.

The present invention overcomes the drawbacks of the prior art by eliminating all compiling, interpreting or other steps that are required to convert a high level programming language instruction such as a LISP S-expression into machine code prior to execution. It overcomes the need of compiler based systems to access, repeatedly, the Learned Elements as run-time data, which greatly slows down the system. It also represents the problem to the computer in the native language of the computer, as opposed to high level languages that were designed for human, not for machine, understanding. It acts directly on the native units of the computer, the CPU registers, rather than through the medium of interpreters or compilers. It is believed that by using an intermediate process such as interpretation or compilation of high level codes, previous systems may actually interfere with the ability of computers to evolve good solutions to problems.

Experiments have demonstrated that the present approach can speed up the execution of a machine learning system by 1,000 times or more as compared to systems which provide potential solutions in the form of high symbolic level program expressions and by 60 times or more as compared to compiler based systems. This speed advantage makes possible practical solutions to problems which could not heretofore be solved due to excessive computation time. For example, a solution to a difficult problem can be produced by the present system in hours, whereas a comparable solution might take years using conventional techniques.

These and other features and advantages of the present invention will be apparent to those skilled in the art from the following detailed description, taken together with the accompanying drawings, in which like reference numerals refer to like parts.

Detailed Implementation

FIG. 1 illustrates a computer system 10 for implementing a machine learning method according to the present invention. The system 10 includes a Random Access Memory (RAM) 12 in which the software program for implementing the functionality of the invention is stored, and a processor 14 for executing the program code. The system 10 further includes a visual display unit or monitor 16 for providing a visual display of relevant information, a read-only memory (ROM) 18 for storing firmware, and an input-output (I/O) unit 10 for connection to a printer, modem, etc.

The system 10 further includes a mass data storage 20 which can be any combination of suitable elements such as a fixed (hard) magnetic disk drive, a removable (floppy) disk drive, an optical (CD-ROM) drive, etc. Especially large programs which implement the invention may be stored in the storage 20, and blocks of the programs loaded into the RAM 12 for execution as required.

User access to the system 10 is provided using an input device 22 such as alphanumeric keyboard 114 and/or a pointing device such as a mouse (not shown). The elements of the system 10 are interconnected by a bus system 24 .

The system 10 is preferably based on the SUN SPARC architecture due to its register structure. The invention is also preferably implemented using the "C" programming language due to its freedom in the use of data types and the ability to cast between different types, especially pointers to arrays and pointers to functions and a standard SUN operating system compiler, although the invention is not limited to any particular configuration.

The invention has been practiced using the above configuration in the SPARC environment which generally a stable architecture for low level manipulation and program patching. The particular platform used was the SUN SPARCSTATION 1+.

Figure 2:
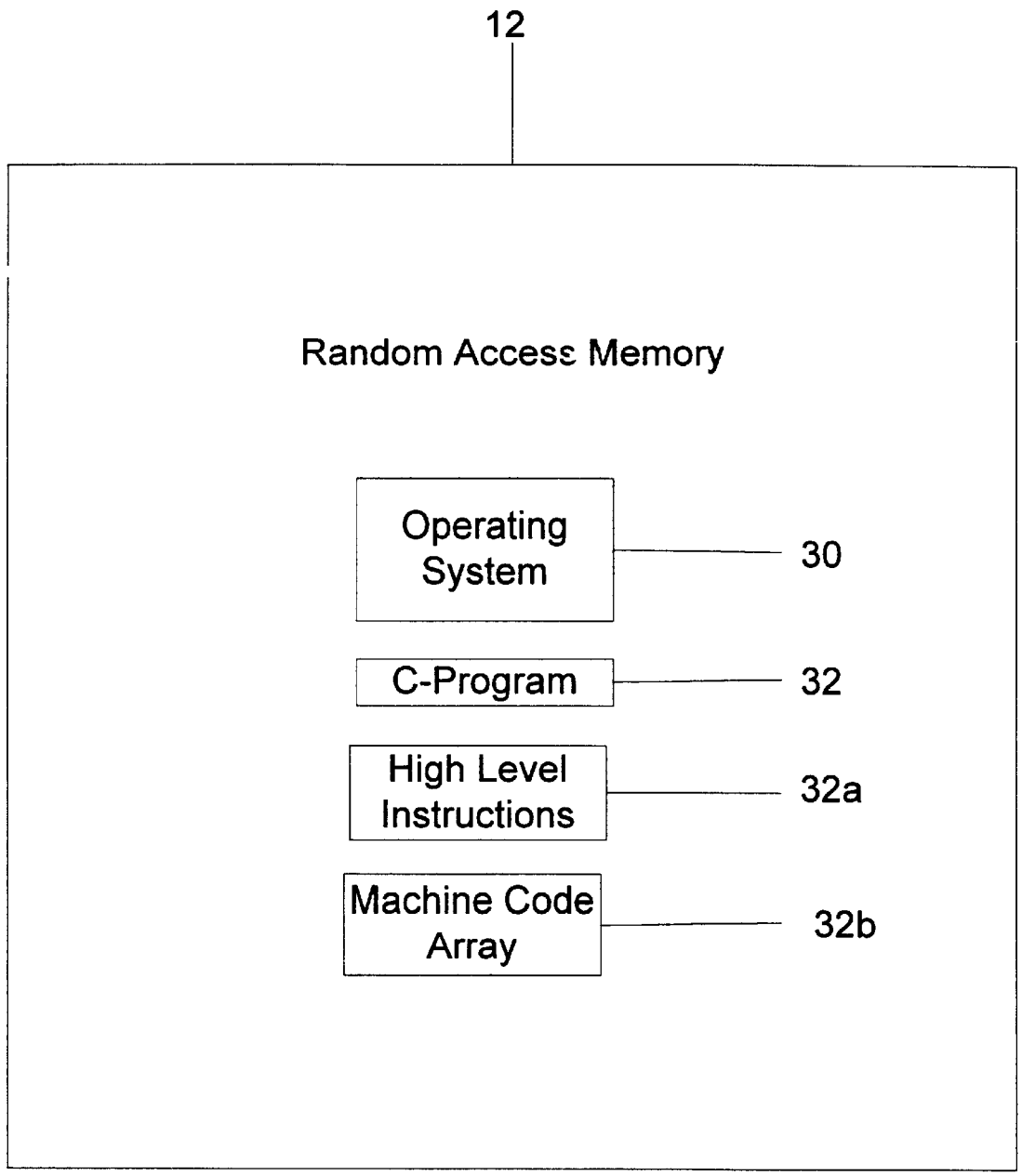
FIG. 2 is a block diagram illustrating a computer program which implements the functionality of the present invention as stored in a random access memory of the computer of FIG. 1.

The RAM 12 is illustrated in FIG. 2 as storing an operating system 30 such as UNIX or one of its variants, and a program 32 written in the "C" language which provides the functionality of the invention. The program 32 includes high level machine language instructions 32a, and one or more machine code array 32b.

The high level instructions 32a are not directly executable by the processor 14, but must be converted into directly executable machine code by a compiler. The array 32b, however, is provided in native (lowest level) machine code including binary instructions that are directly recognized and executed by the processor 14.

Figure 3:
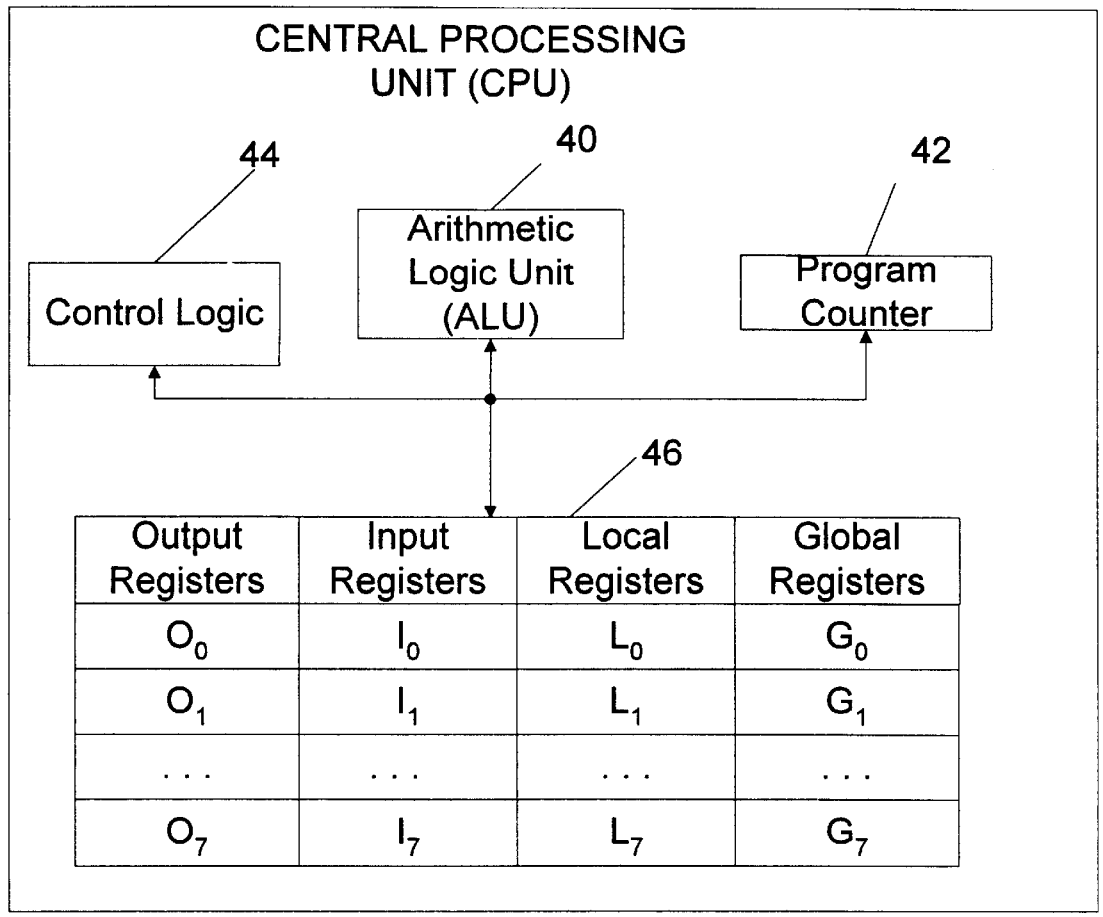
FIG. 3 is a block diagram illustrating banks of registers in the computer used in the preferred implementation of the invention.

The performance of the present invention is greatly enhanced by implementation thereof using a processor having banks of registers. This architecture is provided by the SPARC system as illustrated in FIG. 3.

The components of the SPARC processor 14 which are most relevant to understanding the present invention include an Arithmetic Logic Unit (ALU) 40 for performing actual numeric and logical computations, a program counter 42 for storing an address of a next instruction to be executed, and a control logic 44 which controls and coordinates the operations of the processor 14 including memory access operations.

The processor 14 further includes banks of registers which are collectively designated as 46. The processor 14 also includes a number of additional registers which are not necessary for understanding the principles of the present invention, and will not be described. Although the invention is presently implemented using integer arithmetic, it may be applied to Floating Point arithmetic easily and such an application is within the scope and spirit of the invention.

More specifically, the registers 46 include eight register banks (only one is shown in the drawing), each of which has 8 output registers $O_0$ to $O_7$, 8 input registers $I_0$ to $I_7$, 8 local registers $L_0$ to $L_7$. There are, also, 8 global registers $G_0$ to $G_7$ accessible from any bank. The implementation of the invention using this architecture will be described below.

Figure 4:
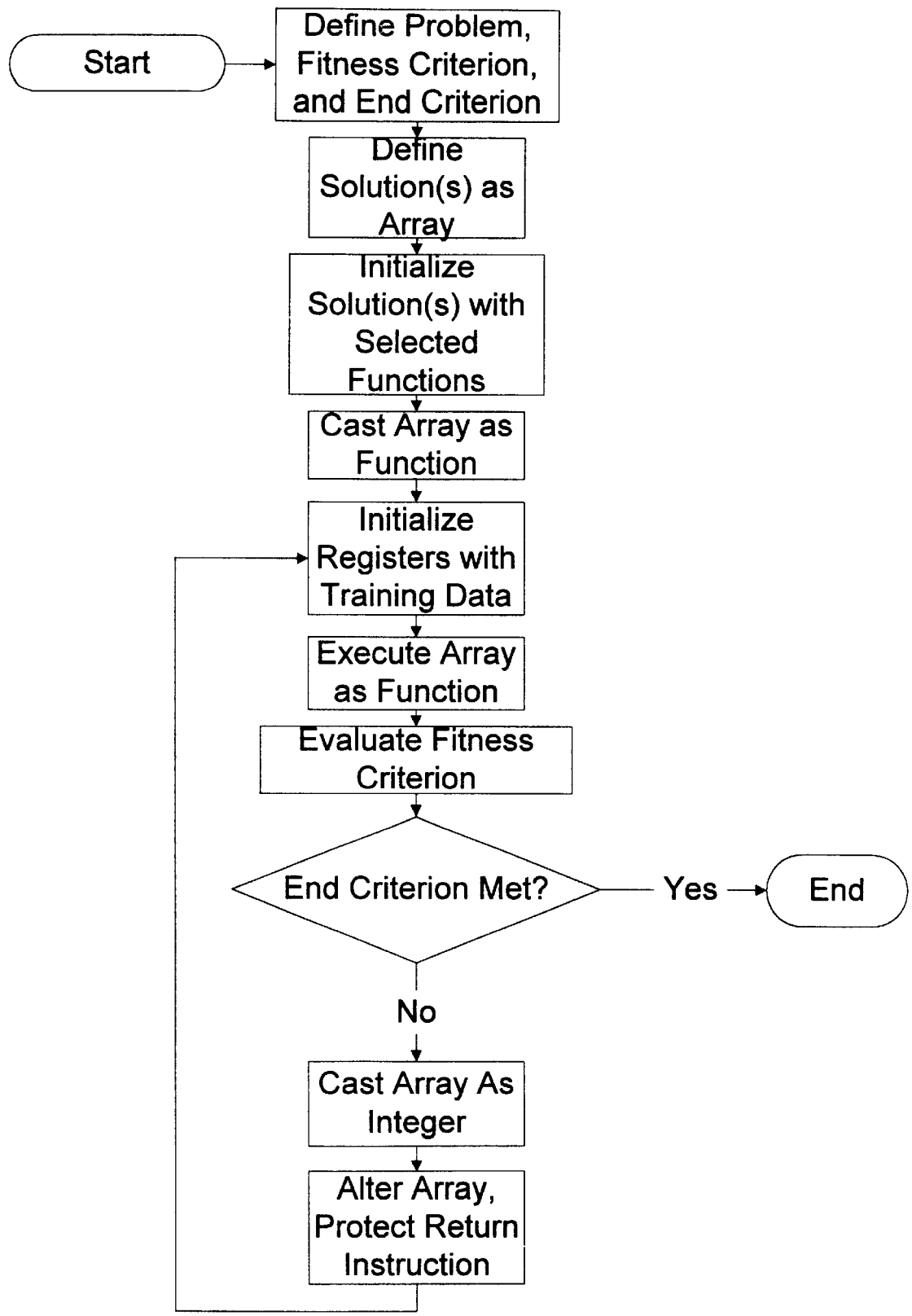
FIG. 4 is a flowchart illustrating a method of machine learning according to the invention.

FIG. 4 is a flowchart illustrating the general machine learning method of the present invention which is implemented by the high level instructions 32a in the C programming language. FIGS. 22a to 22k are more detailed flowcharts illustrating the present invention. The first step is to define a problem to be solved, a fitness criterion for evaluating the quality of individual solutions, and an end criterion. The end criterion can be a predetermined number of iterations for performing the process (e.g. 1,000), achievement of a predetermined fitness level by one or more solutions, a change in total or individual fitness which is smaller than a predetermined value, or any other suitable criterion.

Next, the input, output, calculation, and state registers must be identified.

An input register is a register that is initialized before each calculation with data. In the present implementation of the invention, the input registers may be any one of the registers referred to as I0 through I5 in the Sun architecture. See FIG. 3, number 46. In the present implementation of the invention, it is, therefore possible to have up to six input registers. However, it would be easy to extend the system to have many more input registers and such an extension is within the scope and spirit of the present invention. In any event, the designer must pick how many of the eight input registers to use.

There are many ways to initialize these registers but the preferred implementation is to include the input variables as parameters when the individual is called as a Native Function. For example, if native_function_array is an array of integers that constitute valid machine code instructions that amount to a Native Function and that amount to an entity in this invention, then the following type definition and function call execute the native_function_array individual and pass two input variables to it.

Typedef unsigned int(* function-ptr) ( );
{the type definition}
a=((function_ptr) native_function_array)(2,3);
{calls the function and passes two inputs (2 and 3), which are placed in I0 and I1.}

The items in curly brackets are descriptive and not part of the code. In the present implementation of this invention, the two input variables are put into I0 and I1. Accordingly, if the designer decides to have two input registers, they must be I0 and I1 in the present implementation. Other methods of initializing registers such as putting instructions in the header of the entity (see FIG. 5, number 50) that retrieve data from RAM provide more flexibility as to what registers are input registers and more input registers and they are within the scope and spirit of the present invention.

Figure 16A:
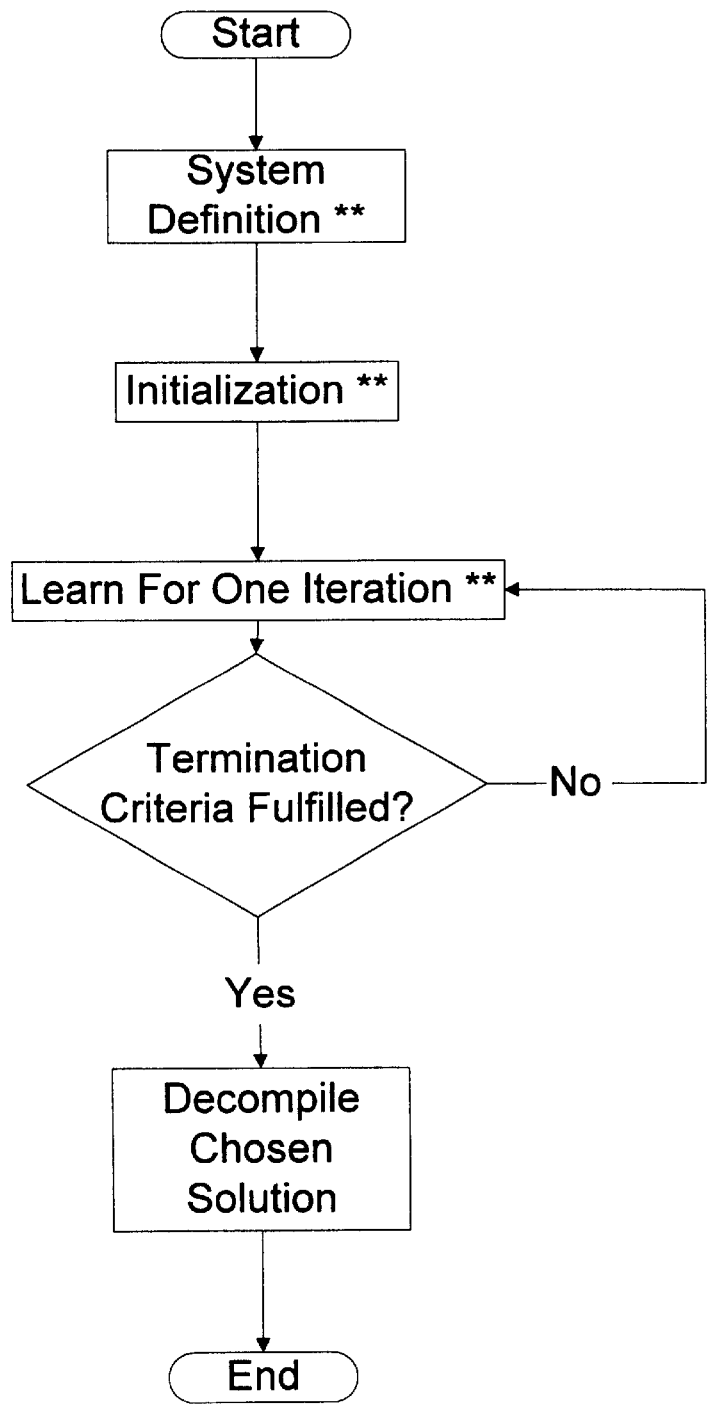
FIGS. 16a to 16d in combination constitute a flowchart illustrating a generic implementation of the invention to machine learning.
Figure 16B:
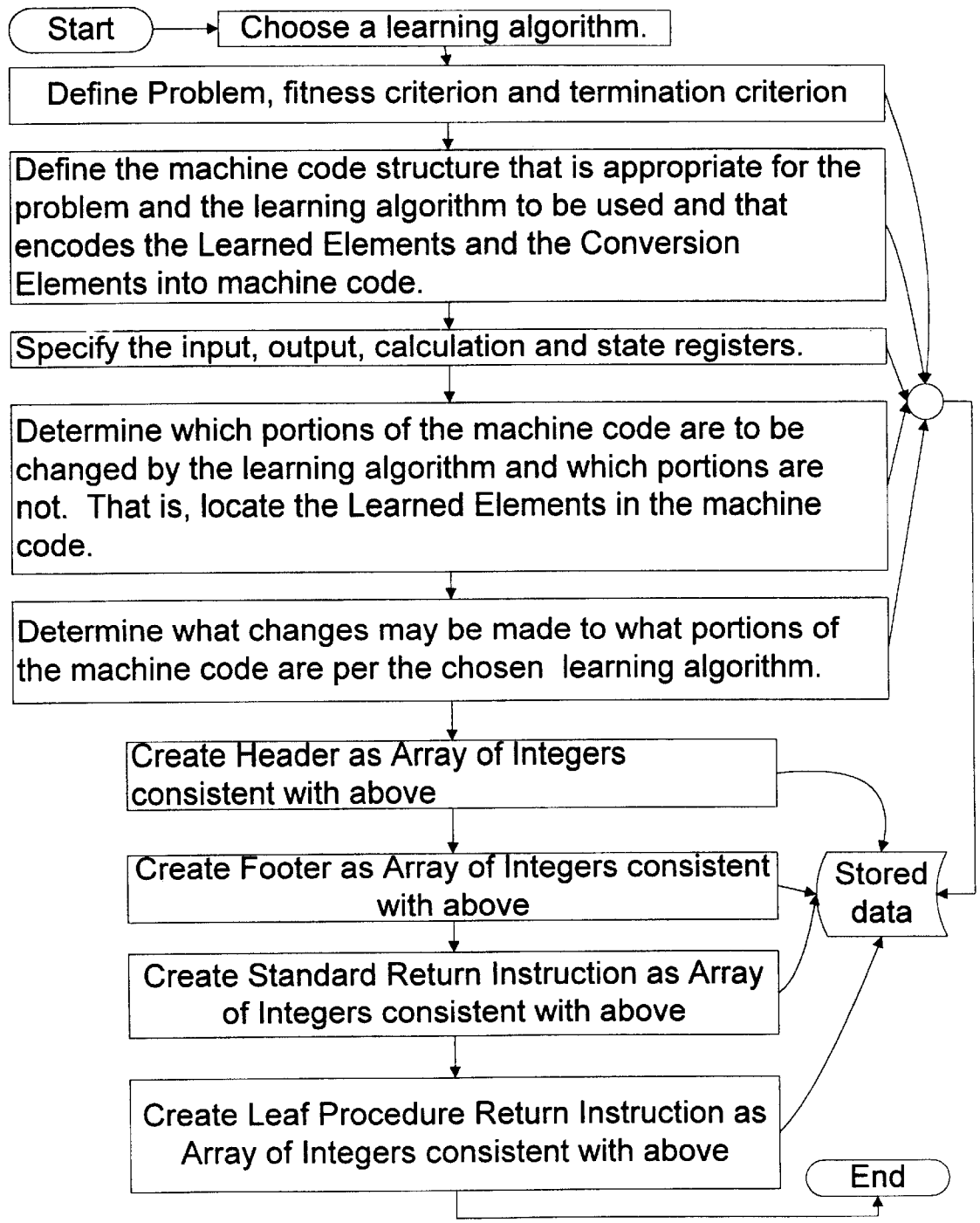

This process of picking and initializing input registers is referred to in FIGS. 16b, c, and d; 17b, c, and d; 18b, d, and f; and 22b, e, and g.

An output register is read. after the individual has finished executing on a given set of inputs. In other words, an output register is the output of the individual on a given set of inputs. The designer must designate one or more registers to be the output register(s) and the number depends on the problem to be solved. In the present implementation, the value in I0 at the end of the execution of the individual is automatically set as the single output register and as the output of the individual. The above code automatically puts the value in I0 into the variable "a." It is possible to designate multiple output registers and to preserve the values therein when an individual has been executed. One such method would be to include instructions in the footer of the individual (see FIG. 5, number 50 ) that move the value(s) in the designated output registers in the individual that has just executed to storage registers or to locations in RAM memory. Such implementations are within the scope and spirit of the present invention.

This process of picking and recovering the values in output registers is referred to in FIGS. 16b, c, and d; 17b, c, and d; 18b, d, and f; and 22b, e, and g.

A calculation register is a register that is neither an input nor an output register but that is initialized to a given value every time the individual is executed. Zero or one is the preferred initialization value. A calculation register may be initialized in the headers of the individuals. (See FIG. 5, number 50). In any event the designer must decide how many, if any, calculation registers he or she wishes to use and then designate specific registers to be calculation registers. So, for example, if there were two input registers, I0 and I1 and if I0 were the output register, then I2 through I5, and L0 through L7, among others would be available slots for a calculation register. So if the designer desires one calculation register, he could pick I2 as the calculation register.

This process of picking and initializing calculation registers is referred to in FIGS. 16b, c, and d; 17b, c, and d; 18b, d, and f; and 22b, e and g.

A state register is a register that is neither an input nor an output register but that is not initialized every time the individual is executed. That is, values from some previous execution of the individual are retained in a state register. The precise retention policy is a matter of decision for the designer. At the beginning of the execution of the individual, the state register has to be initialized to the value it held at the end of a previous execution of the individual. If that value was saved in a storage register or in RAM, then the header of the individual (See FIG. 5, number 50) must have an instruction moving the value from the storage register or RAM to the state register or the previous state could be passed to the individual as a parameter when the individual is called as a Native Function. In this case, the footer of the individual may have an instruction saving the value of the state register at the end of execution to the storage register or to RAM. There are many available ways to implement state registers and to save and initialize their values and all of them are within the scope and spirit of this invention. In any event the designer must decide how many, if any, state registers he or she wishes to use and then designate specific registers to be state registers. So, for example, if there were two input registers, I0 and I1, and one calculation register, I2, and if I0 were the output register, then I3 through I5, and L0 through L7, among others would be available for a state register. So if the designer desires one state register, he or she could pick I3 as the state register.

This process of picking and initializing state registers. is referred to in FIGS. 16b, c, and d; 17b, c, and d; 18b, d, and f; and 22b, e and g.

Once all registers have been designated, the designer has established the "Register Set." In the example above, the Register Set would be as follows

| input | I0, I1 |
|---|---|
| output | I0 |
| calculation | I2 |
| state | I3 |

Once the Register Set has been picked, it is essential that all individuals be initialized with instructions that contain only references to valid members of the register set. See FIGS. 16c, 17c, 18d, and 22e. It is also essential that all changes to the individuals, including those made with genetic operators, modify the individual in such a way as to make sure that all register references in the modified instructions are to valid members of the Register Set.

Next, a solution or population of solutions is defined as an array of machine code entities. These entities are preferably "C" language functions which each include at least one directly executable (machine language) instruction. An instruction is directly executable by being constituted by the lowest level (native) binary numbers that are directly recognized by the control logic 44 and ALU 40 as valid instructions. These instructions do not require any compilation, interpretation, etc. to be executable.

The invention will be described further using the exemplary case in which the entities are "C" language functions. However, it will be understood that the invention is not so limited, and that the entities can be constituted by any data structures including machine code instructions that can alternatively be manipulated as data and executed by a higher level program.

Figure 5:
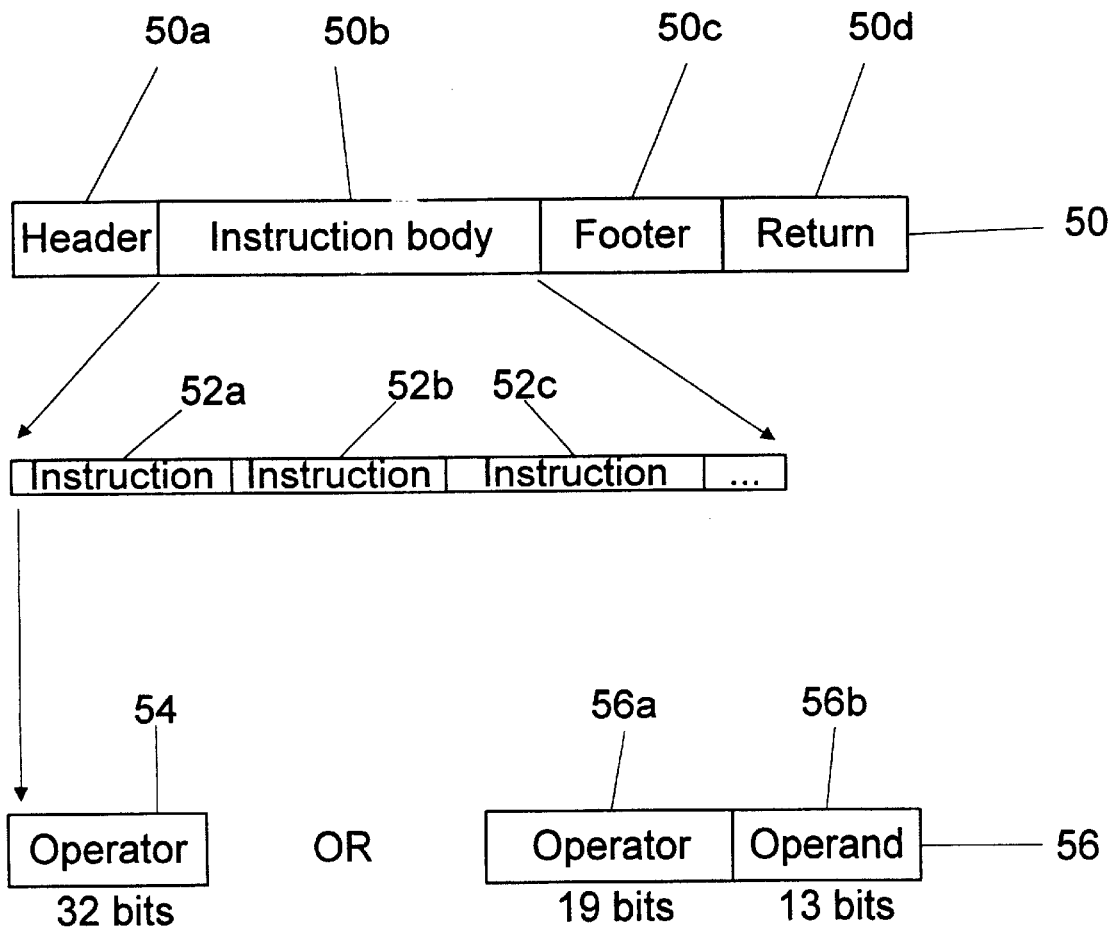
FIG. 5 is a diagram illustrating types of machine code instructions which are used by the preferred implementation of the invention.

After the function or array of functions has been defined, they are initialized by inserting valid machine code instructions in the appropriate locations therein. As illustrated in FIG. 5, a function 50 includes a header 50a, an instruction body 50b, a footer 50c, and a return instruction 50d.

The header 50a deals with administration which is required when entering a function. This normally involves manipulation of the registers 46, including passing arguments for the function to and from the various registers 46, saving the values in the registers that exist when the function is called and saving the address of the calling instruction so that, when the function is finished, program execution can begin from where it left off. The header can also be used to perform many other useful functions at the option of the designer including initializing registers and recovering the values of saved state registers. There can also be processing to ensure consistency of processor registers.

The header 50a is often constant and can be added at the beginning of the initialization of the individual machine code functions in the population. Mutation, crossover and any other operator that alters the entity must be prevented from changing this header field when they are applied to an individual function or the field must be repaired after the application of the operator.

The footer 50c is similar to the header 50a, but does the operations in the opposite order and "cleans up" after the function call by, among other things, restoring the registers to their state before the function call, recovering the output of the function, saving state registers, and many other useful functions at the option of the designer. The footer field must also be protected from change by the genetic or other alteration operators or the field must be repaired after the application of the operator.

The return instruction 50d forces the system to leave the function and return program control to the calling procedure via the program counter 42. If variable length programs are desired, the return instruction can be allowed to move within a range defined by a minimum and maximum program size. The return instruction must also be protected from change by the genetic or other alteration operators or the field must be repaired after the application of the operator.

The function body 50b includes at least one directly executable machine code instruction, for example instructions 52a, 52b and 52c. In the SPARC architecture, instructions have a fixed length of 32 bits. Instructions can be of two types: a first type which is designated as 54 and consists of a single 32 bit operator; and a second type which is designated as 56 and includes a 19 bit operator and a 13 bit operand. The operand represents data in the form of a numerical variable.

During the initialization step, the instruction bodies 50b of the functions 50 are filled with valid machine code instructions in a suitable manner. In the preferred implementation, the instructions are initialized from a Default Instruction Template Set, which contains partially "blank" instructions that contain information on what types of instruction is represented by a particular template. For example, is it an instruction that adds the values in two registers together or an instruction that adds a constant to a register value? What is left blank in the template is the register(s) to which the instruction applies and the constant values to be included in the instruction. The register references and the constant values may be added by methods such as those described in FIG. 18d. In FIG. 18d, instruction templates are randomly chosen and then the blanks are filled out so that the integer array constituting the individual contains only valid machine code instructions, taking care to limit the register references therein members of the Register Set. See FIGS. 17c, 18b and 18d. The instructions can be selected randomly, or using any suitable selection criterion.

In the most basic form of the invention, to limit the search space and to avoid complex control mechanisms and thus achieve maximum performance, the set of machine code instructions is limited in a number of ways. Only two registers and only those machine code instructions of two addressing mode types are used. All of them operate internally in the processor. However, more lengthy and complex implementations of the Register Set are described above and more complex implementations of the instruction set are within the spirit and scope of the invention.

The first addressing mode takes one argument from memory immediately afterwards and performs an operation on this argument and a processor register and leaves the result in a register. The other takes the operand from the second register, performs the operation and leaves the result in the first register.

With these kinds of instructions it is possible to reach the maximum processor throughput. The instructions are also constrained to those which take an integer as argument and return an integer. This however does not limit the problem space to mathematical problems or just to integer arithmetic. No control instructions such as jump instructions are allowed which means that no loops can be formed. These limitations reduce the complexity and thus execution time of the individual programs.

The basic instructions are listed in the following TABLE.

TABLE

| | |
|---|---|
| ADD (imm), ADD (reg2) | Add register one to an immediate operand or add register one to register two. |
| SUB (imm), SUB (reg2) | Subtract register one from an immediate operand or subtract register one from register two. |
| MUL (imm), MUL (reg2) | Multiply register one by an immediate operand or multiply register one by register two. |
| DIV (imm), DIV (reg2) | Divide register one by an immediate operand or divide register one by register two. |
| OR (imm), OR (reg2) | Logical OR of register one and an immediate operand or logical OR of register one and register 2. |
| AND (imm), AND (reg2) | Logical AND of register one and an immediate operand or logical AND of register one and register two. |
| XOR (imm), XOR (reg2) | Logical EXCLUSIVE OR of register one and an immediate operand or logical EXCLUSIVE OR of register one and register two. |
| SETHI | Set the high bits of a register, used when an operand bigger than 13 bits hits needs to be loaded into a register. |
| SRL | Logical shift right of register one to an immediate operand or logical shift right of register one a number of steps defined by register two. |
| SLL | Logical shift left of register one to an immediate operand or logical shift left of register one and register two. |
| XNOR | Logical EXCLUSIVE NOR of register one to an immediate operand or logical EXCLUSIVE NOR of register one and register two. |

These functions can and are used to implement other common processor functions. Loading of operands into registers is performed by the OR instruction, clearing a register is performed by the AND instruction, and the negation instruction can be performed by the XNOR instruction etc.

Figure 7:
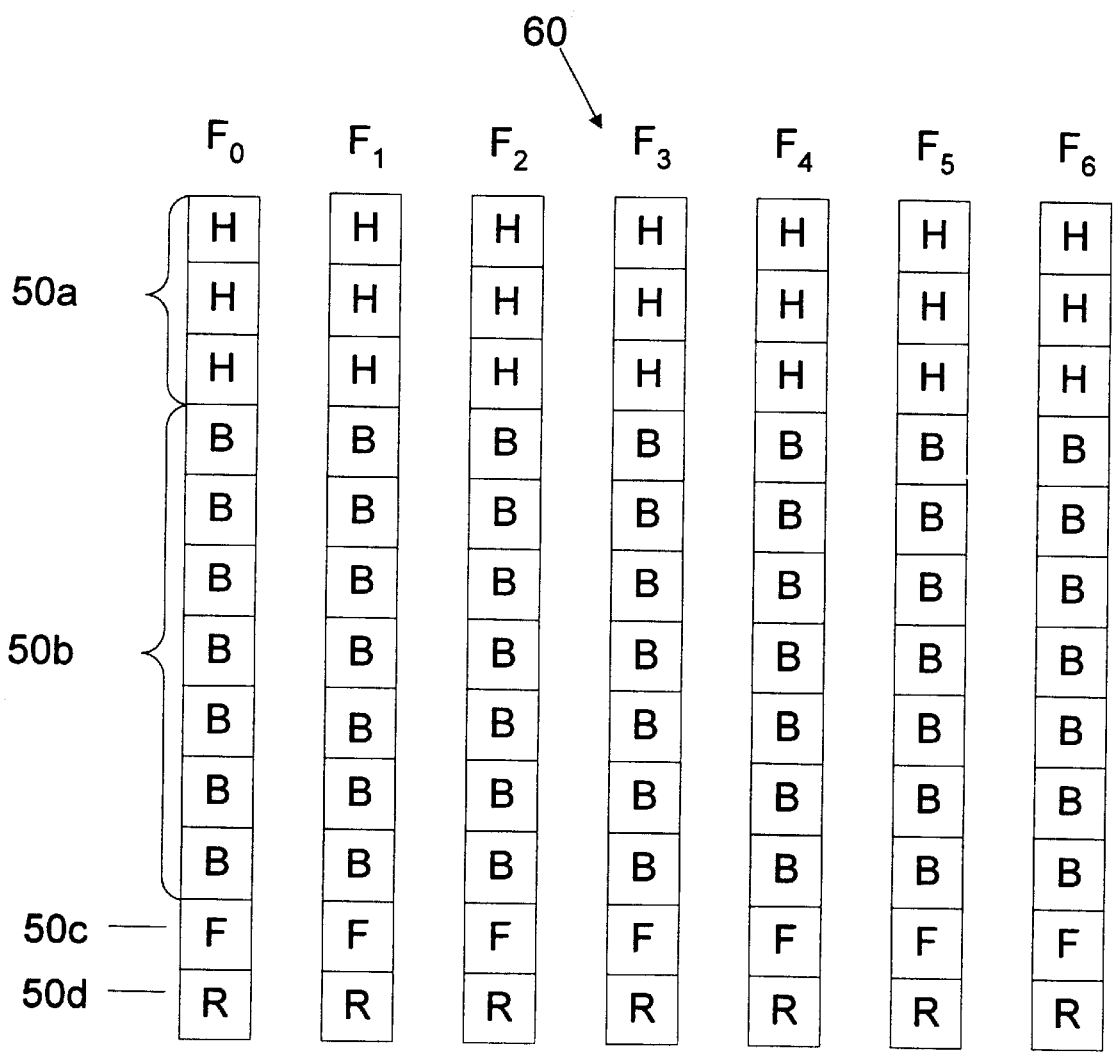
FIG. 7 is a diagram illustrating an array of functions that are used by the invention.

An exemplary array 60 of functions $F_0$ to $F_6$ is illustrated in FIG. 7. Each function includes a header 50a including instructions which are collectively designated as H, a body 50b including instructions B, a footer 50c including one or more instructions F, and a return instruction 50d which is indicated as R. Although the figure shows a length of three instructions for the header and one for the footer, those particular numbers are for illustrative purposes only.

The functions of the array 60 are illustrated as having a fixed length. However, the invention is not so limited, and the functions can have variable lengths.

Figure 8:
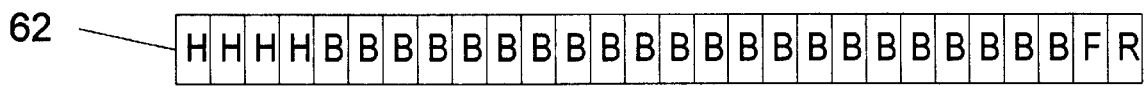
FIG. 8 is a diagram illustrating an alternative function that can be used by the invention.

FIG. 8 illustrates an alternative embodiment of the invention in which only a single solution in the form of a function 62 is provided. The function 62 is configured as a continuous array that contains valid machine code instructions, and is typically larger than the functions of the array 60. Such a single array would be a typical way to implement a system not involving machine learning but involving repeated computations on run time data. Certain machine learning approaches would use such a single structure also.

After the array is initialized, it is recast as a function type array, and the registers 46 are initialized with training data. The training data is normally part of a "training set", each element of which consists of one or more inputs and a desired output. The training set represents the problem that is to be solved. However, the invention is not so limited, and the training data can alternatively include testing, validation, prediction, or any other data suitable for machine learning or for repetitive calculations on run-time data.

For the machine learning applications, the purpose of the learning process is to train the functions using the training data by causing the functions to evolve until one of them produces outputs in the output register(s) in response to the training inputs in the input register(s) that closely approximate the desired outputs. The inputs are passed to the functions by initializing the registers with the training data as described elsewhere.

The functions of the array (or single function as illustrated in FIG. 8) are then executed with the training data as inputs. This execution causes the functions to produce outputs which are calculated in accordance with the instructions in the functions.

The output register or registers are then read, stored and compared with actual or desired outputs from the training data to calculate fitnesses of the functions. A function has a high fitness if its output closely approximates the desired output, and vice-versa. If the end criterion is met, the program ends.

If the end criterion is not met, the. array is recast or used as a data array (e.g. integer), and the instruction bodies 50b are altered. During this process, selected individual instructions are altered, replaced, added or deleted such that the altered function includes at least one valid machine code instruction. In other words, regardless of the manner in which a particular function is altered, the program ensures that the altered function will not include any invalid instructions.

The function(s) can be altered using any machine learning algorithm. One preferred methodology is evolution of machine code structures and machine code contents using crossover and mutation operators as will be described in detail below. However, the invention is not limited to any particular learning paradigm, nor is it limited to machine learning applications. The invention can be used, for example, to alter run-time data encoded in the machine code for the purpose of performing repetitive calculations on the run-time data.

As described above, it is important that the header, footer and return instruction will not be altered. This can be accomplished by protecting these elements from alteration using masking or other programming techniques. Alternatively, these elements can be allowed to be altered, and their initial states subsequently restored by repair or replacement. As another alternative, the instructions can be separated from the function, altered, and then returned to the function. There are other ways to protect the header, footer and return instructions from being altered, all of which are within the scope and spirit of this invention.

After performing the alteration, the program loops back to the step of recasting the array as a function and executing the function. The program iteratively repeats these steps until the end criterion is met.

The output of the system, when used for machine learning, is the function that has the highest fitness and thereby produces outputs that are closest to the desired outputs in response to the training inputs. The functions evolve as the result of the alterations, with one individual finally emerging as being improved to the highest fitness. The policy for selecting a "best individual(s)" is a matter of discretion by the designer. This system applies to any such policy.

As described above with reference to FIG. 3, the registers 46 include banks of input registers and output registers. These registers are used to pass data from a calling function to a called function, and are used to initialize the functions with training data as further described above.

More specifically, functions use their input registers to store variables. When a function calls another function, the Spare Architecture transfers the contents of its input registers to its output registers. The called function transfers the contents of the calling function's output registers into its own input registers, and operates on the data using its input registers. The opposite operation takes place when control is returned from the called function to the calling function.

Thus, the C program initializes a function with training data by storing the training data in its output registers and then calling the function. This method of initialization is preferred in the SPARC implementation, but the invention is not so limited. Other mechanisms for initializing functions with training data may be preferable with other computer architectures or for more complex application on the SPARC architecture.

An important feature of the present invention is to create and alter machine code functions as data, and execute the functions, from a high level language such as C. The following illustrates how this manipulation can be accomplished using the SPARC architecture.

As a simplified example, define a simple function that computes the sum of two input parameters and returns the result from this addition.
sum(a,b)=a+b This function can be translated by a compiler in the SPARC architecture to the following five assembly language instructions.
save
add \%i0, \%i1, \%i0
restore
ret
nop These five assembly language instructions are stored sequentially in memory as five 32-bit numbers having the following decimal equivalents.
2178940928
2953183257
2179465216
2177359880
16777216

The "save" instruction corresponds to the number 2178940928, and is a special machine code instruction in the SPARC architecture that saves the contents of the calling function's registers and transfers the parameters to the called function.

The "add" instruction adds the contents of input register "i0" to the contents of input register "i1", and stores the result in input register "i0". This instruction is coded as the integer 2953183257. Additions between other registers are represented by other integers.

The "restore" instruction restores the registers from the calling function and transfers the result from the addition (present in register i0) for access from the calling function.

The return instruction "ret" jumps back to the memory location from where the function was called.

The "nop" instruction is a no operation instruction that does nothing but "entertain" the processor while jumping back. This instruction could be left out if the order of the "restore" and "ret" instructions was reversed as will be described below.

Implementation of the present invention involves calling a machine code function as exemplified above from the C or other high level language. Adding the numbers 2 and 3 by calling the function sum(2,3) can be represented in assembly language as follows.
. . .
mov 2, \%o1
mov 3, \%o0
call_sum
nop These instructions are represented by these four integers:
2450530306
2484084739
2147483646
16777216

The first instruction stores the input parameter "2" in the output register %o1. The second instruction stores the input parameter "3" in the output register %o0.

The call instruction jumps to the location of the sum function and stores the address of itself in a register (output register %o7 by convention). This causes the program counter 42 to contain the address or location of the first instruction of the sum function. In other words, it contains the address of a memory location which stores the integer 2178940928 (save), and execution continues from here until the return instruction is encountered. After the return from the function, the output register %o0 will contain the result from the summation which can be used in further calculations.

When a save instruction is executed, it copies the contents of all output registers to an unused set of input registers. In this way the sets of input and output registers are used as a small internal stack for transfer of parameters and saving of register contents. The calling function stores the parameters of the called function in the output registers, the save instruction copies them to the input registers of the called function, and the restore instruction later copies all input registers of the called function into the output registers of the calling function. If the number of parameters is larger than the number of registers, the memory in the stack has to be used, as in most other processors.

In this manner, the input data (training data in the machine learning system and run-time data for computational entities) is passed to the array of functions (solutions) by storing the data in the output registers of the calling function, and then calling the array.

The "nop" does nothing but keep the processor occupied while jumping to the function. In a more effective but less clear version, the "mov 3, %o0" instruction is placed after the "call", which makes the processor execute this instruction "while" jumping to the function.

The following illustrates how to call the sum function defined above from the C-language.

typedef unsigned int(*function_ptr) ( )
unsigned int sumarray[ ]={2178940928, 2953183257, 2179465216, 2177359880, 16777216};
a=((function_ptr) sumarray)(2,3);

These three lines of C-code will compute the sum of 2 and 3 and put the result in a variable "a" by calling a function defined by the integers in the "sumarray".

The first line of code defines the function pointer type in C, because this type is not predefined in the C-language.

The second line of code declares an integer array containing integers for the instructions in the sum function as defined above.

The last line of code converts the address of the sumarray from a pointer to an integer array to a pointer to a function, and then calls this function with the arguments 2 and 3. The result from the function call is placed in variable "a".

This example illustrates the basic principles of manipulating binary programs. The sumarray can be altered like any other array as long as its contents are valid functions that can be called (executed) to evaluate the results of the algorithm.

The present method as implemented in the C programming language utilizes four instructions for initializing, altering, and executing machine code functions.

1. A first instruction that points to and designates machine code stored in a memory as data.

2. A second instruction that points to and designates machine code stored in the memory as at least one directly executable function.

3. A third instruction that alters machine code pointed to by the first instruction.

4. A fourth instruction that executes machine code pointed to by the second instruction.

Examples of the four instructions are presented below.

1. unsigned int * theintegerpointer;
   {declaration of integer pointer variable}
   theintegerpointer=(unsigned int*)
   malloc(Max_Individua_Size*Instruction_Size)
   {The instruction creating a pointer to an integer array}

2. Alternative 1
   - - -
   typedef unsigned int(*function_ptr) ( );
   {definition of the function_ptr type as a pointer to a function}
   function_ptr thefunctionpointer
   {declares thefunctionpointer as a variable of type function_ptr)
   thefunctionpointer=(function_ptr) theintegerpointer;
   {Instruction that typecasts theintegerpointer as a pointer to a function}
   Alternative 2
   - - -
   typedef unsigned int(*function_ptr) ( );
   {definition of the function_ptr type as a pointer to a function}
   Predicted_Output=((function_ptr) theintegerpointer) (Input Data Here);
   {the code "((function_ptr) theintegerpointer)" is an expression within an instruction that performs a typecast.}

3. theintegerpointer[2] =theintegerpointer[2]|1234;
   {XOR's the value in the second instruction with the integer 1234}
   or
   theintegerpointer[3]=16777216;
   {places an nop instruction in the third instruction slot, overwriting the previous instruction}

4. var_a =thefunctionpointer(Input Data Here);
   or
   Predicted_Output=((function_ptr) theintegerpointer) (Input Data Here);

In the CGPS embodiment of the invention which utilizes genetic crossover and mutation operations, the types of operations that can be performed depend on the type of instruction; more specifically if the instruction includes only an operator, or if it includes an operator and an operand. Examples of genetic crossover and mutation operations are illustrated in FIGS. 10 to 15.

Figure 10A:
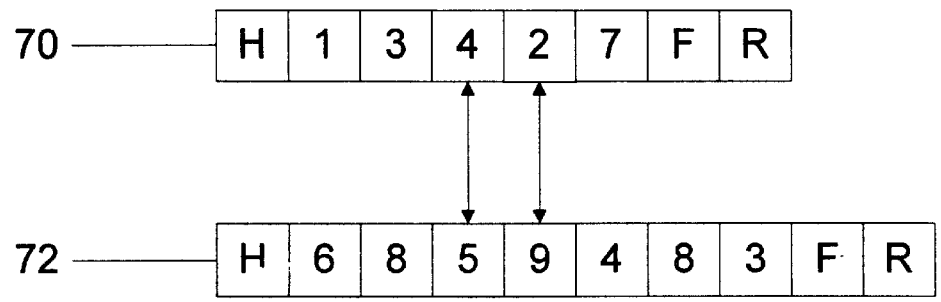
FIGS. 10a and 10b are diagrams illustrating a genetic uniform crossover operation.

FIGS. 10a and 1b illustrates a uniform crossover operation in which like numbers of adjacent complete instructions are exchanged or swapped between two functions. FIG. 10a illustrates two functions 70 and 72. Uniform crossover is performed by exchanging, for example, two instructions indicated as "4" and "2" in the function 70 for two instructions indicated as "5" and "9" in the function 72.

Figure 10B:
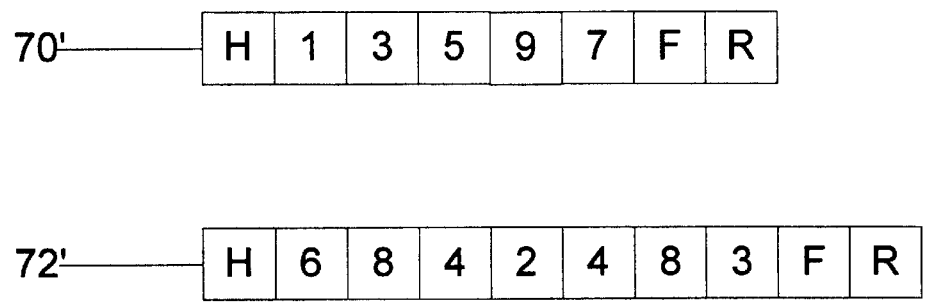

The results are illustrated in FIG. 10b. An altered function 70' includes all of its original instructions except for the "4" and the "2" which are replaced by the "5" and the "9" from the function 72. The function 72 includes all of its original instructions except for the "5" and the "9" which are replaced by the "4" and the "2" from the function 70.

Figure 11A:
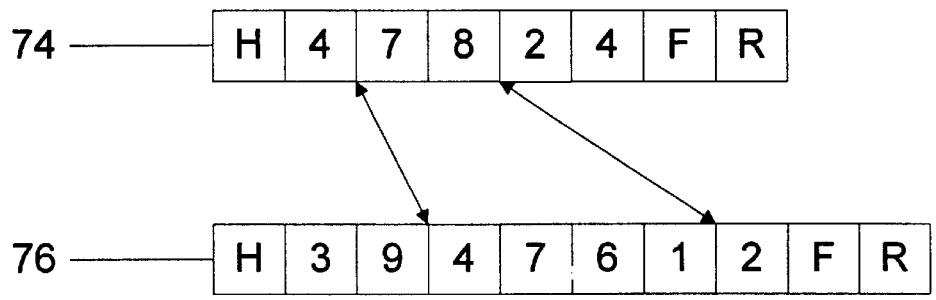
FIGS. 11a and 11b are diagrams illustrating a genetic 2-point "swap" crossover operation.
Figure 11B:
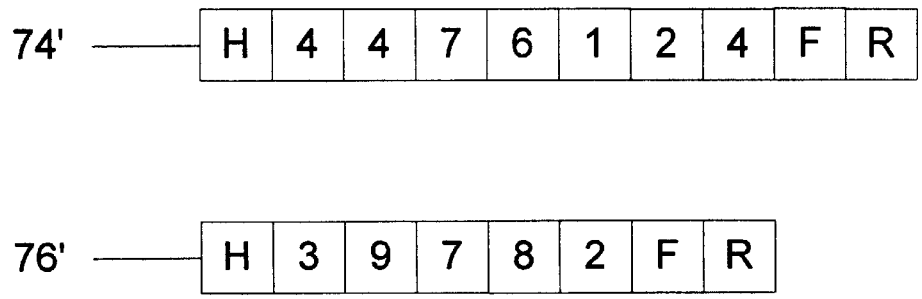

FIGS. 11a and 11b illustrate "2-point crossover", in which blocks of different numbers of complete instructions are exchanged between two functions. In this case, two points are selected in each function, and all of the instructions between the two points in one function are exchanged for all of the instructions between the two points in the other function.

In the example of FIG. 11a, instructions indicated as "7" and "8" in a function 74 are exchanged for instructions "14", "7", "6", and "1" in a function 76 to produce functions 74' and 76' as illustrated in FIG. 11b.

Figure 12A:
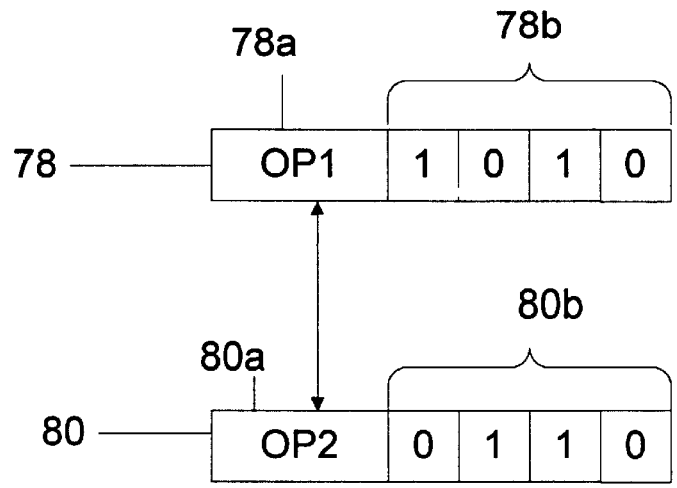
FIGS. 12a and 12b are diagrams illustrating a genetic operator crossover operation.
Figure 12B:
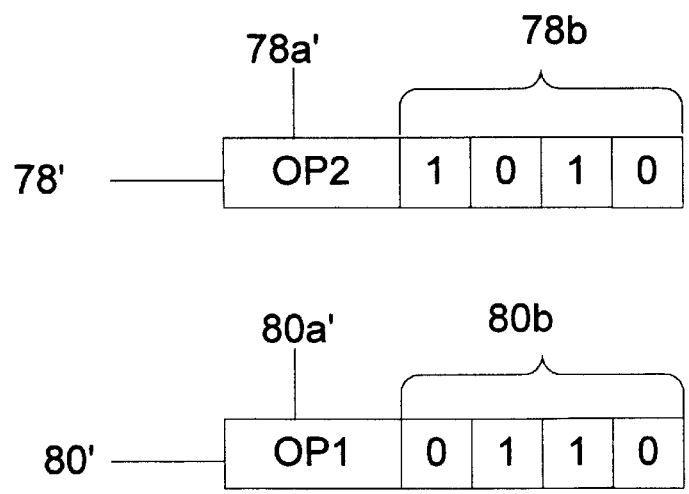

FIGS. 12a and 12b illustrate how components of functions can be crossed over. In FIG. 12a, two instructions 78 and 80 have operators 78a and 80a and operands 78b and 80b respectively. In this case, the operator 78a of the function 78 which is indicated as "OP1" is exchanged for the operator 80a of the function which is indicated as OP2. The result of the crossover is illustrated in FIG. 12b.

Figure 13A:
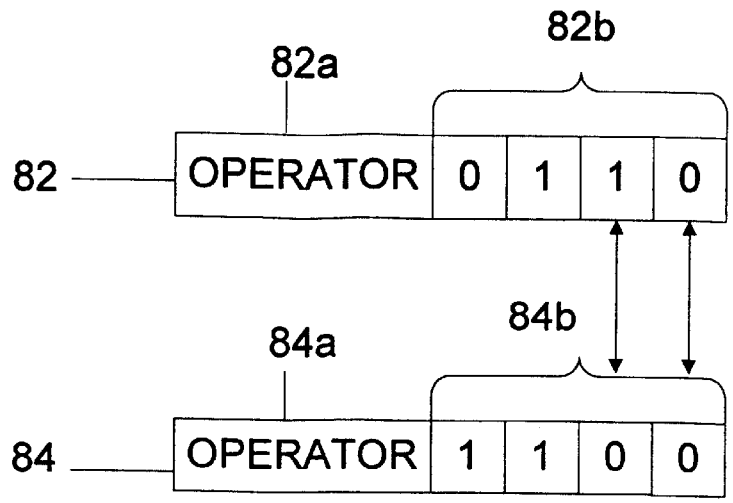
FIGS. 13a and 13b are diagrams illustrating a genetic operand crossover operation.
Figure 13B:
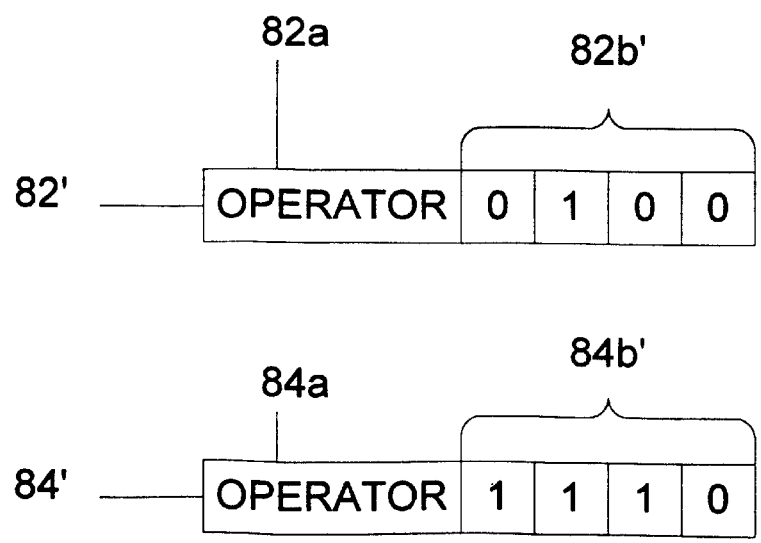

FIGS. 13a and 13b illustrate an example of how uniform crossover can be performed between all or parts of operands. In FIG. 13a, a function 82 has an operator 82a and an operand 82b, whereas a function 84 has an operator 84a and an operand 84b. The rightmost two bits of the operand 82b are exchanged for the rightmost two bits of the operand 84b to produce functions 82' and 84' with operands 82' and 84' as illustrated in FIG. 13b.

Figure 14:
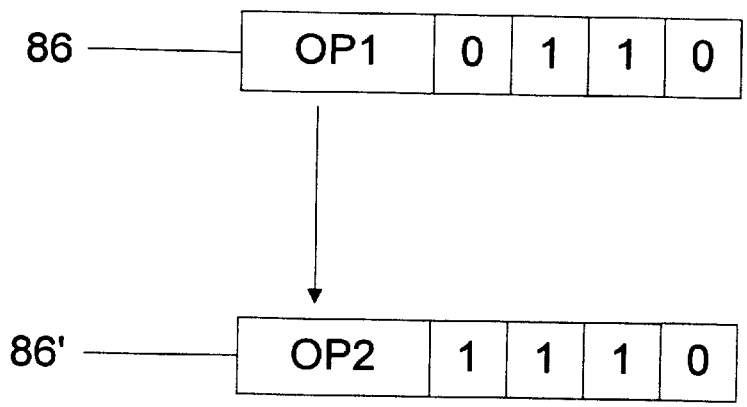
FIG. 14 is a diagram illustrating a genetic operator mutation operation.

FIG. 14 illustrates how the operator of a function 86 can be mutated. In this case, the function 86 initially has an operator which is indicated as OP1, and is altered or replaced so that a mutated function 86' has an operator OP2. It is necessary that both operators OP1 and OP2 be valid machine code instructions in the set of instructions used by the system.

Figure 15:
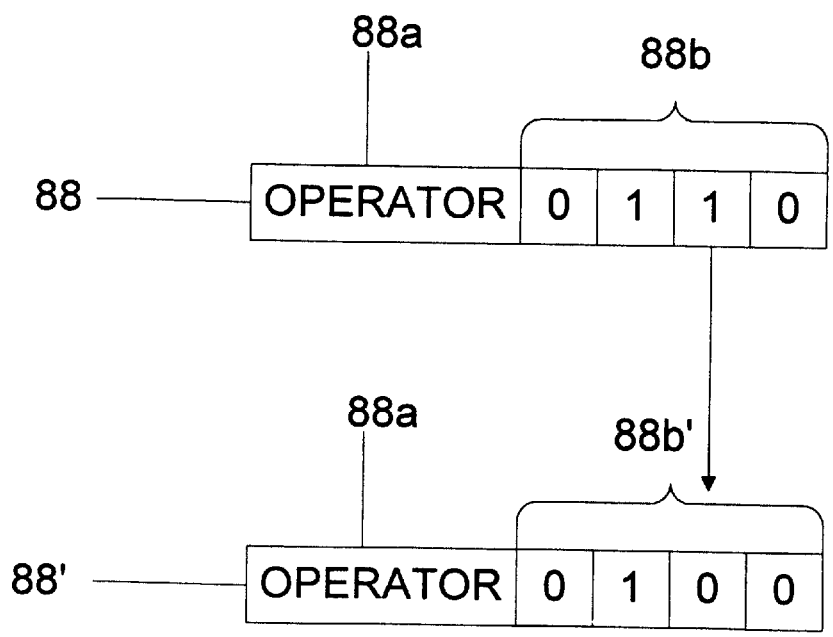
FIG. 15 is a diagram illustrating a genetic operand mutation operation.

FIG. 15 illustrates how all or part of an operand can be mutated. A function 88 has an operator 88*a* and an operand 88*b*. In this example, the second least significant bit of the operand 88 is changed from "1" to "0" or "flipped" to produce an altered function 88' having an altered operand 88*b*'.

As set forth above, the present invention can be applied to any applicable problem by using any suitable machine learning algorithm. The principles described in detail above can be applied to implement a particular application and computing environment.

Figure 9:
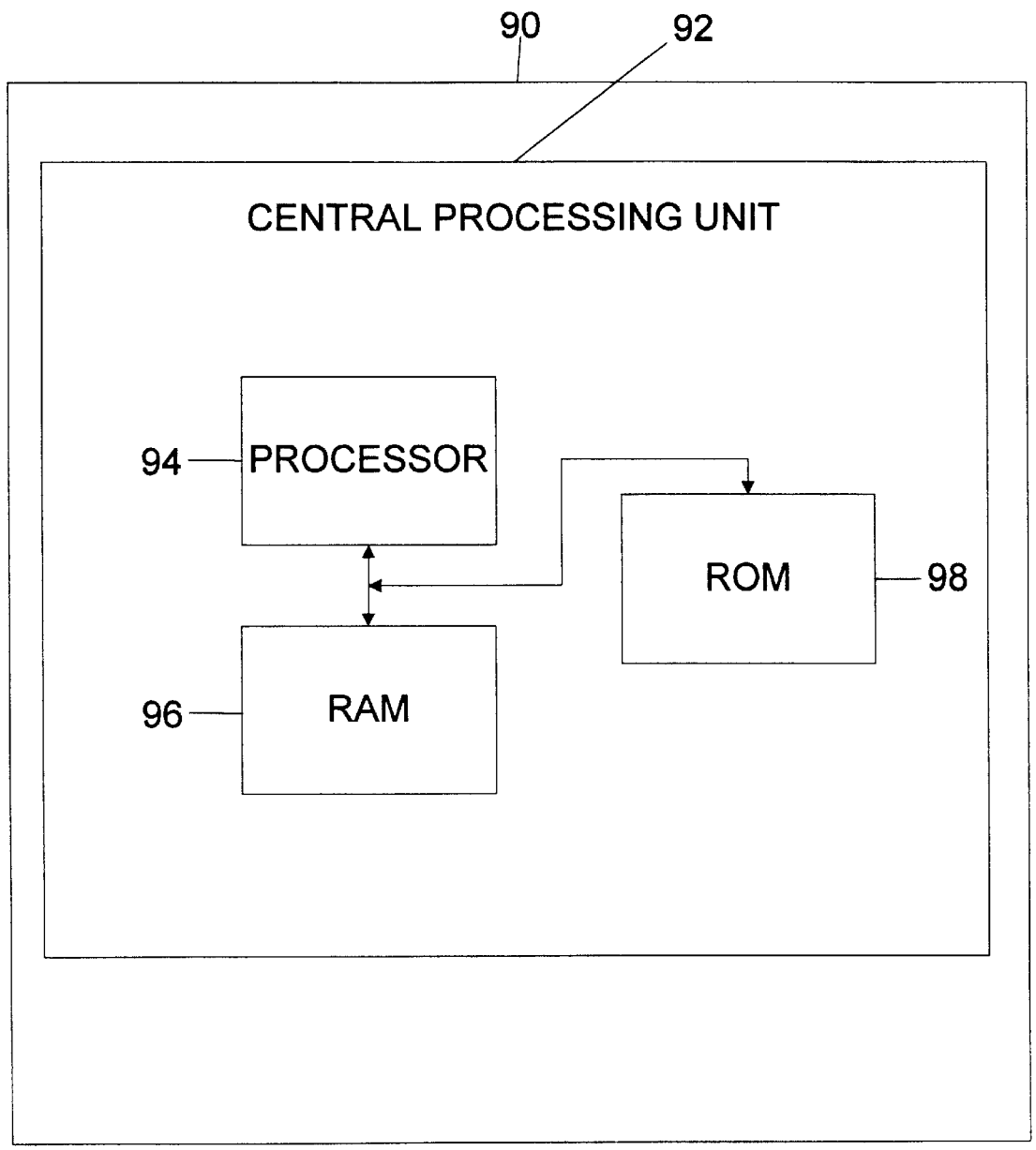
FIG. 9 is a diagram illustrating the present machine learning system as implemented on a specially designed integrated circuit chip.

In addition to implementing the present machine learning system on a general purpose computer as described above, it is possible to implement part or all of the system as a specially designed integrated circuit chip 90 such as an Application Specific Integrated Circuit (ASIC) which is symbolically illustrated in FIG. 9.

The chip 90 comprises a Central Processing Unit (CPU) 92 including a processor 94 and a RAM 96. The processor 94 includes normal CPU microcode plus microcode implementing storage, initialization, creation, and alteration operators. The RAM 96 is preferably a high speed cache memory which the processor 94 can access at a much higher speed than the processor 94 can access off-chip memory.

The RAM 96 can include a number of registers, or can have a conventional address based architecture. Preferably, the population of functions (solutions) is stored in the RAM 96 for rapid manipulation and execution by the processor 94. Other alternatives include additionally storing the high level program in the RAM 96. As yet another alternative, the chip 90 can include a ROM 98 for storing, for example, a kernel of the high level program.

The on chip memory, alternatively could be registers dedicated to storing individuals or high speed, on chip RAM that is not a cache. In addition, the CPU could alternatively execute machine learning operators such as crossover and mutation or any other operators that initialize, create, evaluate or alter individuals in microcode or in high speed ROM.

Figure 6:
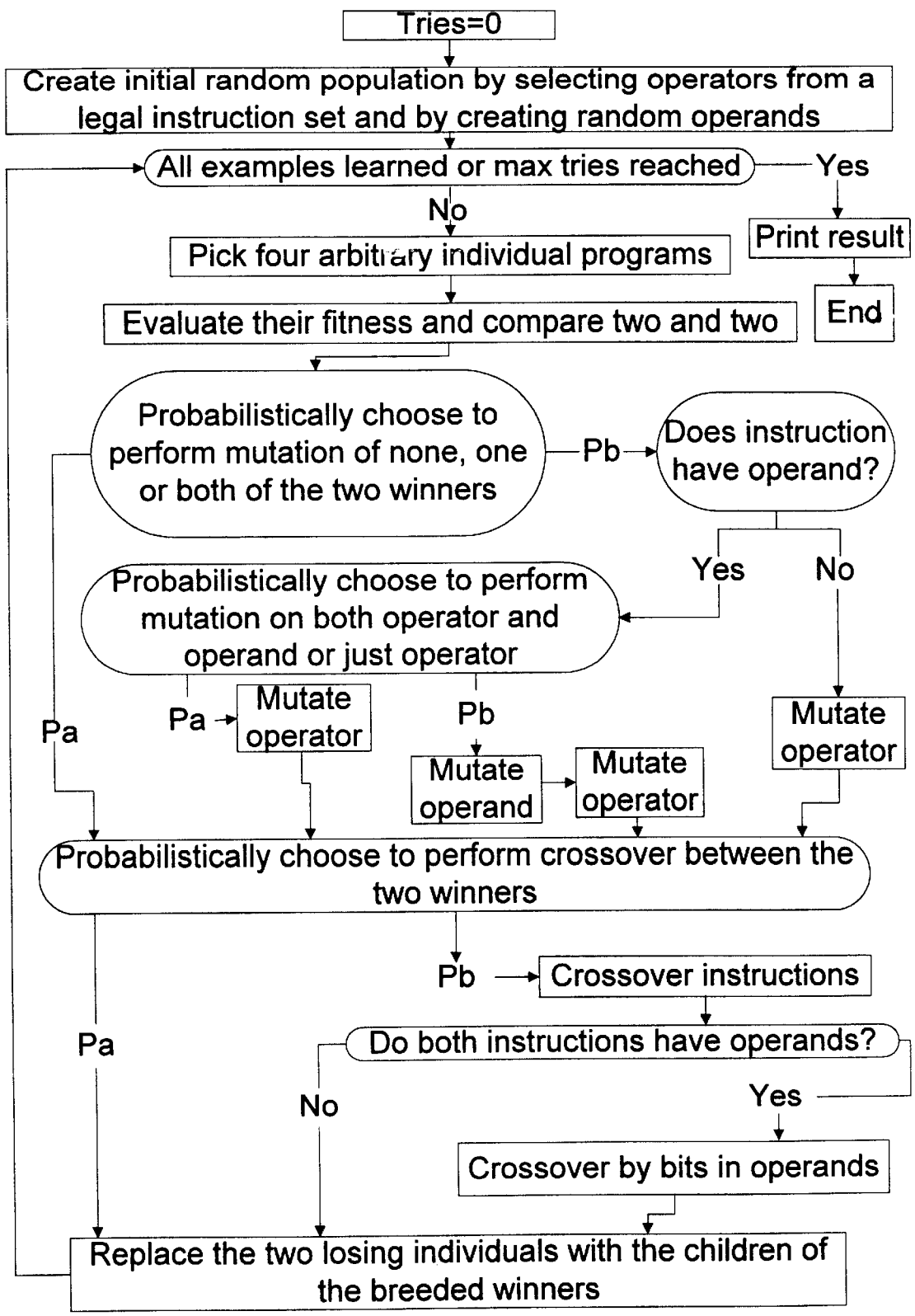
FIG. 6 is a detailed flowchart illustrating a specific embodiment of the preferred implementation of the invention.

A preferred implementation of the invention evolves machine code structures and machine code contents as a way of learning the solution to a problem. A detailed flowchart of this system is presented in FIG. 6 as an example for reference purposes.

The program utilizes a small tournament in combination with genetic crossover and mutation operations, and includes the following basic steps.

1. Randomly pick four individuals from the population.
2. Evaluate them in pairs, two at a time according to their fitness.
3. Let the two winners breed.
4. Replace the losers with the children of the two winners.
5. Repeat step 1–4 until the success predicate is true or the maximum number of tries is reached.

The flowchart is believed to be self-explanatory except for probabilistically choosing one operation or another. These choices are analogous to flipping a coin, and can be implemented using, for example, a random number generator which generates random numbers between 0 and 1. If the number is 0.5 or less, a first probibilistic branch Pa is taken. If the number is higher than 0.5, a second probibilistic branch Pb is taken. Choices having more than two options can be implemented by dividing the range between 0 and 1 into a number of subranges equal to the number of choices.

FIGS. 16*a* to 16*d* are further provided for reference, and in combination constitute a detailed flowchart of the generic machine learning system of the present invention. The entries in the flowchart are believed to be self-explanatory, and will not be described in detail.

Figure 16C:
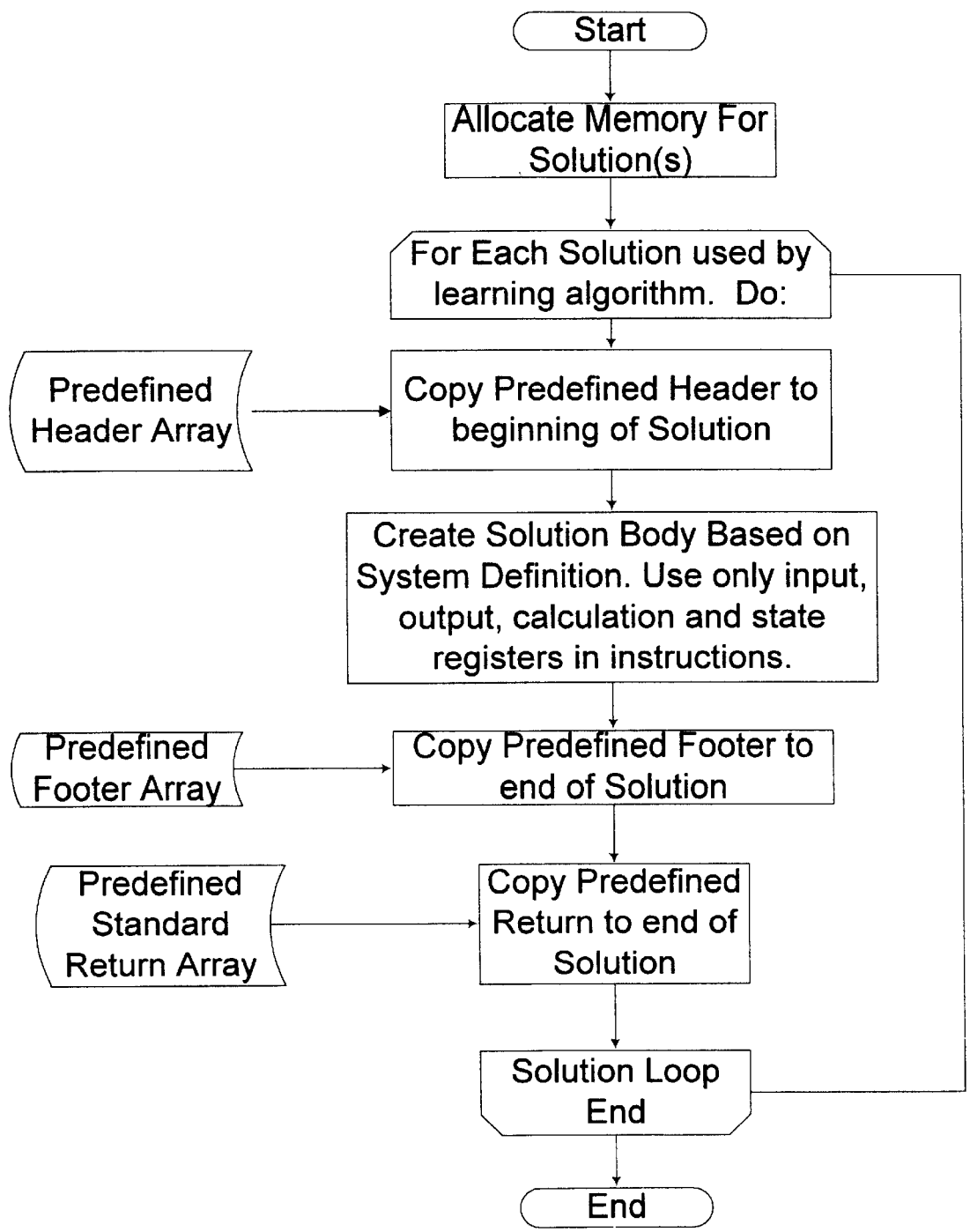

FIG. 16*a* outlines the general operation of the system. FIG. 16*b* sets forth the details of the block entitled "SYSTEM DEFINITION" in FIG. 16*a*. FIG. 16*c* sets forth the details of the block entitled "INITIALIZATION" in FIG. 16*a*, whereas FIG. 16*d* sets forth the details of the block entitled "LEARN FOR ONE ITERATION in FIG. 16*a*.

FIGS. 17*a* through 17*d* are further provided for reference, and in combination constitute a detailed flowchart of the application of the invention to any computation problem that involves repeated access to run-time data. The entries in the flowchart use the terminology of this application and are believed to be self explanatory in the context of this application, and will not be described in detail.

Figure 18A:
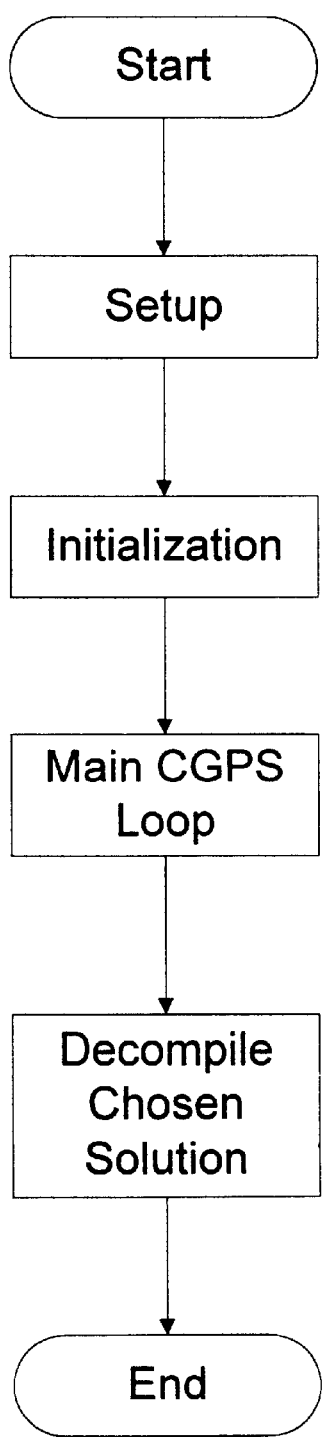
FIGS. 18a to 18h in combination constitute a flowchart illustrating an machine learning implementation of the system which induces machine code functions where the Learned Elements are machine code instruction structure and machine code instruction contents. This is one implementation of what is referred to loosely as Compiling Genetic Programming Systems.
Figure 18B:
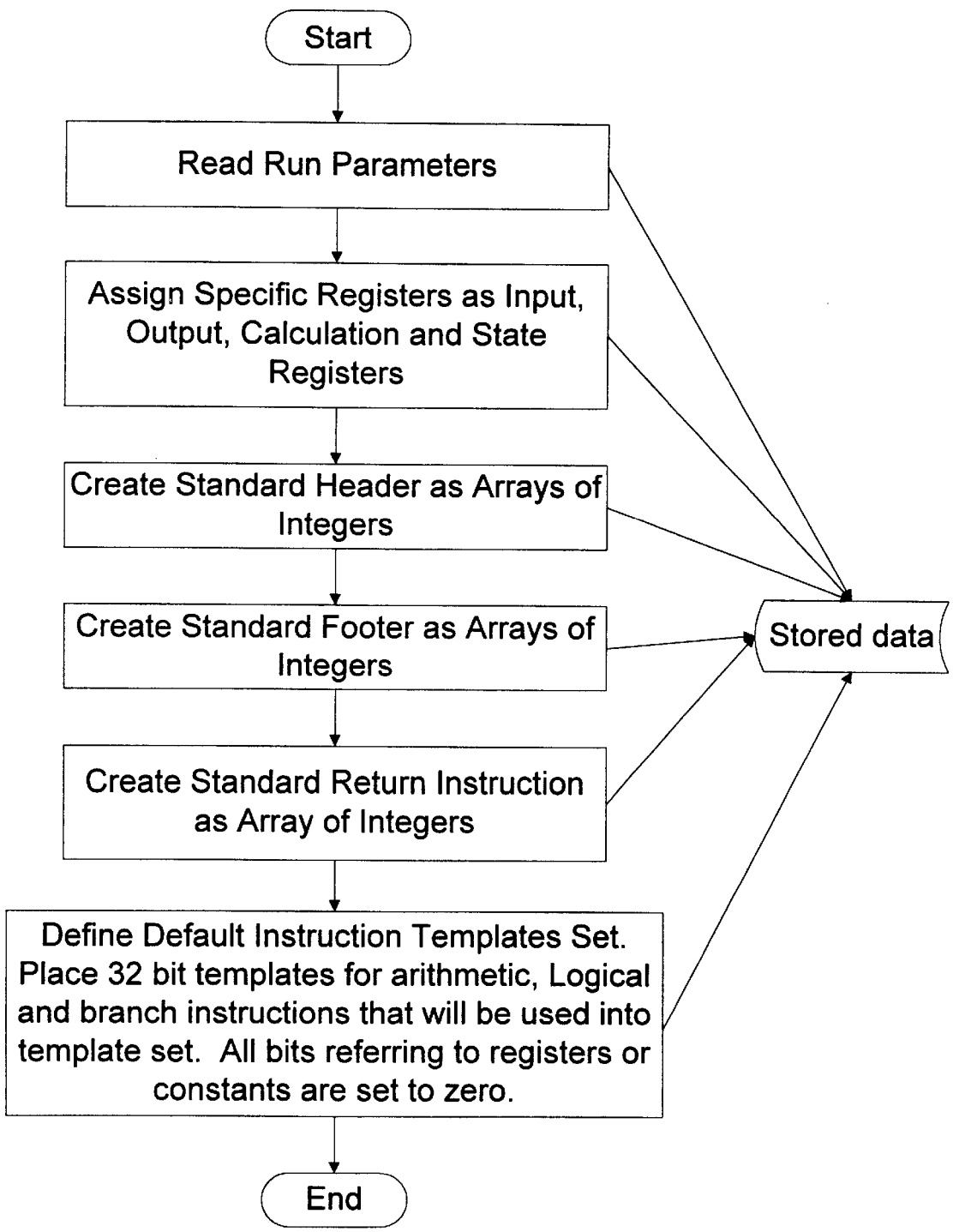
Figure 18C:
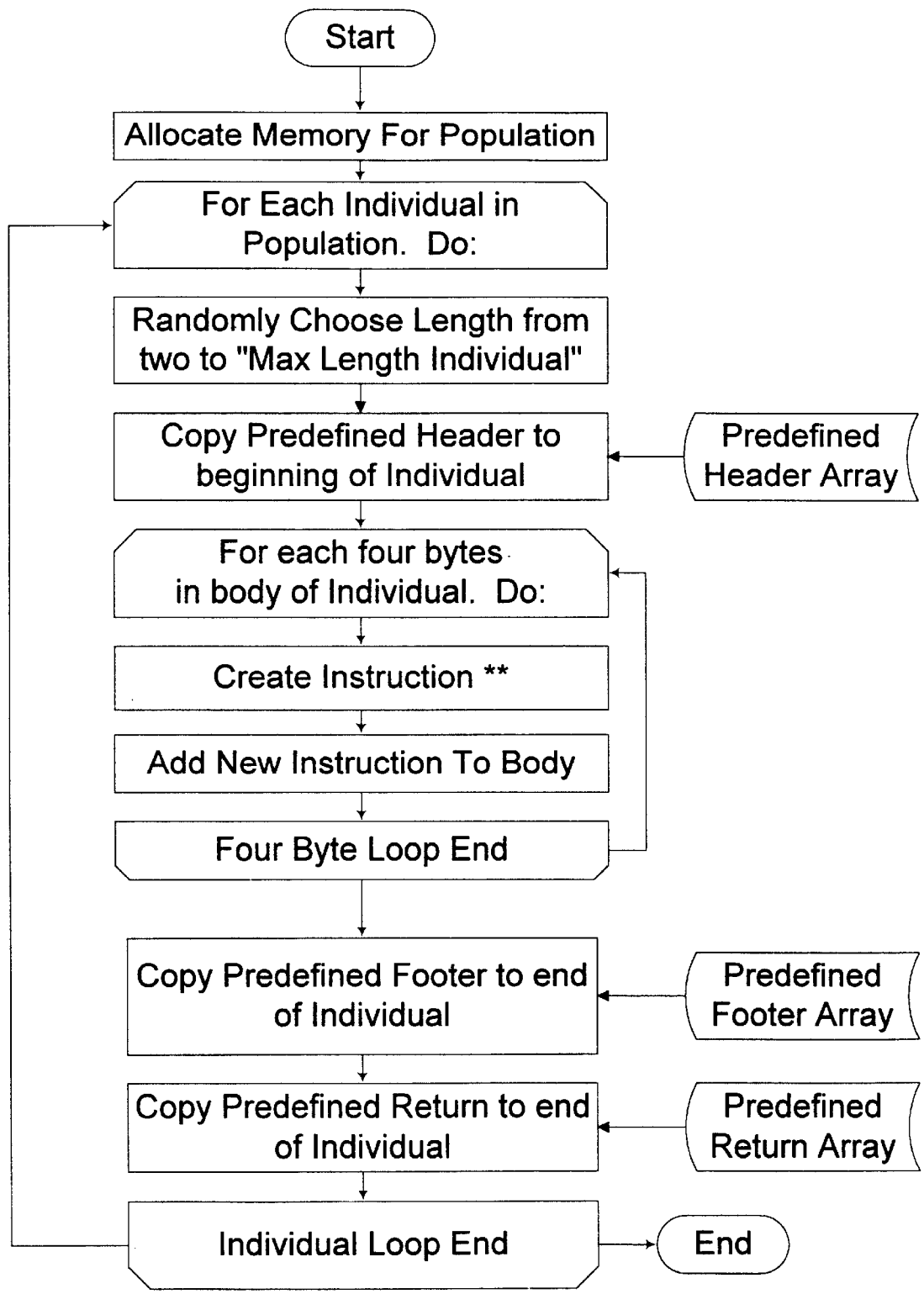
Figure 18D:
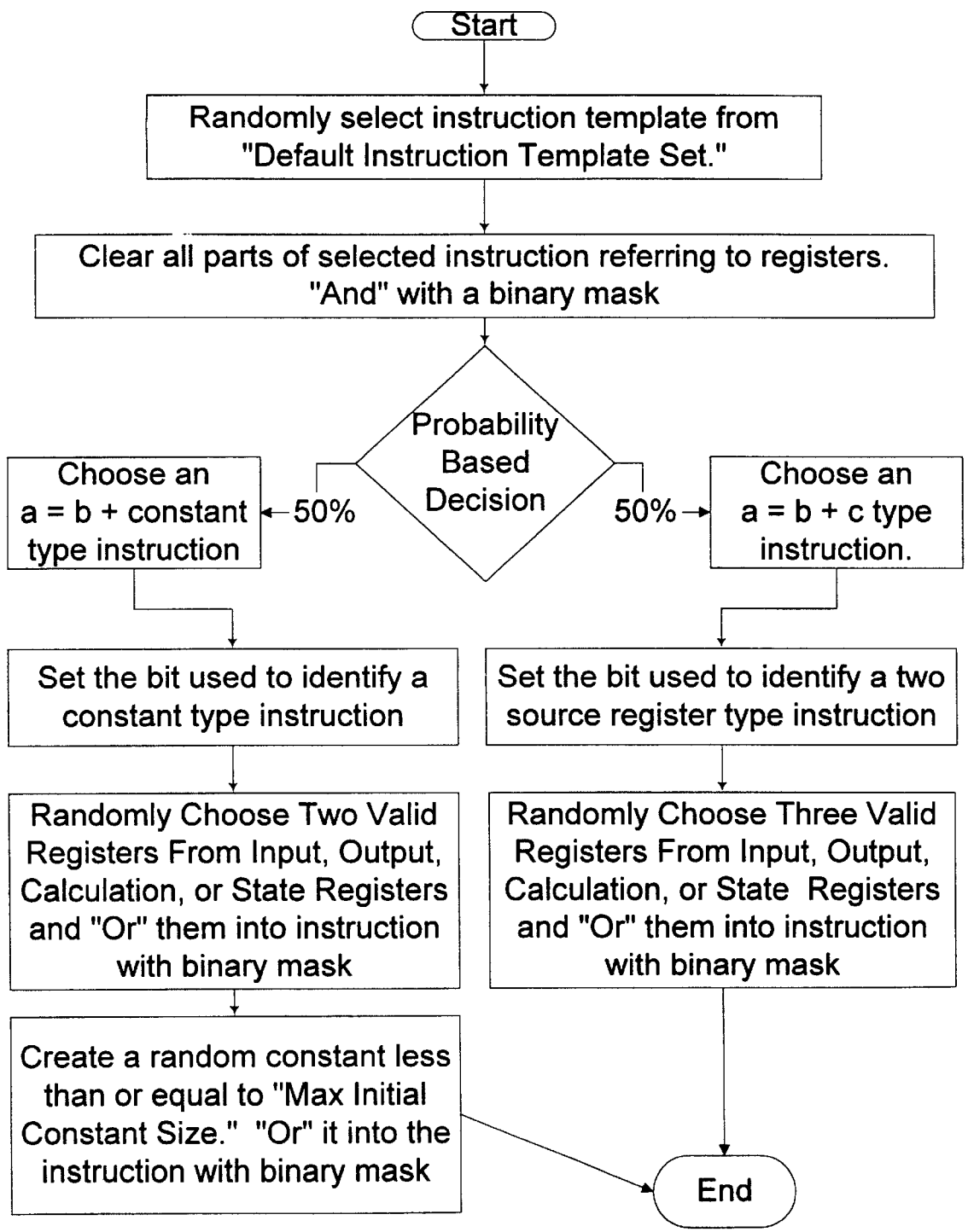
Figure 18E:
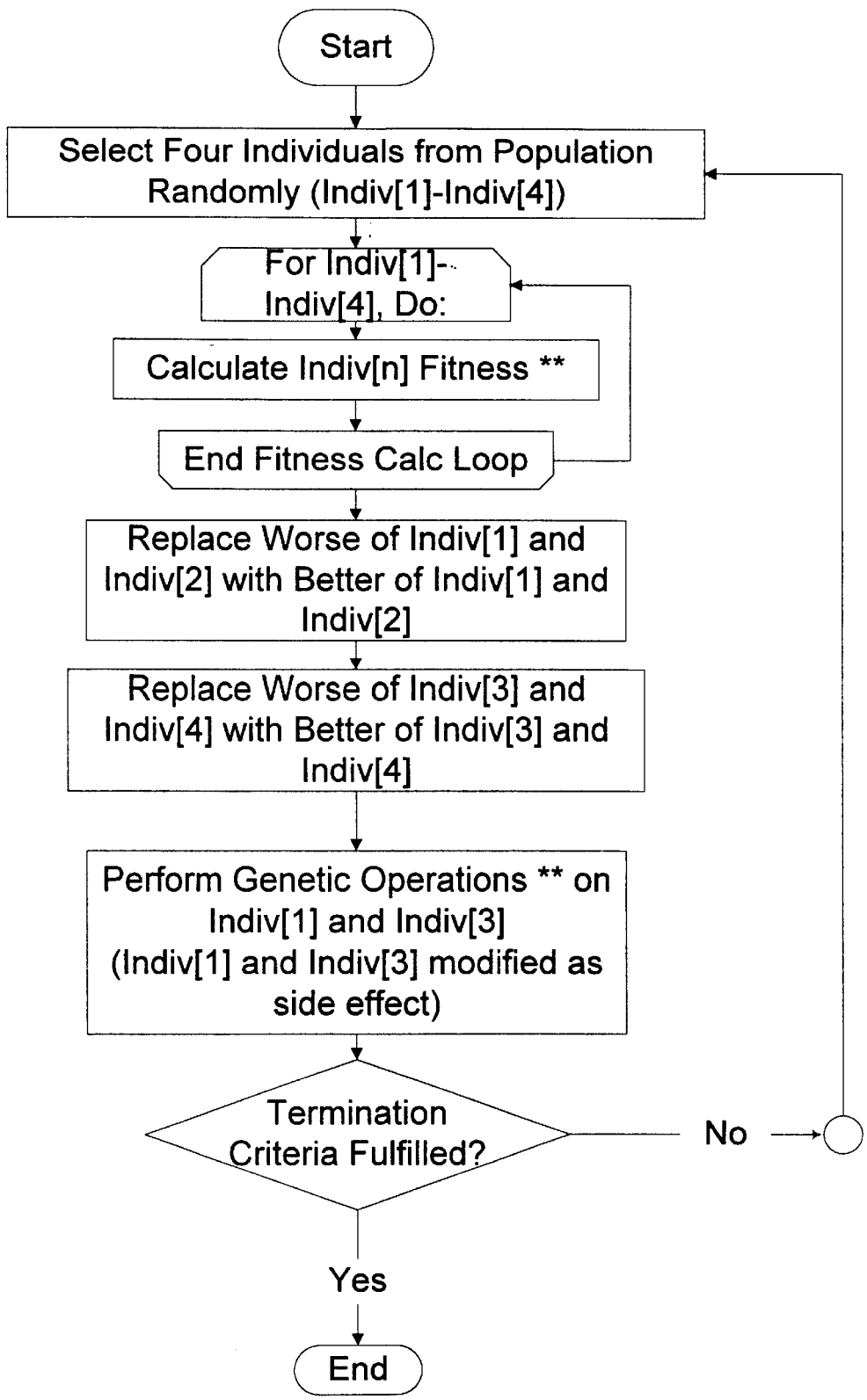
Figure 18F:
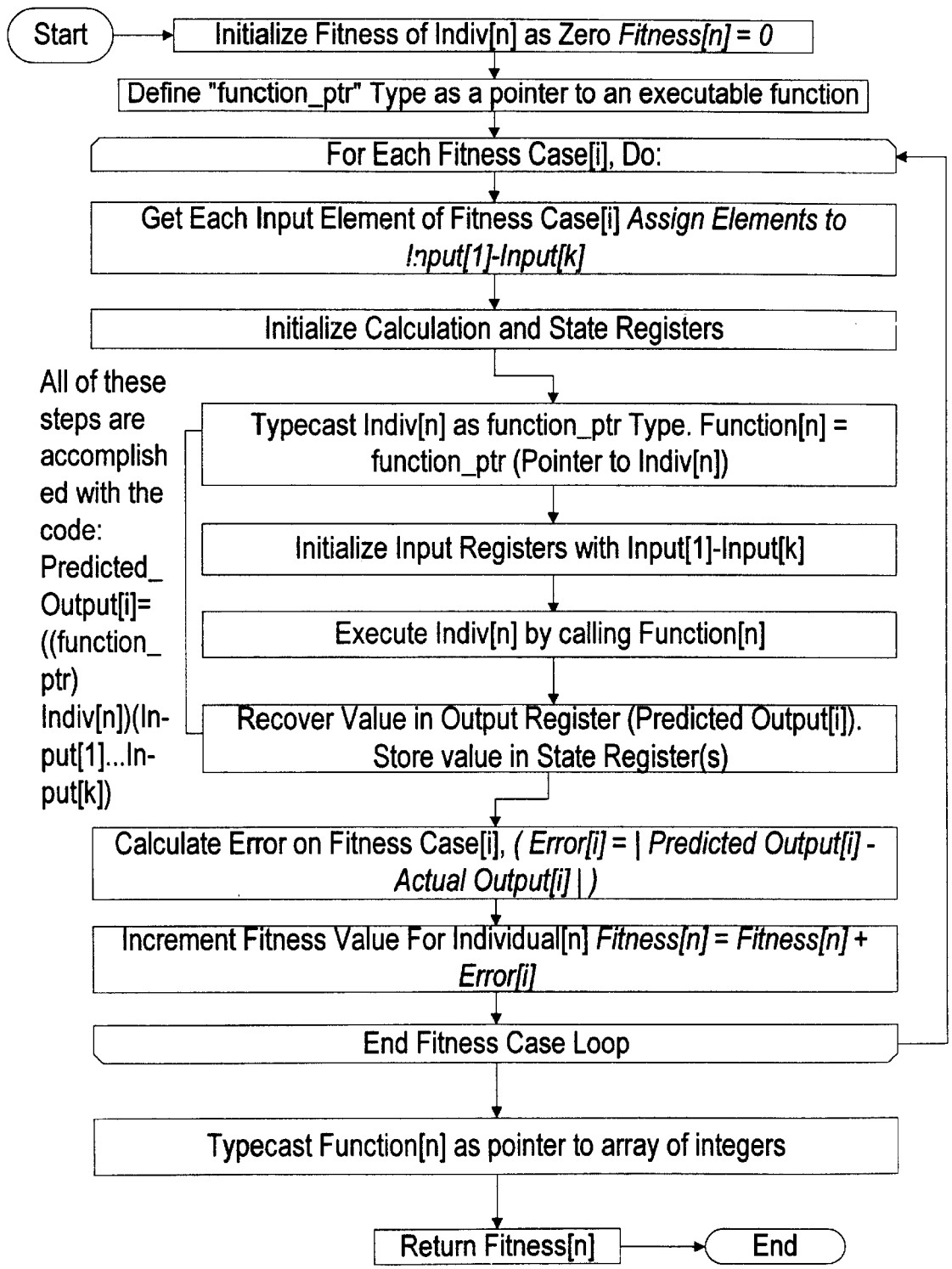
Figure 18G:
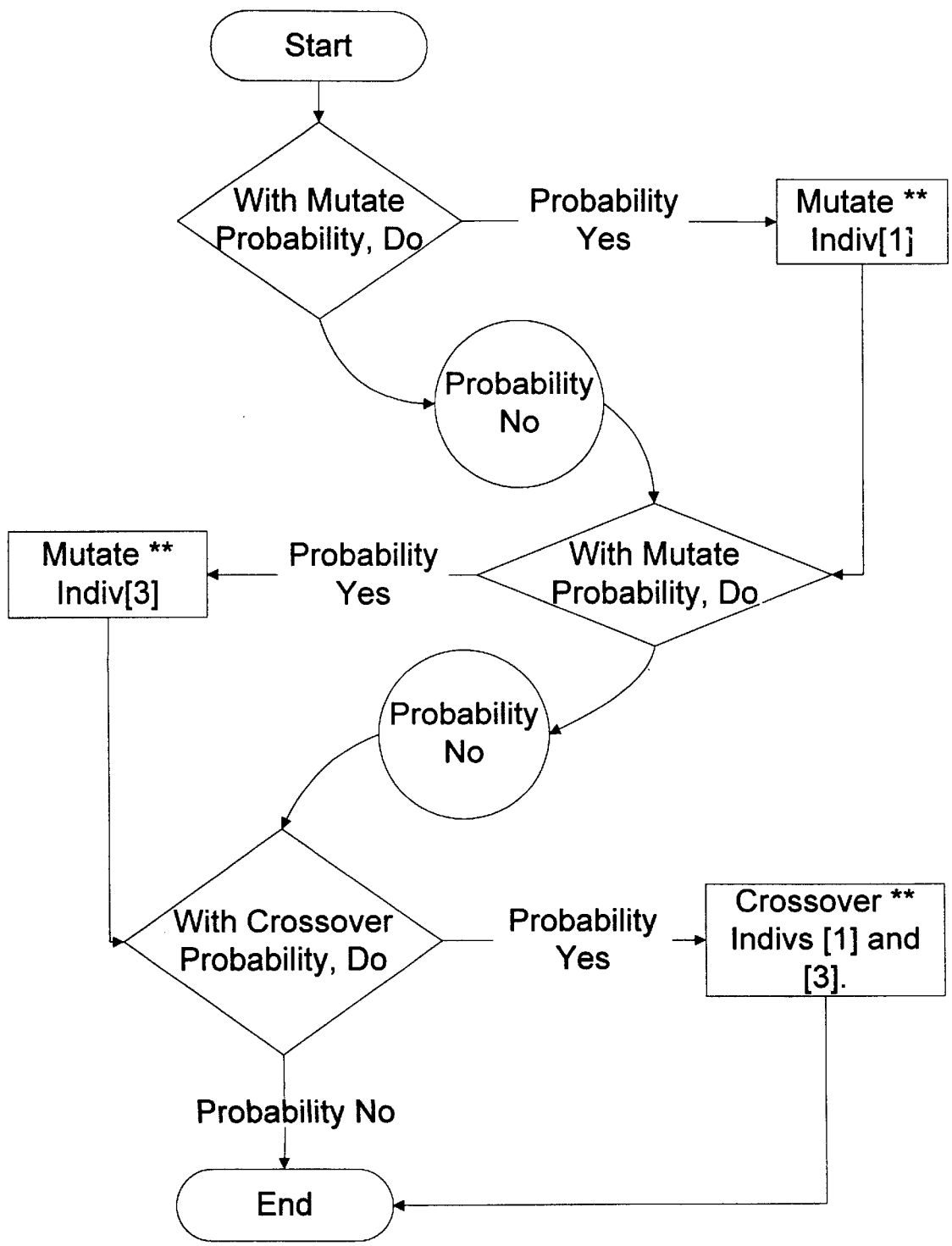

FIGS. 18*a* through 18*g* are further provided for reference, and in combination constitute a detailed flowchart of the application of the invention as a system that induces the solution to problems by learning the structure and content of machine code entities. The entries in the flowchart use the terminology of this application and are believed to be self explanatory in the context of this application, and will not be described in detail. The mutation and crossover operators referred to in said FIG. 18*g* are the operators described elsewhere in this application.

FIG. 16*a* outlines the general operation of the system when it is applied to a generic machine learning problem.

FIG. 16*b* sets forth the details of the block entitled "SYSTEM DEFINITION" in FIG. 16*a*. The steps in this figure show, inter alia, what steps to take to analyze any machine learning problem to permit the designer to encode entities that contain both the Learned Elements and the Conversion Elements into a machine code entity that can be created, initialized, stored, modified and executed by the means described in this application. Numeric or other values may be encoded in the machine code as constants.

Figure 16D:
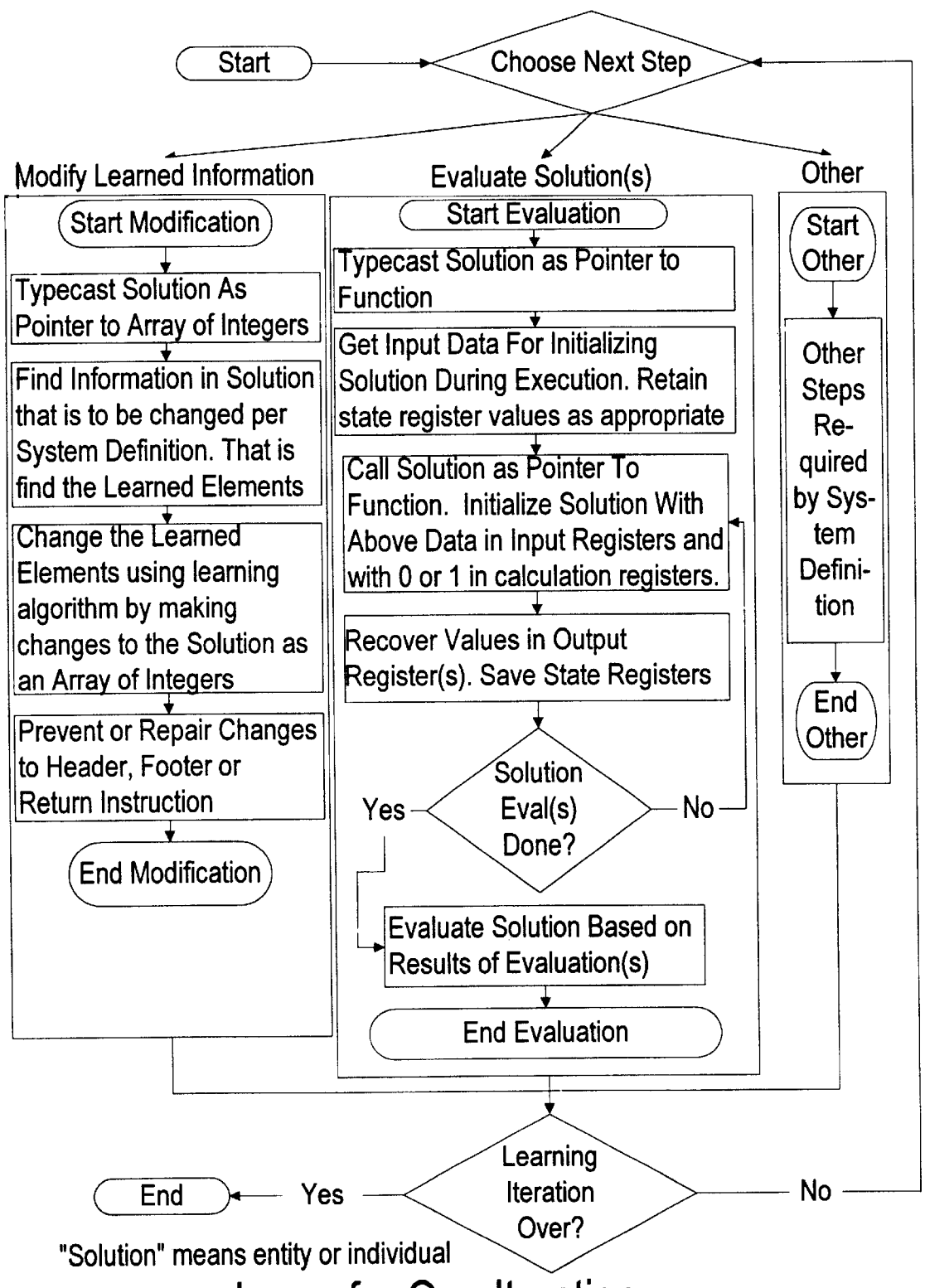

FIG. 16*c* sets forth the details of the block entitled "INITIALIZATION" in FIG. 16*a*. This Figure sets forth, inter alia, a set of steps that will result in the creation of one or more learning entity or entities that will be the learning entity or entities in the machine learning system that is being implemented using the present invention. Such entity or entities will be created, stored, initialized, modified and executed by the methods set forth herein but when and how such steps take place will be set according to the requirements of the particular machine learning algorithm being implemented, as shown in FIG. 16*d*. It is important to note that the entity created according to the procedure outlined in FIG. 16*c* ordinarily includes not only the Conversion Elements but also contains the first set of Learning Elements for evaluation. Should said first set not be available when the initialization occurs, then the entity should be initialized with dummy values in the places in the instructions where the real Learning Elements will reside. Then, when the first set of real Learning Elements are known, it can be placed into those places using the procedure under "Start Modification" in FIG. 16*d*.

FIG. 16*d* sets forth the details of the block entitled "LEARN FOR ONE ITERATION" in FIG. 16*a*. This figure shows, inter alia, how to modify and how to evaluate an entity when the particular machine learning algorithm being implemented calls for either of those steps. The particular implementation of an application of the invention to a particular machine learning problem will vary substantially from problem to problem and among various machine learning systems. So this Figure is general in terms of when to evaluate the entity (referred to in FIGS. 16*a*–16*d* as a "solution") and when to modify the entity. Because of the breadth of various approaches to machine learning, this Figure indicates that steps other than the ones shown specifically are appropriate and that systems including such other steps are within the spirit and scope of the present invention.

Figure 17A:
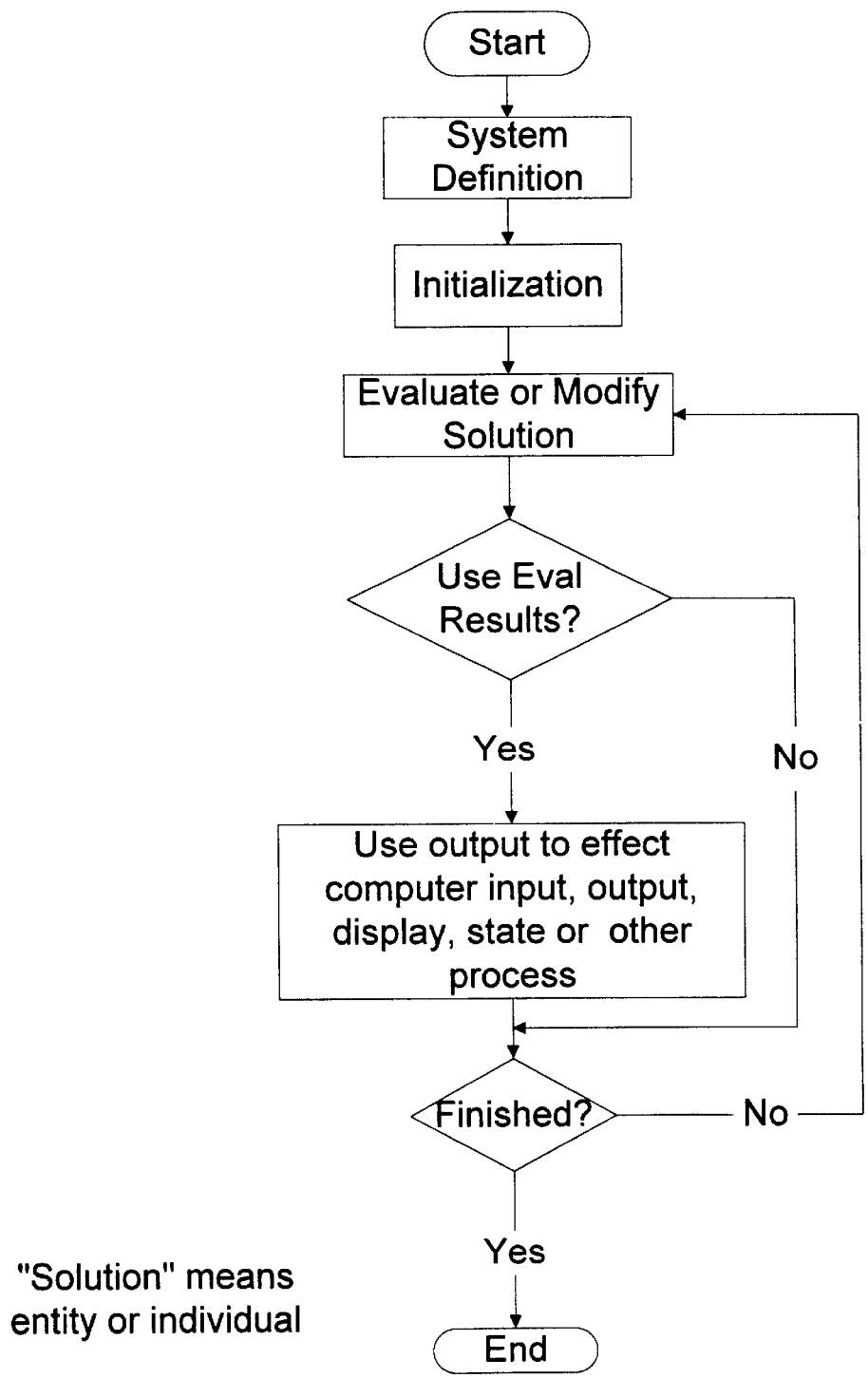
FIGS. 17a to 17d in combination constitute a flowchart illustrating a generic implementation of the invention to repetitive computations based on run time data.

FIG. 17a outlines the general operation of the invention when the invention is to be used to perform repeated computations on run-time data. This application of the invention could be handled in other and alternative manners both in the general matters set forth in FIG. 17a and in 17b through 17d and those other and alternative manners are within the scope and spirit of this invention.

Figure 17B:
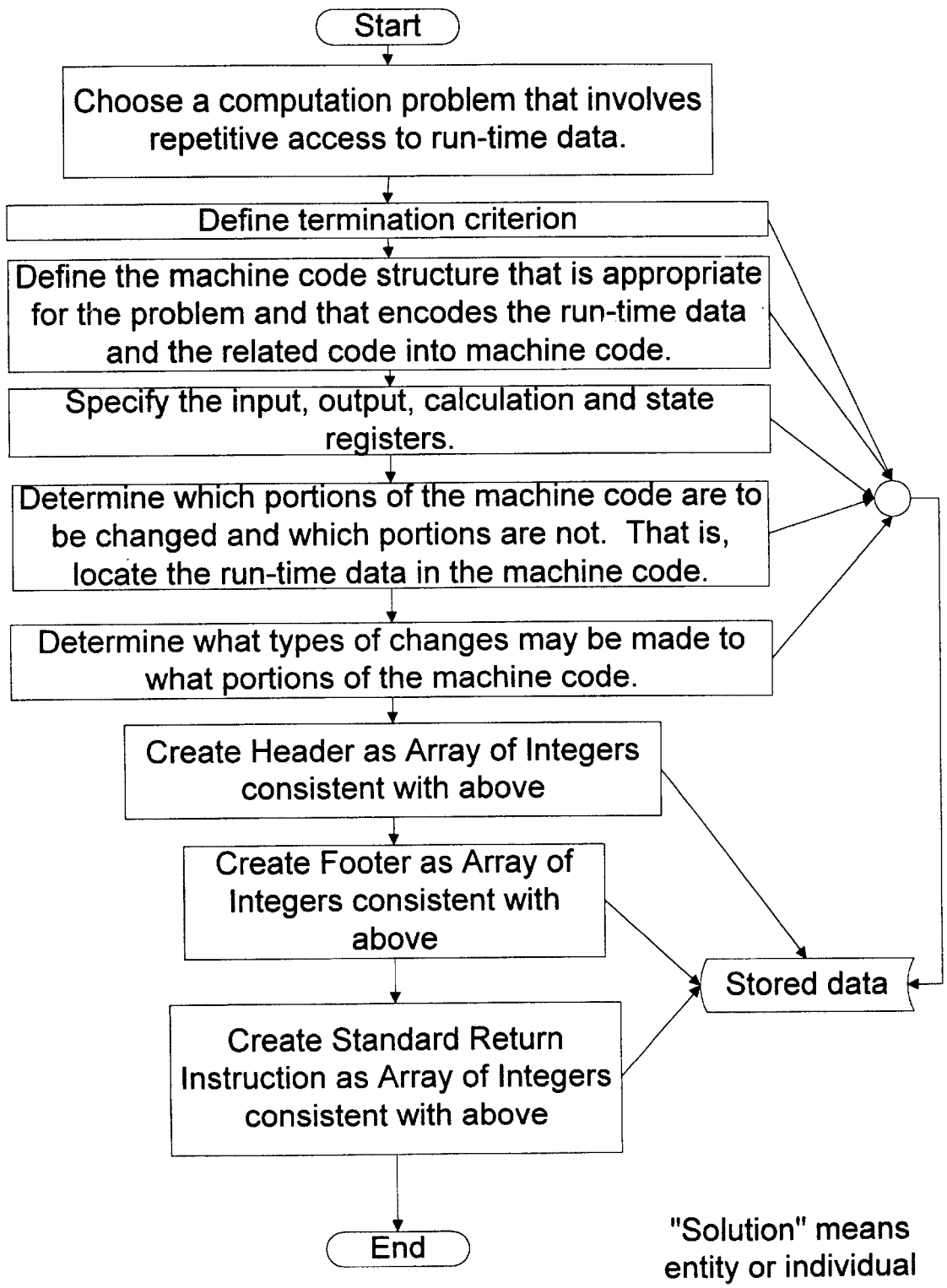

FIG. 17b sets forth the details of the block entitled "SYSTEM DEFINITION" in FIG. 17a. This Figure shows, inter alia, how to define a repeated computation on run-time data problem so that it may be implemented using the invention. Numeric or other values may be encoded in the machine code as constants.

Figure 17C:
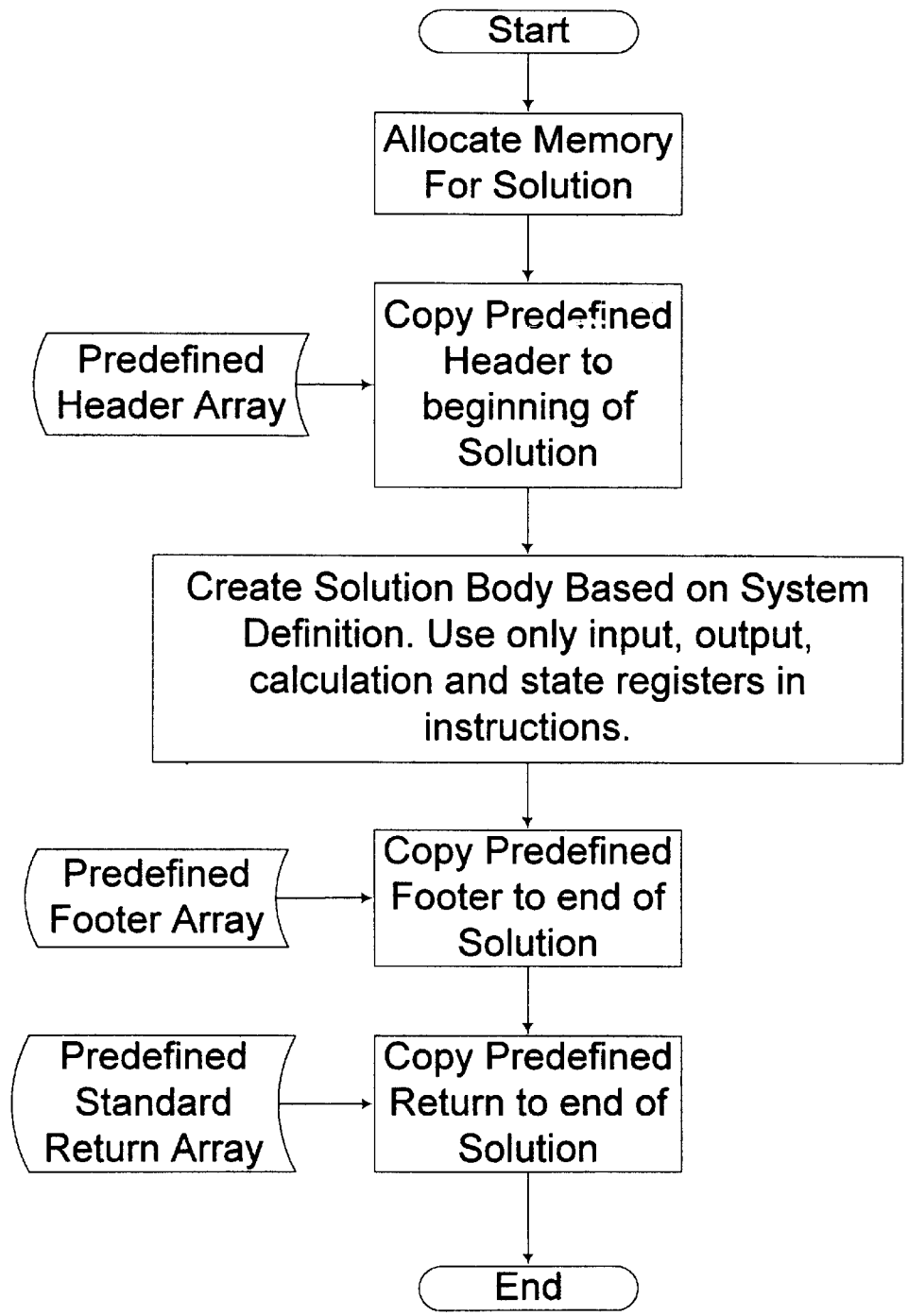

FIG. 17c sets forth the details of the block entitled "INITIALIZATION" in FIG. 17a. This Figure sets forth, inter alia, a set of steps that will result in the creation of a computational entity that will perform repeated computations on run-time data based on the system definition performed in FIG. 17b. It is important to note that the computation entity created ordinarily includes not only the related code but also contains the first set of run-time data on which the system will perform repeated calculations. Should said first set not be available when the initialization occurs, then the computational entity should be initialized with dummy values in the places in the instructions where the real run-time data will reside. Then, when the real run-time data is known, it can be placed into those places using the procedure under "Start Modification" in FIG. 17d.

Figure 17D:
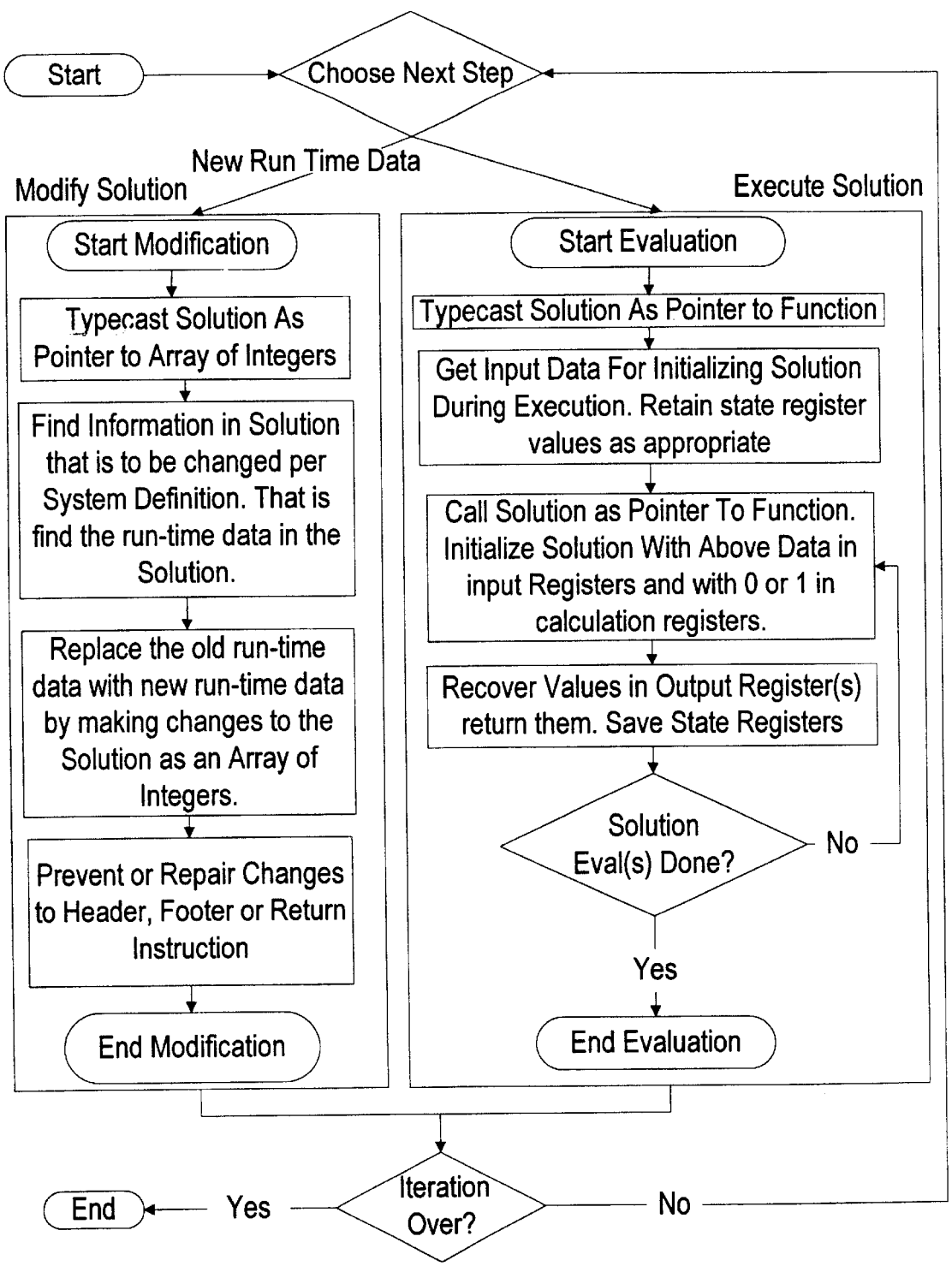

FIG. 17d sets forth the details of the block entitled "EVALUATE OR MODIFY FUNCTION" in FIG. 17a. The particular implementation of an application of the invention to repeated computations on run-time data will vary substantially from problem to problem. So this Figure is general in terms of when to execute the computational entity (referred to in FIGs. 17a–17d as a "solution") and when to modify the computational entity. The computational entity should be modified each time that the designer wishes to perform a particular computation (related code) on run-time data of the type that is encoded in the computational entity but that has not yet been placed in the computational entity. The computational entity should be executed every time the designer wants to perform a calculation on run-time data that has been encoded into the machine code of the computational entity.

FIG. 18a outlines the general operation of the invention when it is applied to learning machine code structures and machine code contents that will operate a register machine for the purpose of learning a solution to a problem. This application of the invention could be handled in other and alternative manners both in the general matters set forth in FIG. 18a and in 18b through 18h and those other and alternative manners are within the scope and spirit of this invention.

FIG. 18b sets forth the details of the block entitled "SETUP" in FIG. 18a. This Figure describes various steps necessary to setup an application of the invention to a CGPS run on a particular problem. Numeric or other values may be encoded in the machine code as constants.

FIG. 18c sets forth the details of the block entitled "INITIALIZATION" in FIG. 18a. This Figure describes, inter alia, a method for initializing a population of entities for the purpose of conducting a CGPS run.

FIG. 18d sets forth the details of the block entitled "CREATE INSTRUCTION" in FIG. 18c. This Figure describes, inter alia, one method of creating a single machine code instruction to be included in the body of an entity.

FIG. 18e sets forth the details of the block entitled "MAIN CGPS LOOP" in FIG. 18a. This Figure sets forth, inter alia, one approach to implementing the basic CGPS learning algorithm.

FIG. 18f sets forth the details of the block entitled "CALCULATE INDIV[N] FITNESS**" in FIG. 18e. The fitness function described therein is simple. More complex fitness functions may easily be implemented and are within the spirit and scope of this invention.

FIG. 18g sets forth the details of the block entitled "PERFORM GENETIC OPERATIONS . . ." in FIG. 18e. The mutation and crossover operators referred to in FIG. 18g may be all or any of the operators described elsewhere in this application.

Figure 18H:
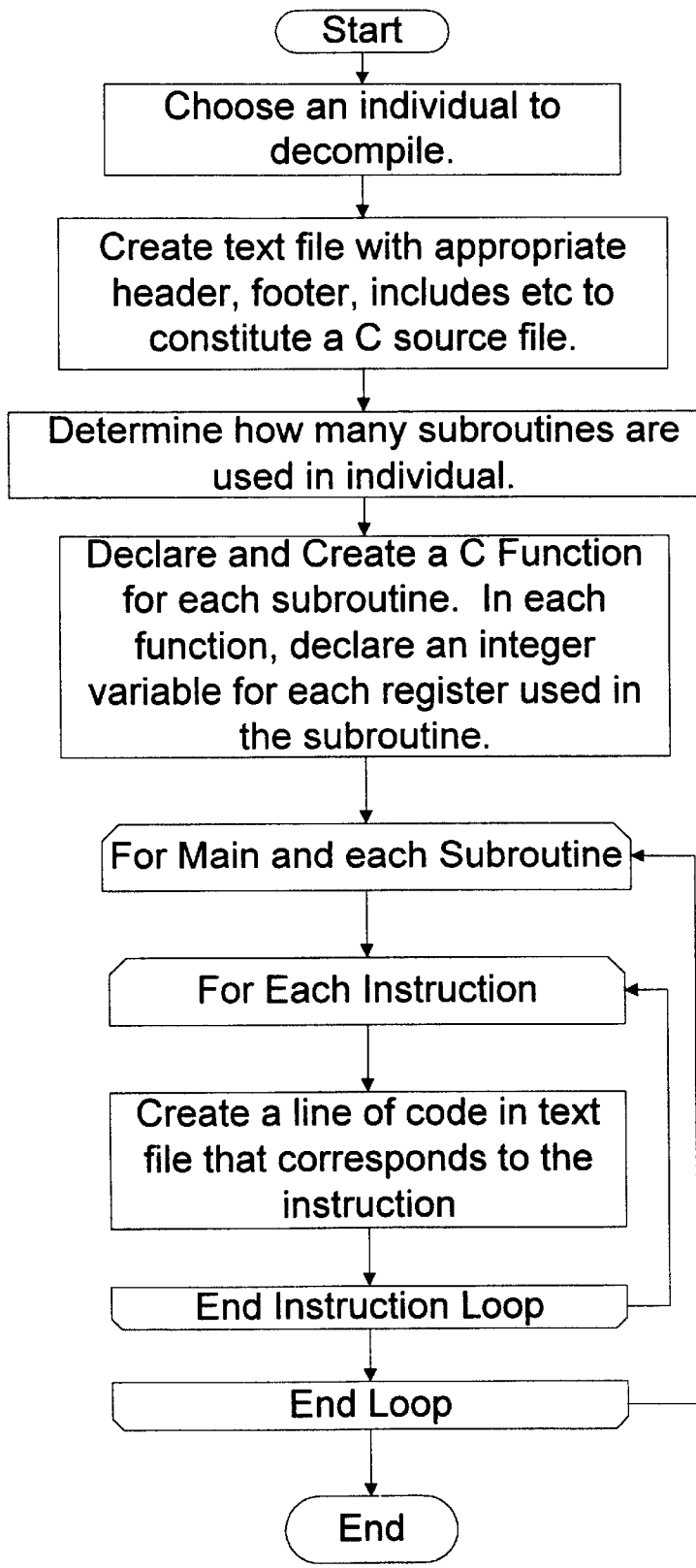

FIG. 18h sets forth the details of the block entitled "DECOMPILE CHOSEN SOLUTION" in FIG. 18a. This Figure describes a method of converting an individual into a standard C language function that may then be linked and compiled into any C application. Other and more complex methods may be easily implemented and are within the spirit and scope of this invention.

Turing Complete Machine Learning System

A basic machine learning system and method according to the present invention is described above. The system can be made Turing complete though the addition of branching instructions as will be described in detail below. This capability increases the flexibility and power of the system by enabling subroutines, leaf functions, external function calls, recursion, loops, and other types of conditional operations.

Introduction

The modern computer has grown in instruction capabilities and machine word size, which means that there are more tasks that can be carried out elegantly by a straightforward machine language subroutines. For example, the precision of the arithmetic is enough for direct usage, and the memory organization is often flat which makes pointer operations less complex, etc.

Conventional application programs often fail to use the computer to its full potential because the algorithms are not implemented in the most efficient way. This fact is even more relevant in the use of algorithms for machine learning, artificial intelligence, artificial life, etc., repeated computations on run-time data which rely on complex manipulations and are often of the meta type where programs manipulate program structures.

The present machine learning system is a unique approach to implementation of algorithms of this kind. The approach is unknown, in spite of the fact that it is possible to use on the oldest and smallest computer. It can present a number of advantages like a speed up of a 1,000 times, low memory consumption, compact representation, etc.

The execution speed enhancement is important both for real-life applications, and for simulations and experiments in science. A large efficiency improvement of this magnitude can make real life applications feasible, and it could also mean the difference of whether an experiment or simulation will take three days or one year. This can make a given algorithm useful in a whole new domain of problems.

If an algorithm uses a representation in a program that later can be evaluated by some kind of interpretation as a program, even in a limited sense, this approach can be used. It could be the rules in Cellular Automata, the creatures in artificial life, decision trees, rules, simulations of adaptive behavior, or as demonstrated below evolving Turing complete algorithms with an evolutionary algorithm. As described above, the present approach is referred to as a compiling approach because there are no interpreting parts and the individuals are, in effect, directly compiled.

The present method of binary machine code manipulation should not be confused with translating a machine learning algorithm into assembly code, the way a compiler operates. Instead, the present invention is capable of meta manipulating machine code in an efficient way.

The Present Compiling Approach

It is surprising that there are no existing programming languages with specialized features and tools for this programming paradigm.

The present invention provides advantages of the prior art including the following.

Higher execution speed

Compact kernel

Compact representation

Uncomplicated memory management

Low complexity algorithms

The efficiency improvement in binary meta manipulations comes from deletion of the interpreting steps. Instead of using a structure defined by the programmer to be run through an interpreter, a match between the data structures of the application and the binary machine code structures is sought. The algorithm then manipulates the binaries and instead of interpreting, the system executes the binary directly. The efficiency benefit comes mostly from deletion of the interpreting steps, but also from the simplicity of manipulating the linear integer array that constitutes the binary machine code.

The lack of an interpreting or compiling step makes the kernel of the algorithm compact, because no definition of the interpretation is needed. The machine code binary format is often compact in itself, which is important when working with applications that use a large set of structures, for example evolutionary algorithms, cellular automata, etc.

The inherent linear structure of a binary code program forces the design of a system that uses uncomplicated memory management. The decreased use of pointer and garbage collection imposes a straightforward handling of memory that is an advantage in for example real-time applications.

Some parts of the machine learning algorithm might be simplified by the restriction of the instructions to integer arithmetic. Handling of a sequence of integers is a task that a processor handles efficiently and compactly, which could simplify the structure of the algorithm.

The approach of binary manipulating machine learning algorithms builds on the idea behind a von Neumann machine, and it is thus applicable on most of today computers from the largest super computers to the small invisible systems in cars, cameras and washing machines.

Von Neumann Machines

A Von Neumann machine is a machine where the program of the computer resides in the same storage as the data used by that program. This machine is named after the famous Hungarian/American mathematician Jon von Neumann, and almost all computers are today of the von Neumann type. The fact that the program could be considered as just another kind of data makes it possible to build programs that manipulate programs, and programs that manipulate themselves.

The memory in a machine of this type could be viewed as an indexed array of integers, and a program is thus also an array of integer numbers. Different machines use different maximal sizes of integers. A 32-bit processor is currently the most commonly commercially available type. This means that the memory of this machine could be viewed as an array of integers with a maximum size of $2^{32}-1$, which is equal to 4294967295, and program in such a machine is nothing more than an array of numbers between zero and 4294967295.

A program that manipulates another program's binary instructions is just a program that manipulates an array of integers. The idea of regarding program and data as something different is however deeply rooted in our way of thinking. It is so deeply rooted that most designers of higher language programmed have made it impossible for the programmer to access and manipulate binary programs. It is also surprising that no languages are designed for this kind of task. There are a no higher level languages that directly support this paradigm with the appropriate tools and structures.

The C language is desirable for practicing the present invention because it makes it possible to manipulate the memory where the program is stored.

The Processor

The processor is a "black box" which does the "intelligent" work in a computer. The principles of different. available processors are surprisingly similar. The processor consists of several parts as illustrated in FIG. 3, including the control logic 44 which access the memory 12, the ALU 40, and the registers 46.

The control logic 44 uses a register or some arithmetic combination of registers to get an index number or address. The content of the memory array element with this index number is then placed in one of the registers of the processor.

A register is a place inside the processor where an integer can be stored. Normally a register can store an integer with the same size as the so-called word size of the processor. A 32-bit processor have registers that can store integers between 0 and 4294967295.

The most important register is the program counter (PC) which stores the address of the next instruction to be executed by the processor. The processor looks at the contents of the memory array at the position of the program counter and interprets this integer as an instruction that might be an addition of two registers or placing a value from memory into a register.

An addition of a number to the program counter itself causes transfer of control to another part of the memory, in other words a jump to another part of the program. After doing an instruction the program counter is incremented by one and another instruction is read from memory and executed.

The ALU in the processor perform arithmetic and logic instructions between registers. All processors can do addition, subtraction, logical "and", logical "or", etc. More advanced processors do multiplication and division of integers, and some have floating point units with corresponding registers.

Every behavior we can see in modern computers is based on these simple principles. Computers doing graphics, animations, controlling a washing machine or watching the ignition system in a car all does these memory manipulations and register operations.

The principles above do not anywhere prevent a program from manipulating the contents of memory locations that later will be placed in the program counter and run by the processor as it interprets it as instructions. This is the basis of the binary manipulating machine learning code in accordance with the present invention.

Machine Code and Assembly Code

Machine language is the integers that constitute the program that the processor is executing. These numbers could be expressed with, for example, different radix such as decimal, octal, hexadecimal or binary. By binary machine code we mean the actual numbers stored (in binary format) in the computer.

When programing or discussing machine language, it is often impractical to use numbers for instructions. To remember that the addition instruction for example is represented by the integer 2416058368 in the SUN SPARC architecture is not natural to the human mind.

If we represent it in hexadecimal radix (E219922D), it will be more compact and it is more easy to deal with than its binary equivalent, but it is still not natural to remember. For this reason, assembly language has been developed. Assembly language uses mnemonics to represent machine code instruction. For example, addition is represented by-the three letters "ADD".

The grammar for assembly language is very simple, and the translation or mapping from assembly language to machine code is simple and straightforward. Assembly language is not, however, machine language, and cannot be executed by the processor directly without the translation step.

RISC and CISC

The present invention has been implemented using both processors of the CISC type including the Intel 80486, and of the RISC type including the SUN-SPARC architecture. CISC stands for Complex Instruction Set Computer, and RISC stands for Reduced Instruction Set Computer. As indicated by the acronym, the RISC processor has fewer and less complex instructions than the CISC processor. This means that the RISC processor can be implemented differently in hardware and that it therefore will be faster.

There are advantages of both paradigms when using them for binary manipulating machine learning. The CISC has the advantages of many more types of instructions and addressing modes, and a subset can re readily found which makes a particular implementation straightforward.

The RISC processor on the other hand has the advantage that the structure or "grammar" of an instruction is very simple, for example the number of bits is constant. This sometimes makes the manipulation easier. It is easier to check for a valid instruction. A RISC is also often faster than a CISC.

Although the present invention can be practiced using CISC and RISC systems, it is somewhat easier to administrate on an RISC based architecture.

Another important factor is the operating system and hardware support of the development environment. A system like UNIX which offers separate processes and hardware implemented memory protection is definitely to recommend during development, because it will save time when bugs appear during the development phase. These systems do not have to be restarted after a serious bug like an illegal instruction. It should, however, be noted that once the system is debugged it will run as safely on any platform as any other conventional program.

Structure of Machine Code Function

A procedure and a function can be regarded as very similar concepts in machine code or even in C. A procedure is a function that does not return a value. When implementing a machine learning system with a binary manipulating technique, functions are the basic structures. For example, the individuals in compiling genetic algorithms are imple mented as machine code functions. A function call has to perform three different subtasks:

Program control transfer and saving the start address

Saving processor registers

Transfer parameters

The most important instruction for functions and procedures is the call instruction. It is present in all kinds of processors, and works as a jump instruction that saves the memory location or address of where it was jumping from. This will allow a return instruction to return back to this memory location when execution of the function is complete.

Most call instructions save the return address in a special memory segment called the stack, but some save it internally in a register in the processor. The SUN SPARC architecture saves the return address in a register, if there is enough room for it.

A call instruction is not sufficient to make a complete function call. The contents of the registers must be saved somewhere before the actual instructions of the function are executed.

This assures that the called function will not interfere with the processing in the calling function, and gives the called function the liberty to manipulate these registers itself. The most common place to store the contents of the calling functions registers, is the stack. Some architectures like the SPARC architecture stores it inside the processor by the special save instruction.

When the execution of the function is done, the registers of the calling function have to be restored to allow this function to continue processing in the context it was working in before the function call.

The last task a processor has to accomplish in order to perform a complete function call is to transfer the parameters to the function. It has to transfer the input parameters when the call is performed, and transfer back the return values after the execution of the function is complete. Again, this is most commonly done by storing these values in the stack, but it can also be done by using special registers inside the processor.

These four important steps: calling the function, saving and restoring registers, transfer of parameters and return of outputs can be done in different ways. It can even be done in different ways on the same processor. Normally it is the job of the compiler to produce machine code instructions that perform these three steps in a suitable way.

In order to make it possible to link object code from different compilers and to increase portability, a number of standards, recommendations and conventions have emerged. There is for example the calling convention whereby it is up to the calling function to save the registers or whereby it is up to the called function to save the registers. In the SPARC architecture, it is the called function that saves the callers registers. In a similar manner there are conventions for how parameters should be transferred.

When working with machine learning at the binary level, it is sometimes allowable to be more free, and for example not always save all registers if it is known that the called function will not use them. This not only provides a more efficient implementation, but also presents the opportunity to use special features of the architecture that are hard to express in a high level language.

As described above, the structure of a function on the machine code level can be considered as an array of integers divided having four parts:

Header

Body

Footer

Return

The header of a function does one or more of the three steps mentioned above. In the SPARC architecture, the header of the function saves the registers of the calling function and sometimes also transfers parameters. Which of the three steps the header does is different from processor to processor and from compiler to compiler.

Although most function structures need some kind of header to perform a function call, some special kinds of functions do not need a header, such as the leaf procedure in the SPARC architecture.

The header is fairly constant and normally does not have to be manipulated by the machine learning part of the program. It can be defined at an early stage, for example in an initialization phase of the system.

The body of the function does the actual work that the function is supposed to carry out. When the body of the function is entered, all of its parameters are accessible to it, and the registers from the calling function are saved. The body can then use any of the arithmetic instructions or call another function to compute the desired function.

The footer contains the "cleanup" instructions as described elsewhere.

A return instruction must always follows the footer. This instruction finds out where the call to this function was made from, and then jumps back to this location. The address to jump back to is either stored on the stack or in special registers in the processor.

SPARC Architecture

A system that directly manipulates machine code is not easily made portable, so it is recommended to choose one platform as a base for experimentation. The preferred system includes the SPARC architecture and SUN workstations. The reason for this is that is one of the most widely used architectures in the research community, with a stable UNIX operating system. It is also a relatively fast RISC architecture.

SPARC is an open architecture with several different implementations and manufacturers. The SPARC International, Inc. is a non-profit consortium for evolution and standardization of this architecture. A well known user of SPARC is SUN Microsystems Inc., which uses the architecture in all of its modern workstations.

SPARC Registers

As described above with reference to FIG. 3, the most important of the different kinds of registers as applicable to the present invention are the "windowed registers". It is between the windowed registers that almost all arithmetic and logic operators take place. There are a dozen other registers that are more important to the system software than to a client application. The program counter is also an important register.

The windowed registers are divided into four classes:

Output registers $O_0$ to $O_7$

Input registers $I_0$ to $I_7$

Local registers $L_0$ to $L_7$

There are also eight global registers $G_0$ to $G_7$.

There are eight registers in each of these classes. When a save instruction is executed, it copies the contents of the output registers into a new set or bank of corresponding input registers. Register $O_0$ is copied into $I_0$, $O_1$ is copied into $I_1$, etc. The input register used is a new input register owned by the called function.

The values in the old input registers are kept or saved. It will be noted that the contents are not really copied. In reality these registers the same, and only a pointer to the current set of register in incremented.

The processor has an internal storage for a few banks or sets of register like this (seven in the SPARC architecture), and if this limit is exceeded, the hardware and system software will save the contents in memory. For the user, this banked register mechanism can be thought of as a small internal stack.

It is important to note that a save instruction copies the contents of the calling function's output registers into the called function's input registers, while the restore instruction copies the contents of the returning function's input registers into the calling function's output registers.

When a function wants to call another function and pass some variables, it thus places the parameters in its output registers and makes the call. After the function call has been completed, the returning values can be found again in the output registers.

The local registers are local to the function working for the moment, and are used for temporary storage. A fresh set of local registers is provided when a new function is called, but there is no special transfer of values into these registers.

The global registers are always the same. They keep their meaning and content across function calls, and can thus be used to store global values. There are no alternative sets of this registers like there are with the input, output, and local registers.

Register Implementation

Some of the registers have a reserved usage. In some cases the reserved meaning is due to hardware, but in most cases the origin of these constraints are software conventions, as specified by the SUN Application Binary Interface (ABI).

In accordance with the present invention, almost all of the actual algorithm is written in a high level language like C. This prevents interference with the work done by the compiler. If this goal is abandoned, and the complete system were written in assembly language, even higher flexibility could be achieved. However, all portability would be lost, and it is therefore preferred to provide the manipulating program in a high level language such as C.

The global registers are preferably not used by the program, because these registers are likely to be used by the code generated by the compiler. Global storage for function structures can be provided in memory.

Global register zero has a special meaning. It is not a register where values can be stored. An attempt to read global register zero, always returns the value zero, and an attempt to write to global register zero does not change anything. This register is used when a zero constant is needed or when the result of an operation should be discarded.

Global register one is by convention assumed to be destroyed across function calls, so this register can be used by the functions that are manipulated by the machine learning algorithm.

Registers $I_6$, $I_7$, $O_6$, and $O_7$ are by convention used to store stack and frame pointers as well as the return address in a function call, so these should not be used by the program.

Local registers zero and one have special uses during an interrupt but this will not affect the functions.

Thus, the registers which are available for use in the SPARC architecture are global register $G_1$, input registers $I_0$ to $I_5$, output registers $O_0$ to $O_5$, and local registers $L_0$ to $L_7$.

SPARC Instructions

SPARC is a RISC architecture with a word length of 32 bits. All of the instructions have this size. Basically there are three different formats of instructions, defining the meaning of the 32 bits. The processor distinguishes between the formats by looking at the last two bits, bit 30 and bit 31. The three formats are:

CALL instruction

Branches, etc.

Arithmetic and logic instructions.

In the CALL instruction, bit 30 is one and bit 31 is zero. The rest of the bits are interpreted as a constant that is added to the program counter (PC). The return address is stored in output register $I_7$.

Branches are mostly used for conditional jumps. They look at the last performed arithmetic operation, and if it fulfills a certain criteria, for example if the result is zero, then the program counter is incremented or decremented by the value of the last 22 bits in the instructions. In a branch, both bit 30 and bit 31 are zero.

The last group of instructions are the arithmetic and logic instructions between registers. These groups of instructions have bit 31 as one and bit 30 as zero. These are the preferred instructions for practicing the present invention. These instructions perform, for example, multiplication, division, subtraction, addition, AND, OR, NOT, XOR and different SHIFT instructions.

The arithmetic instructions can also be used as jump, call, and return instructions, if the result of the operation is put into the program counter register. In this way it is possible to jump to the address pointed to by the contents of a register. When the current value of the program counter is saved in another register (out7), these instructions can be used as call instructions.

Call is equivalent to jmpl register, %o7, where jmpl means "jump long"; jump to the content of "register" and place the current program counter in register $O_7$.

Return (ret) from a normal procedure is equivalent to jmpl.

Return from a leaf procedure (ret) is equivalent with jmpl.

The constant eight causes the control to jump back past the original call and past this call's delay slot.

The return instruction puts the value of $O_7$ with a constant added thereto into the program counter, and causes the execution of the program to return.

There are also instructions for loading and saving information from the memory.

Control transfer instructions (CTI) like jump, call, and return, are somewhat special in the SPARC architecture. The instruction immediately after the jump instruction is executed during the transfer of control, or it could be said to be executed before the jump.

A SPARC assembly code listing can appear misleading because of the change in execution order, because a NOP instruction is placed after the CTI. The instruction after the CTI is say to be in the delay slot of the CTI. The reason for this somewhat awkward mechanism is that if the delay slot can be filled with a useful instruction, it will make the execution of the overall program more effective, because the processor can do more instructions in the same cycles. It is the hardware construction of the processor the makes this arrangement necessary.

The CTI and the delay slot are important in implementing the CGPS. Special rules require that a CTI that has a CTI in its delay slot. This is called a Delayed Control Transfer Couple.

The execution of a DCTI couple is awkward. The first (and only the first) instruction of the function that the first CTI is pointing to is executed, then directly the execution jumps to the function that the second CTI is pointing at. The instruction after the second CTI is not regarded as being in a delay slot, and it is executed when control is returned. This phenomena is important for the construction of subroutines and external functions.

Leaf Procedures

The above described properties of the call and save instructions make it possible to use two particular kinds of procedures.

The first kind of procedure is a full procedure that uses the save and restore instructions, and the procedure is consequently allowed to use and manipulate input, output and local registers. The save and restore functions, however, consume processor cycles. If there is room inside the processor, the time consumption is moderate, but if storage in memory is needed it will take many processor cycles.

The solution to this problem is to use leaf procedures. They are called leaf procedures because they cannot call another procedure, and therefore leaves in the procedure structure of a program.

A leaf procedure does not perform a save operation, and works with the same set of registers as the calling procedure. To avoid interference with the content of the calling procedure, it only manipulates the output registers, which are assumed to be destroyed by the compiler across function calls. One of the elegant consequences of this technique is that the calling procedure does not have to know what kind of procedure it is calling. This means that linking of procedures works normally.

The difference between a leaf procedure and a full procedure is that it only manipulates the output registers, does not use save or restore, and has a special return instruction that looks for the return address in output register $O_7$ seven instead of input register $I_7$.

These details originate mostly from software conventions implemented in compilers. When the underlying principles are known, it is possible to have many more combinations of behavior of procedures. In some of examples in *CPGS, hybrids of the normal procedures and leaf procedures are used, because it is known how the registers are used in the calling procedures.

Although the floating point features of the computer architecture are not specifically addressed herein, it is possible to use binary manipulating algorithms for floating point processors and units. This makes the present invention applicable to new domains of problems.

Evolutionary Algorithms

Examples of genetic algorithms were present above with reference to FIGS. 10 to 15. A genetic algorithm, for example, is an algorithm based on the principle of natural selection. A set of potential solutions, a population, is measured against a fitness criteria, and through iterations is refined with mutation and recombination (crossover) operators. In the original genetic algorithm, the individuals in the populations consist of fixed length binary strings. The recombination operators used are the uniform and 2-point crossover operators.

In genetic programming the goal of the system is to evolve algorithms or programs in a given language. Most genetic programming systems use a tree structure for the representation of programs, as in the above referenced patent to Koza. The most commonly used tree representation form is the S-expressions used in the LISP-language.

The tree representation guarantees that the evolved programs will be syntactically correct after the genetic operators are applied. In the original model, the only genetic operator apart from selection is the subtree exchanging crossover. This crossover operator swaps two subtrees in the individuals that undergo crossover.

A middle way between these two representation forms is messy genetic algorithms, which has a freer form of representation where for example the loci of gene is not tied to its interpretation. Instead genes are tagged with a name to enable identification.

Evolution of Machine Code Structures and Content

A basic machine learning system was described above with reference to FIGS. 1 to 18. Our discussion of the prior system provides many of the basic details of the present invention and is incorporated here by reference. The algorithm evolves fixed length binary strings, and uses crossover and mutation operators. The crossover is prevented from damaging certain bit fields within the 32 bits of the instructions. This protection procedure guarantees that only valid machine code instructions are generated through crossover. The mutation operator has a similar protection feature.

The system described below is a more complete machine learning and induction system, capable of evolving Turing complete algorithms and machine code functions. The system provides additional advantages including the following.

- Use of several machine registers
- Dynamic allocation of memory, (no recompilation needed)
- Variable length of programs.
- Multiple input parameters to functions
- Unlimited memory through indexed memory
- Automatic evolution of subfunctions
- If-then-else structures
- Jumps
- Use of loop structures including for, while, repeat
- Recursion, direct and through subfunctions
- Protected functions e.g. division
- String functions, and list functions
- Linking any C-function for use in the function set These goals are met by a program written mostly in C, which uses unrestricted crossover at instruction boundaries. Unrestricted crossover means that the crossover acting on the strings of instructions should be able to work blindly without checking what kind of instructions are moved and where.

There are many advantages of this if the goal is met. The implementation is very efficient, because the algorithm will only consist of a loop moving a sequence of integers, something a computer is very good at. The implementation will be simple and easily extendable because there will be a minimum of interaction and interference between parts of the program. Equally important is the fact that the program will be more easily ported to different platforms because the architecture specific parts can be restricted to a minor part of the program, and the crossover mechanism does not have to be effected.

It is easy to find examples of instructions and combinations of instructions where these properties do not hold. The normal call instructions constrains an offset that is added to the program counter. If this instruction is moved to another memory position, the call will point to another memory location where there might not be anything like a proper function. The SPARC architecture does not have calls with absolute addresses, which would still work after crossover. Instead, a call to an address specified by a register is used. The value in the register will be the same even if the instruction is moved by crossover.

The same problem exists with a normal branch instruction. It is also defined by a constant added to the program counter, and it cannot either be moved without changing this constant. But a certain class of instructions are possible to move unrestrictedly, without any unwanted effects. Machine language is quite flexible, and this restriction of instruction use is possible without abandoning the goals of the system.

Crossover

The crossover operators (uniform and 2-point) were described in detail above. See FIG. 22*j*.

Mutation

The mutation operator picks an instruction at random, and checks whether it has a constant part or if it is only an operation between registers. If it has a constant part, a bit in this constant is mutated and also potentially the source and destination registers of the operation. If the instruction does not have a constraint part, the instruction's type, source and destination registers are mutated. See FIG. 22*i*.

Calls and jumps are not mutated other than that they may be swapped for other instructions.

Casting and Execution of an Array

In a computer, all data is represented as integer numbers. To make programming a more easy task there are more data types and structures in a high level program, for example: strings, pointers, characters bitmaps, etc.

But all of these structures are, as stated above, translated into integers. Sometimes the programmer wants to translate an object of a certain type into an object of another type. The term for this is casting, one type is cast into another type. This is often only an operation in the high level language, at the machine code level they might be represented by the same integer.

Speed Increase

The efficiency of the present invention can be 1,000 times faster than a system coded in an interpreting language, and there are reasons to believe that similar performance enhancements are possible for other kinds of meta manipulating programs. If, however, these speed enhancements still would not be enough there are a few ways to further improve performance.

The main system described here has a number of advanced features like subroutines, recursion, etc. If extremely fast performance is needed and if a system can do without these features and if the goal is to only evolve arithmetic and logic expressions of a number of "in" variables, then the efficiency can be increased even further.

More specifically, if it is acceptable to decompile the system between runs, for example if the problem parameters are given beforehand, then execution speed can be increased further. Finally, there is the possibility of coding and optimizing the entire system in assembly language which has the fastest execution.

System Parameters

The following is a list and a brief description of the parameters that are used to control the present machine learning system.

- Population size
- Number of fitness cases to evaluate. Training will halt when the system has tried these many fitness cases.
- Mutation probability
- Crossover probability
- Parsimony pressure start value
- Number of incremental steps for parsimony pressure
- Size of each incremental parsimony pressure step
- Maximum program size
- Initial mean program size
- Random number generator seed
- Success threshold for fitness
- Maximum number of iterations in recursion and loops
- Maximum size of initial terminal set numbers Number of bits to be mutated in terminal numbers
Number of input registers to use
Number of output registers to use
Number of external functions
Maximum number of automatic subfunctions
Flags determining which instructions to use: ADD, SUB, MUL, SLL, SRL, XOR, AND, OR These parameters are read from an initialization file before each training session. All effects of these parameters are dynamically allocated, and there is no recompilation of the system necessary. This implies that a flexible system can be implemented on a small computer without an onboard compiler. These parameters would, of course, be different for other machine learning systems or for repeat calculation systems on run-time data.

Machine Code Instruction Implementation

The following SPARC machine code instructions are used in the CGPS implementation.

ADD, Addition
SUB, Subtraction
MUL, Integer multiplication
SLL, Shift left
SRL, Shift right
XOR, Exclusive or
AND, Logical And
OR, Logical Or
Call $L_{0-7}$ The arithmetic and logic instructions, all instructions except the last call instructions, come in four different classes. These arithmetic instructions can have the property of affecting a following if then branch or not affect it. They can also have the property of being an operation between three registers, or an operation between two registers and a constant. The combinations of these two classes makes four different variants of the arithmetic instructions.

An arithmetic instruction could for example add output register $O_1$ with output register $02$ and store the result in output register $0_3$, or it could add a constant to output register $O_2$ and store the result in output register $O_3$.

The 32-bit instruction format has room for a constant of ±4196. In this manner, a single instruction is substantially equivalent to many elements in an ordinary machine learning system: one element for the operator, two elements for the two operands, and one element for the destination of the result. This approach is thus quite memory effective using only four bytes of memory to store four nodes.

There are eight different call instructions, one for each of the local registers. The call instruction jumps to an address given by the content of the local registers in the function. The local registers are thus reserved for this usage in our implementation, and they have to be initialized in the header of every function to make sure that they point to a function in use.

These instructions are the basis for external functions and subroutines. How many of these instructions are used in the initialization is determined by how many subroutines and external functions that are used..

The maximum number of external functions and subroutines are in this implementation limited to eight. If more external functions are needed, then another initialization technique can be used where the call instructions jumps to the address given by a constant added to a local register. The instruction format allows for storage of such constants within the instruction.

The division instruction can be used directly as a basic instruction. Protection from division by zero can be provided by catching the interrupt generated by hardware. It is, however, more effective to make protected division as an external function, with a few instructions checking for division by zero.

Initialization

Initialization is the first task the system performs when presented with a giving training situation. See FIGS. 22*b*, 22*c*. Initialization can be divided into four steps.

Allocation of memory for the population, etc.
Initialization of header
Initialization of footer
Initialization of the function body Initialization of Memory FIGS. 22*b*, 22*c*

The memory used for the individuals in the arrays is a linear array of integers. The array is divided into blocks determined by the system parameter maximum length. A fixed maximum length is thus reserved for every individual. If there are subroutines, then this memory is allocated for every subroutine according to the maximal number of subroutines. The program and its subroutines then can vary in length within these boundaries.

The advantages with this paradigm include very simple memory management, without garbage collection. The approach with linear memory is efficient and natural for the use of binary code. There is also a constant—easily calculated—memory usage once the system is initialized. This can be a requirement in real-time systems, and in systems with limited memory resources.

An example population of one million individuals with no subroutines and 40 nodes maximum per individual in this way occupies 40 MB of RAM memory, which is manageable on an ordinary workstation.

Figure 22A:
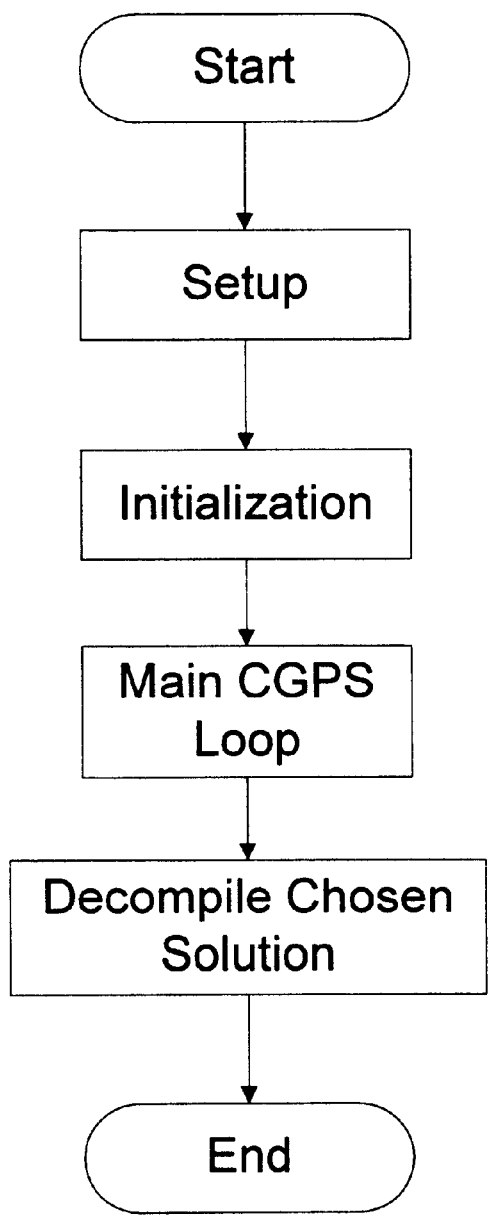
FIGS. 22a to 22k are flowcharts illustrating a detailed implementation of the invention.
Figure 22B:
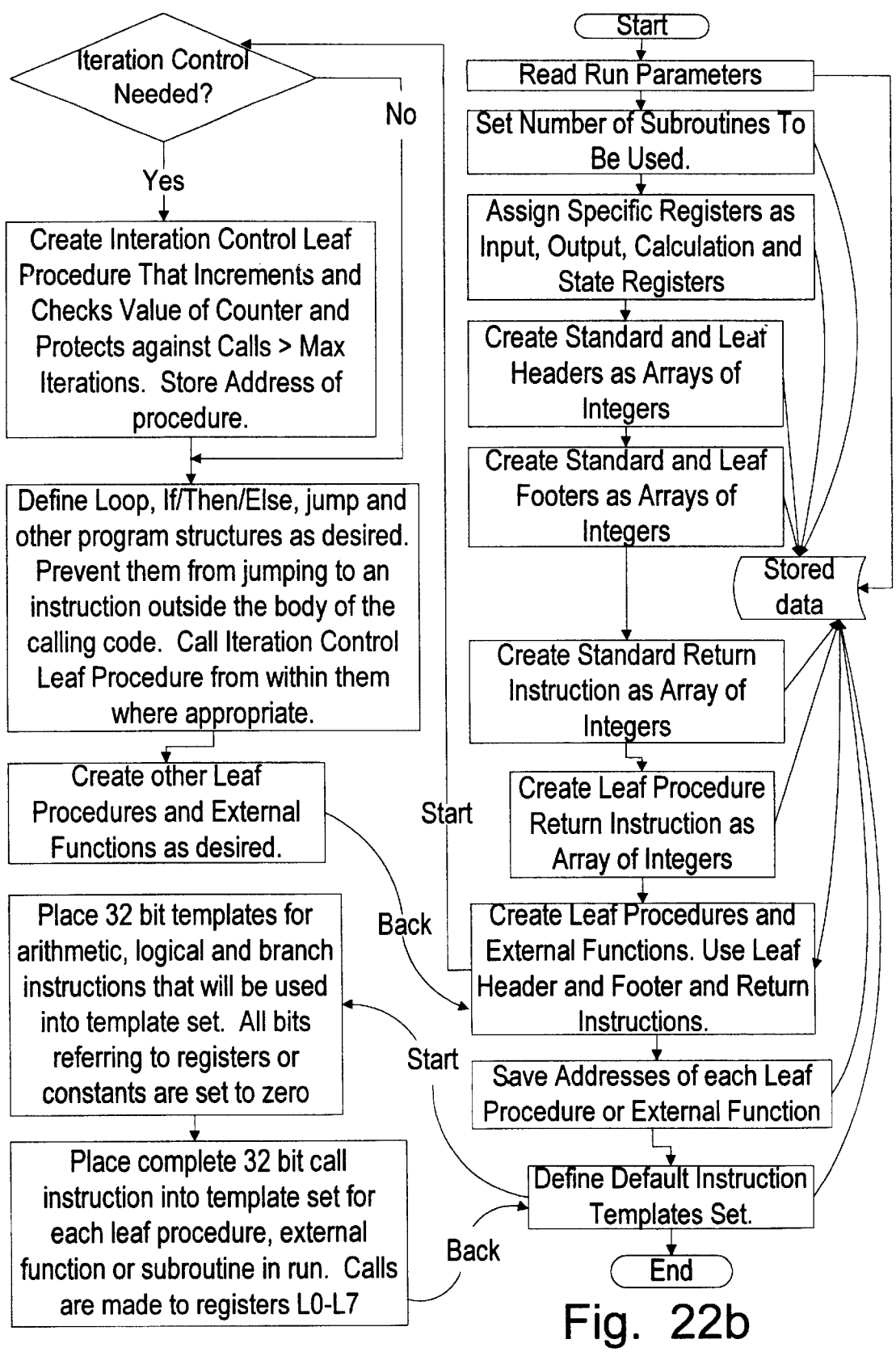
Figure 22C:
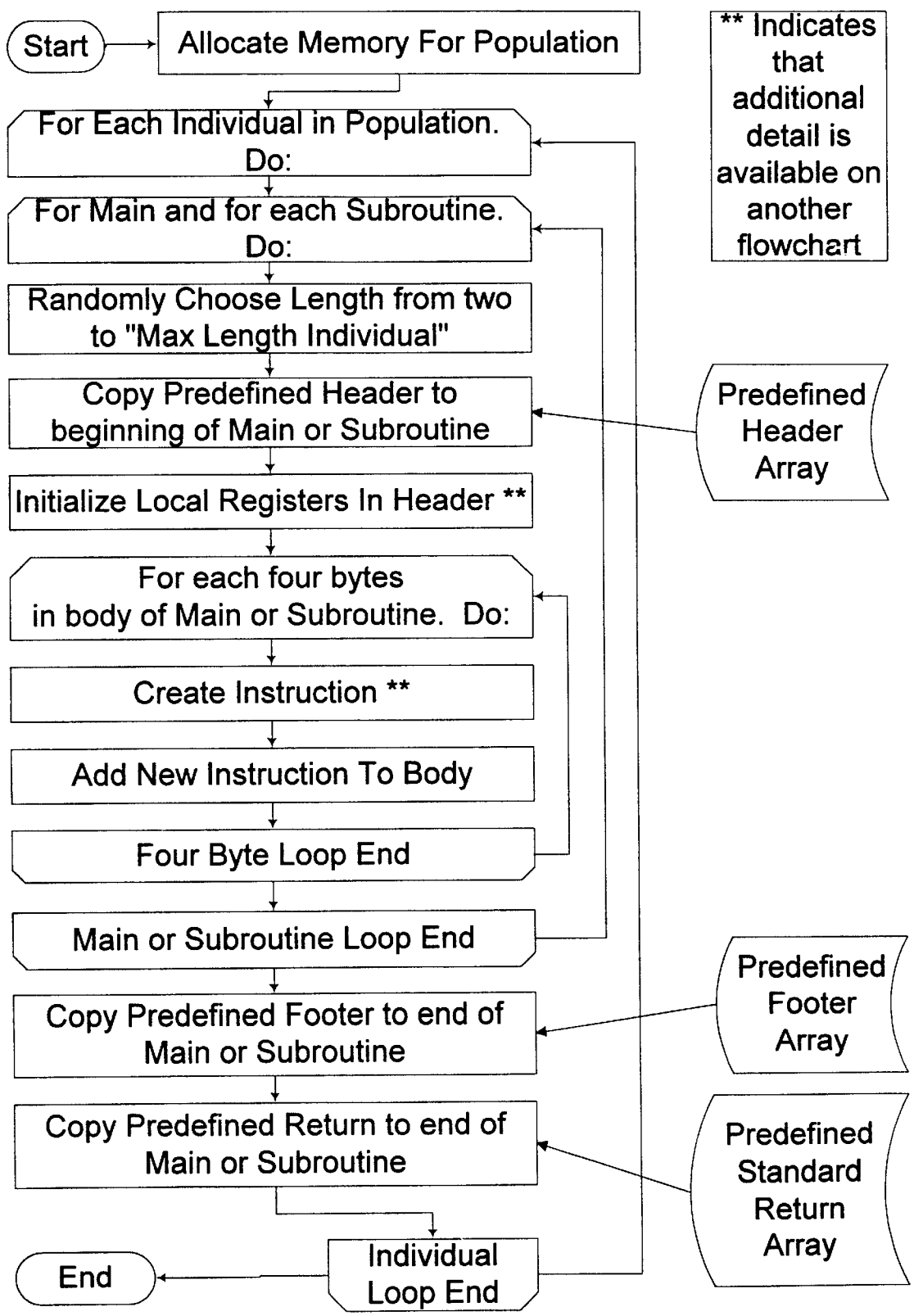

Initialization of Header FIGS. 22*b*, 22*c*

The initialization of the header consists of two parts; one that is fixed, and one that depends on the number of subroutines and external functions.

The fixed part of the header is a NOP instruction and a save instruction.

The NOP instruction is needed for the rare case that this function is called from another function as a subroutine by a control transfer couple as described above. A control transfer couple can arise after an unrestricted crossover where two jumps or call instructions are placed after each other.

Only the first instruction of the first call is executed. If this first instruction is a save instruction, which is normal, then this save would be executed alone and the control will go to the address of the second call which probably will also be a save instruction.

The first of these two save instructions will be unbalanced, not corresponding to a restore, and the registers will be corrupt. If instead a NOP is placed in the header of every instruction, the NOP instruction can be executed safely without affecting the state of the machine.

This point is probably the most special case in the implementation, but it enables the use of unrestricted crossover. When an external function is to be used in the system, it should also have a NOP instruction or another harmless instruction as its first instruction.

The second part of the header initializes the local registers. The local registers are used to store jump addresses of subroutines and external functions. This part of the header contains load instructions that load the appropriate addresses into the local registers. The current addresses are put here in the header during initialization, and then when an individual function is executed, it first executes the header and thus puts the right values in the local registers, which guarantees that the later call and jumps will be. performed to the desired addresses. This part of the header varies in sizes by the number of subroutines and external functions.

Initialization of Footer FIGS. 22b, 22c

The initialization of the footer is simple. The footer consists of two fixed instructions; one NOP instruction followed by a restore instruction. The NOP instruction is used in the last instruction in the body as a control transfer instruction like a jump or a call. In this case, the NOP instruction goes into the delay slot of the jump instruction and is executed during this procedure call. If the NOP instruction was not present, the restore instruction or the return instruction that follows the footer would go into the delay slot which would corrupt the registers. We have previously discussed headers and that discussion applies here also.

Initialization of Return Instruction

A return instruction must follow the footer.

Figure 22D:
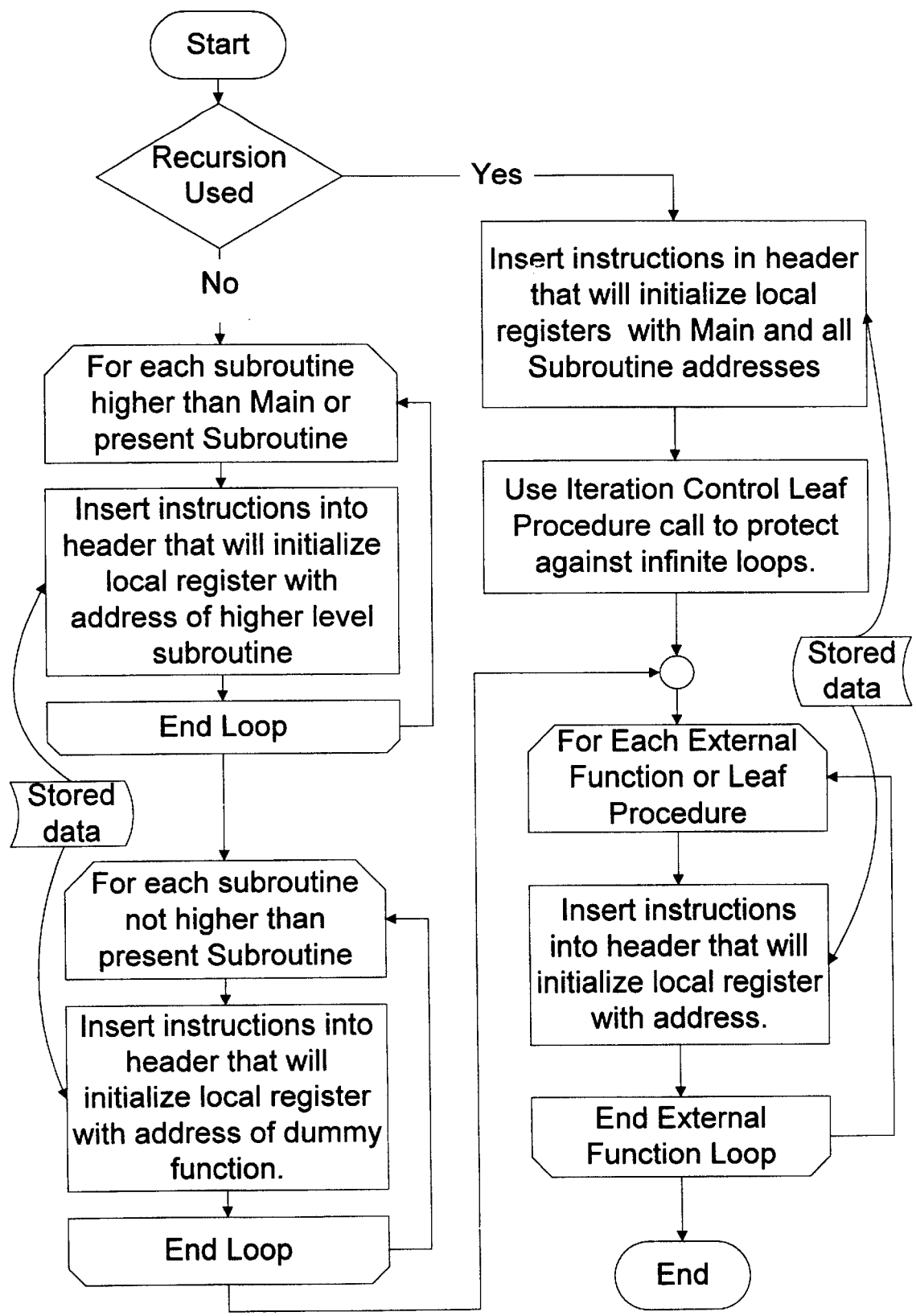

Initialization of Function Body FIGS. 22b, 22c, 22d

The function body is initialized by for each memory cell by randomly selecting an instruction from the set of instructions that the user has put into the function set, including call instructions using local registers. If the picked instruction is an arithmetic instruction, input and output registers are chosen for operands and destination according to the parameters supplied by the user.

We have previously discussed headers, bodies, footers and return instructions, and that discussion applies here also.

With a certain probability, an instruction is given either a constant and register as operands, or two registers as operands. If one of the operands is a constant, this constant is randomly generated to a maximum size defined by its parameter and put into the instruction. The instruction has room for constants within the range of ±4196, within the 32 bits of the instruction.

Subroutines

Subroutines are modularisations within an individual that spontaneously change during evolution. A subroutine has the same structure as a function call, and consists of parameters transferred in the out variables, and a call function.

An individual in this system is a linear array of numbers. This array is divided into a number of pieces of uniform size. The number of pieces corresponds to the maximum number of the subroutine parameter. Every such memory section is a subroutine. A subroutine is organized the same as a main function, with a header, a footer, and a function body.

In the header of a subroutine, the local registers are initialized to contain the addresses of the other subroutines that can be called from this subroutine. When the recursion option of the system is switched off, the local registers are only loaded with the addresses of subroutines higher up in the hierarchy. So if the maximum number of subroutines is set to four, the local registers $L_0$ to $L_3$ in the main function are initialized with the addresses of subroutines 0 to 3, while the local registers $L_0$ and $L_1$ in the first subroutine are initialized with the addresses of subroutines 3 and 4.

Remaining unused local registers are initialized with the value of a dummy function that executes a return when called. With the scheme it is possible to allow unrestricted crossover between individuals and between subfunctions, because the local registers will always be initialized in the header of each subfunction to a correct address. The "call local register" instructions can thus be freely copied in the population.

Recursion

Recursion can be implemented by initializing the local registers not only to the values of subroutines higher up in the hierarchy, but also to the current subroutine itself. Recursion can also be implemented in a small external function, a leaf function. The difference between the two approaches is small, but the main advantage of the later method is that the header can be kept the same regardless of if recursion is used or not, which makes the implementation less complex.

Regardless of which approach is used for recursion, there will always be the problem of infinite chains of instruction calls. The halting problem makes it impossible to know in advance which recursive functions will stop and which will not.

The solution to this is to have a global variable in a memory location that is incremented every time a function is called. If a certain limit is reached, the execution of the individual is abandoned. The code for this checking is placed in the header of each function if the first recursion method is used. If the second method is used, this code is the first part of the recursion leaf procedure.

Leaf Procedures as Program Primitives

Loops are implemented in a way similar to recursion. A leaf procedure is used which performs a test of a variable. Depending on the outcome of the test, a loop branch is either performed or not.

The test can be whether the last performed arithmetic instruction produced zero as a result. This is accomplished by checking the so called zero flag in the processor. Out loop structures can be used simultaneously by checking other integer conditions from the last instruction.

This branch is made with a return instruction, which is a "longjump". instruction jumping to the address of a register with a constant added thereto. This constant can be positive or negative. The normal return instruction jumps back to the address given by the content of register $O_7$ or $I_7$ incremented by eight. These eight bytes cause the return to skip the original call instruction and its delay slot.

When this function is used in a loop, the constant is made negative so that return jumps back to an address before the call to the "loop leaf procedure". The fact that the different call addresses so far are in the execution of the individual, all are stored and accessible to the leaf procedure which makes it possible to construct a large number of control structures. With this method, it is possible to define efficient external leaf procedures that implement ordinary jumps, all kinds of loops, indexed memory, if-then-else structures, and protected functions.

A limit of eight external functions is implied by the number of local registers. This is enough for many applications, but if other domains demand more external functions and subroutines, it is possible to define their addresses as constants added to local register. This technique provides the possibility of using an almost unlimited number of primitives, external function and subroutines.

External Functions

It is possible to incorporate any C-function into the function set. Any C-module can be compiled and linked into the system. There are a number of steps that must be taken in order to make this linking successful.

First the module could be compiled to assembler code by the "-S" flag of the "cc" compiler. A NOP operation is then added before the other instructions in the function. The name of the function is added in a call array in the main C kernel code, and potentially a string name is added to an array for disassembling. After recompilation the system is ready to use the new external function. This approach can be extended and made more automatic with dynamic linking, etc.

C-Language Output

A disassembler can be provided which translates the generated binary machine code into C-language modules. This disassembler feature is provided with the goal that the output from the system should be able to be used directly as a C-module, and it should be possible to compile and link it to another c-program. With this feature the system can be used as a utility to a conventional development environment. The disassembler could also be requested to produce assembler code.

Portability Methods

The main disadvantage with the machine code manipulating technique is that it is machine specific. There are, however, a number of methods to make the system more portable.

The first is to allow for unrestricted crossover. This will make the machine independent part of the code quite small, only defining a number corresponding to instructions, etc. In this way it is possible to write a system that runs on multiple platforms without changes in the code.

An more radical approach is to let the system look for itself in its binary code how it is translated to machine language. Many template functions exist in the C-code with translations to machine code that define how the processor is working. This method is only possible for compiling systems that do simple functions with arithmetic, without jumps, subroutines, etc.

Another approach is to lean more on the hardware interrupts for portability. For example, every time an illegal instruction is encountered by the processor, a hardware interrupt is generated. Using the interrupt features in Unix it is possible to be less restrictive when manipulating binaries knowing that the system will catch some of the erroneous structures.

This increases portability, because faults can sometimes be ignored that arise due to incompatibilities of different architectures. In an extreme example, a machine learning system can be implemented by using mutation and crossover at the bit level where all of the many illegal situation are caught by the processor memory management hardware or file system protection mechanisms.

The ideal portability situation would be to have a special language, present on different platforms, for this kind of run-time binary manipulation.

Using Tree Representation

In the preferred implementation of the present invention, a binary string approach is used for representation of individuals. Binary strings are the common representation form of genetic algorithms while tree representations are used in conventional genetic programming.

There may be applications where tree representation and crossover at a tree level is interesting to study and consequently it would be interesting to have the individual in a tree form. This can be accomplished in several ways.

One way is to use two different NOP instruction as parenthesis in the code. The crossover operator then scans through the code, matches these parenthesis, and performs tree crossover accordingly. This could potentially make the crossover operator less efficient for large individual sizes.

Another way is to break up the individual into segments in the memory, where part of the tree is presented as jump statements to subtrees. This would still make it possible to execute the individual directly. The crossover operator here must also scan through the individual, but it only has to move smaller blocks of code that could be allocated dynamically.

The third way is to let every individual have an extra array associated with it, that carries information about where subtrees start and stop. This array will not be involved in the execution of the individual, and it will only be used by the crossover operator to locate subtrees.

Applications

The present invention can be applied to any problem in which a computer algorithm manipulates a structure that later should be interpreted as instructions. Examples of these kind of such applications include the following.

Genetic algorithms and genetic programming

Cellular automata

Artificial life systems like Tierra

Rule induction systems

Decision trees

LISP or PROLOG interpreters

The invention is especially suited for applications within areas that require:

High execution speed

Real time learning

Large memory structures

Low end architectures, e.g. consumer electronics

Well defined memory behavior

EXAMPLE

Figure 19:
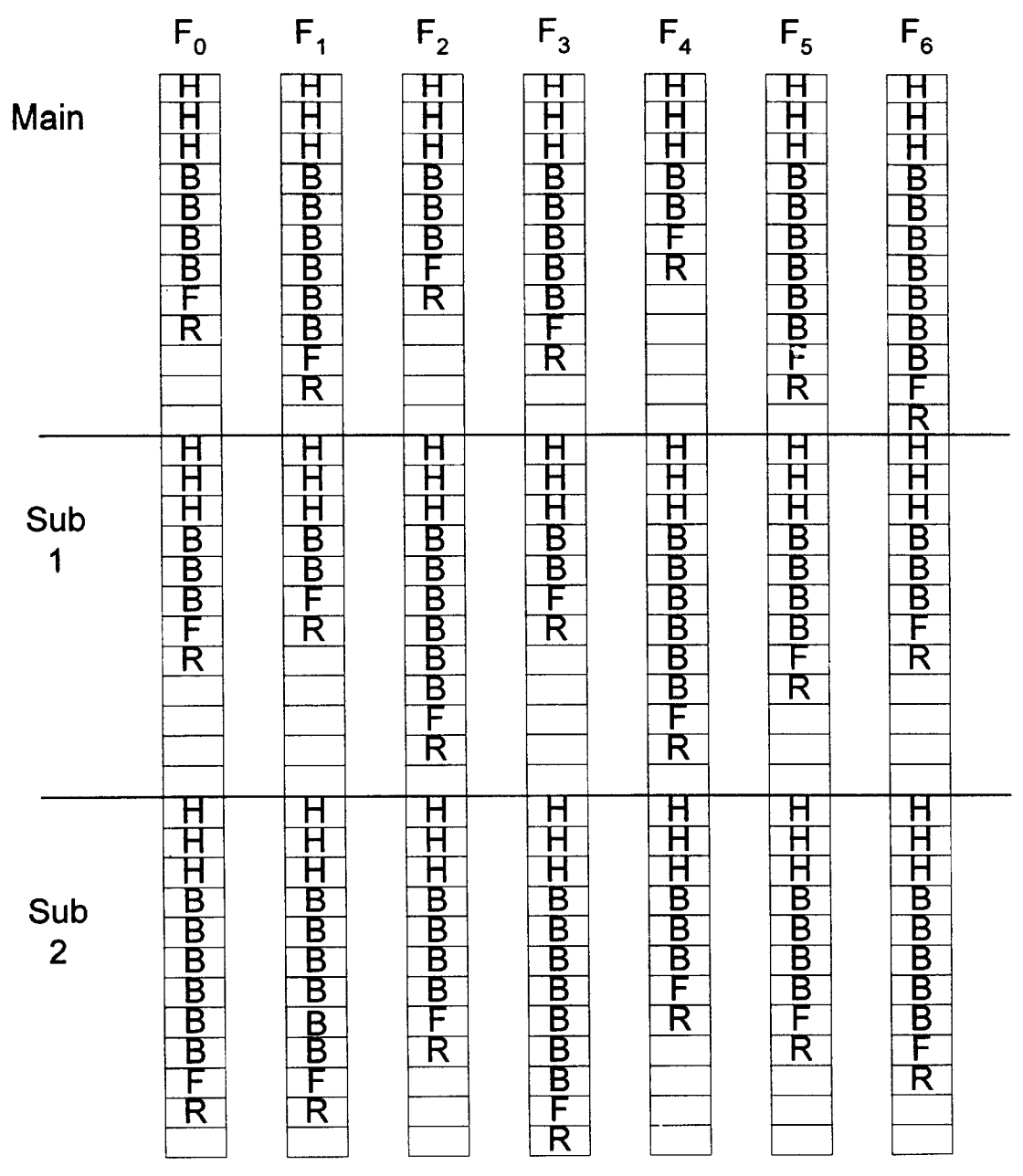
Figure 20:
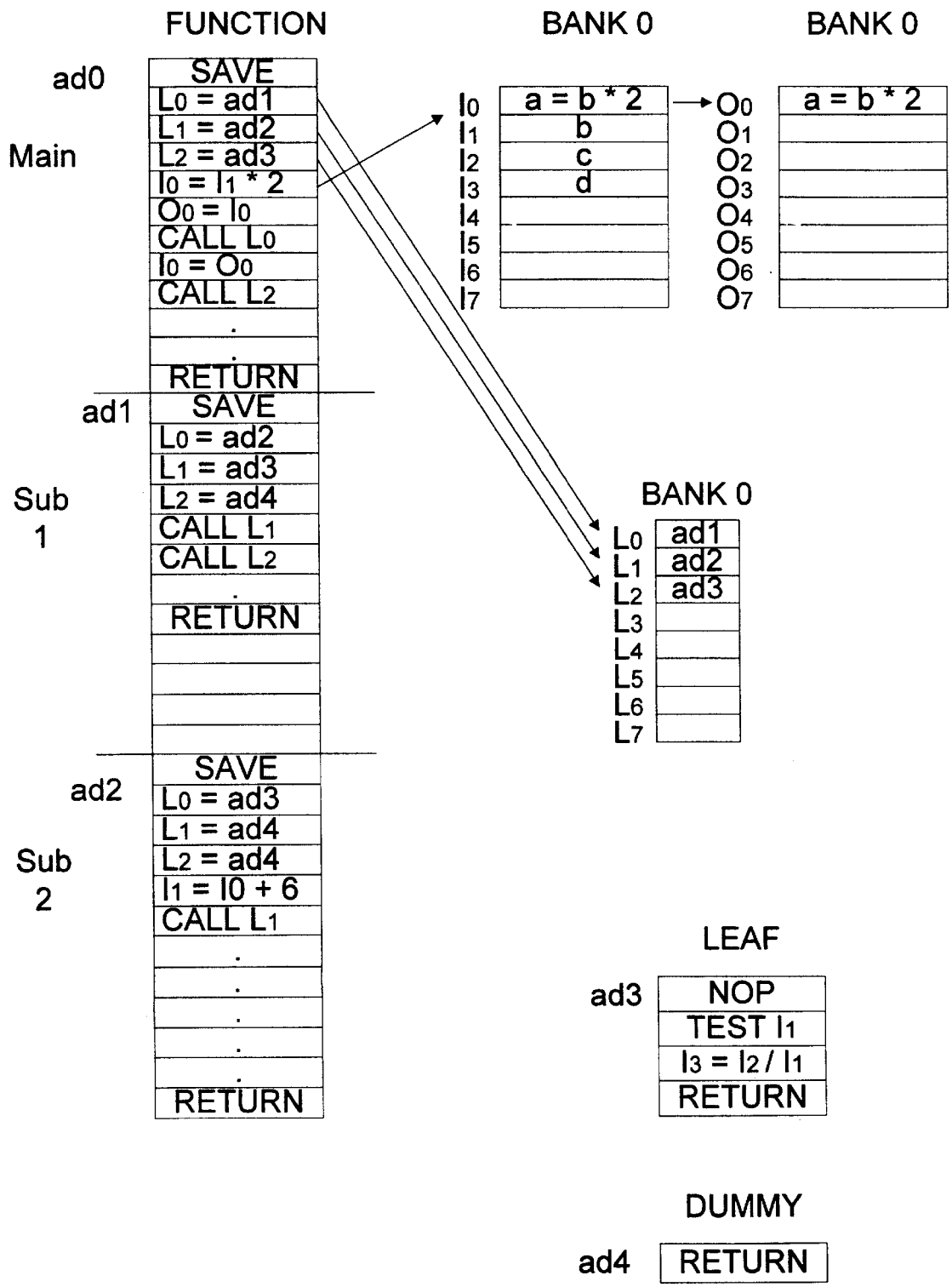
Figure 21:
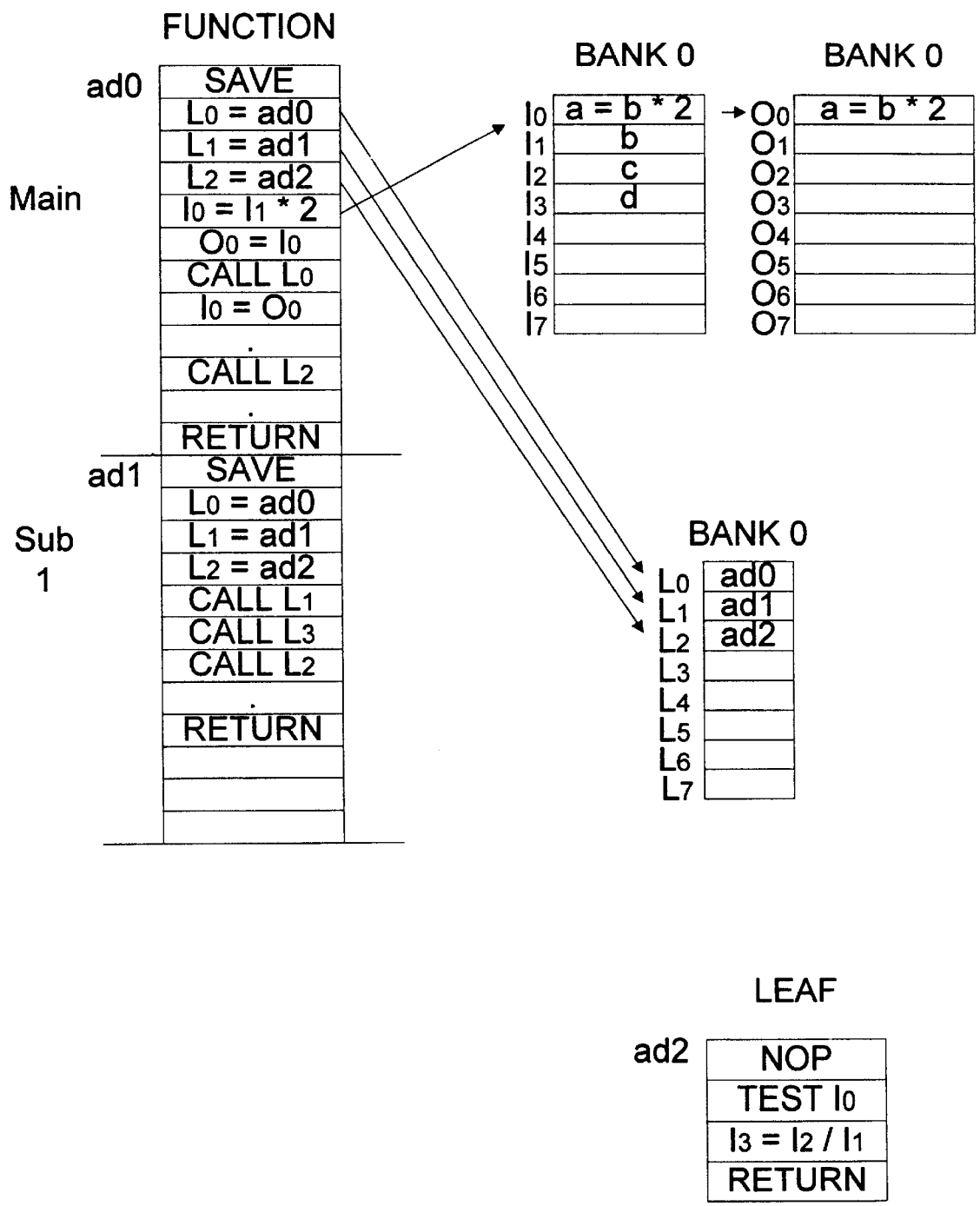

FIGS. 19 to 21 illustrate a function structure and associated registers in accordance with the Turing complete machine learning system of the present invention.

FIG. 19 illustrates an array of functions $F_0$ to $F_6$, each of which consists of a main function MAIN and two subroutines SUB1 and SUB2. Each function has a maximum, but variable length. Portions of the functions occupied by the header are indicated as H, the instruction body as B, the footer as F, and the return instruction as R.

It will be noted that the main functions and the subroutines SUB1 and SUB2 also have variable, but maximum lengths. Any memory not occupied by an operative portion of a function is unused.

FIG. 20 illustrates a function FUNCTION which consists of a main function MAIN, and two subroutines SUB1 and SUB2. Further illustrated are the input registers, output registers and local registers of BANK0 which is used by the main function, a leaf function, and a dummy function. The latter functions are stored in the memory 12.

The starting addresses of the functions MAIN, SUB1 and SUB2 are designated as ad0, ad1, and ad2, whereas the starting addresses of the functions LEAF and DUMMY are designated as ad3 and ad4 respectively. The instructions which can be placed in the functions MAIN, SUB1 AND SUB2 and which are subject to alteration for the purpose of machine learning are limited to those which branch to the addresses ad0 to ad4.

The function LEAF performs the operation of protected division, where a variable "c" stored in the input register $I_2$ is to be divided by a variable "b" stored in the input register $I_1$. More specifically, an instruction "TEST $I_0$" tests whether or not the variable "b" is zero. If so, the result of the division would be an infinitely large number, which constitutes an error for the system.

If the test instruction detects that the value of $I_1$ is zero, the next instruction is skipped and the next instruction, which is, a RETURN instruction, is executed, returning control the calling function.

It the test instruction detects that the value of $I_1$ is not zero, the division operation c/b is performed, the result stored in the input register $I_3$ (as a variable d), and control returned to the calling function.

The function DUMMY consists of a return instruction that merely returns control to the calling function.

The headers of the functions MAIN, SUB1 AND SUB2 each include a SAVE instruction, and three instructions that initialize the local registers with the addresses of functions that can be called by the particular function. The SAVE instruction causes the contents of the output registers of a calling function to be copied into the input registers of the called function as described above.

In the function MAIN, these initialization instructions cause the addresses ad1, ad2 and ad3 to be stored in the local registers $L_0$, $L_1$, and $L_3$ respectively.

In the normal hierarchial arrangement of the invention, functions are only allowed to call functions which are lower on the hierarchy, and leaf functions. Thus, the function SUB1 is allowed to call the function SUB2, but not the function MAIN. This is accomplished by storing ad2 for the function SUB2 in $L_0$, ad3 for the function LEAF in $L_1$, and ad4 for the function DUMMY in $L_2$.

The function SUB2 is only allowed to call leaf functions. Therefore, the address ad3 for the function LEAF is stored, in $L_0$, and the address ad4 for the function DUMMY is stored in $L_1$ and $L_2$.

FIG. 20 further illustrates how an arithmetic instruction is performed by executing a function, and how a variable is passed from a calling function to a called function.

More specifically, execution of the instruction $I_0=I_1*2$ by the function MAIN causes the variable "d" in the register $I_1$ to be multiplied by 2, and the result stored in the register $I_0$ as indicated by an arrow. The contents of the register $I_0$ are indicated as $a=b*2$.

To pass the value of "a" (in $I_0$) to a called function, an instruction $O_0=I_0$. This causes the contents of the input register $I_0$ to be copied into the output register $O_0$. The next instruction, CALL $L_0$, causes control to be transferred to the function having the starting address ad1, which is the function SUB1. The call instruction causes the contents of the output registers of the function MAIN to be copied into the input registers of the function SUB1, and thereby pass the value of the variable "a" which was stored in $O_0$ of the function MAIN to the input register $I_0$ of the function SUB1.

Upon return from the call to SUB1, the contents of the input registers of the function SUB1 are copied to the output registers of the function MAIN. The next instruction in the function MAIN is $I_0=O_0$. This causes the contents of $O_0$ to be copied to $I_0$, and thereby pass the variable that was generated by the function SUB1 and stored in $I_0$ thereof to the function MAIN.

FIG. 21 is similar to FIG. 20, but illustrates an arrangement including one subroutine SUB1 and one leaf function, with the subroutine SUB1 being allowed to perform recursion. In this example, the function SUB1 can call the function MAIN, itself, and the function LEAF.

This is accomplished by storing ado (the address of the function MAIN) in $L_0$, storing ad1 (the address of itself) in $L_1$, and ad2 (the address of the function LEAF) in $L_2$.

A detailed flowchart of the Turing complete machine learning system is illustrated as a flowchart in FIGS. 22a to 22k.

FIG. 22a is main diagram of the system.

FIG. 22b illustrates the details of a block SETUP in FIG. 22a.

FIG. 22c illustrates the details of a block INITIALIZATION in FIG. 22a.

FIG. 22d illustrates the details of a block INITIALIZE LOCAL REGISTERS IN HEADER in FIG. 22c.

Figure 22E:
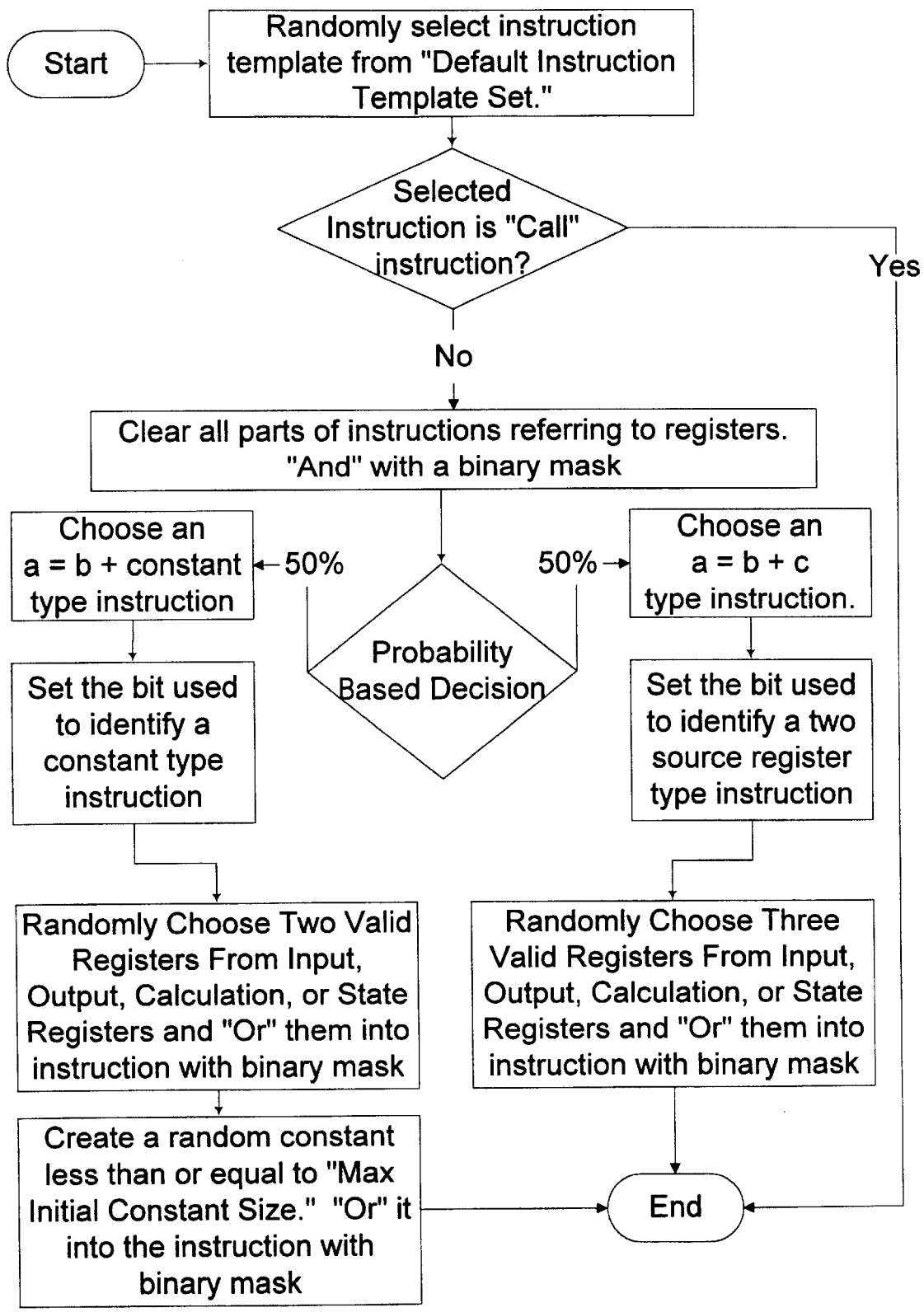
Figure 22F:
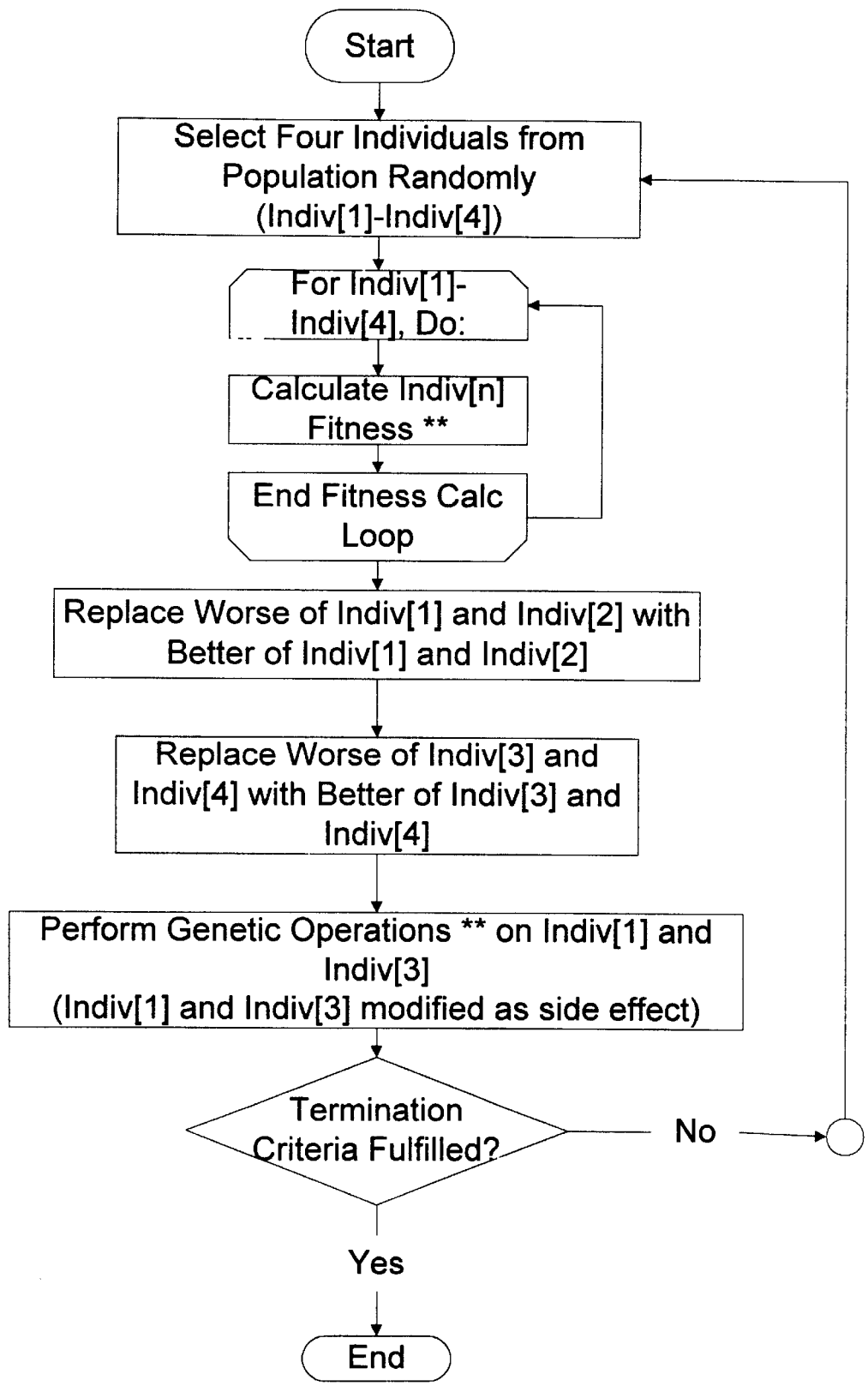
Figure 22G:
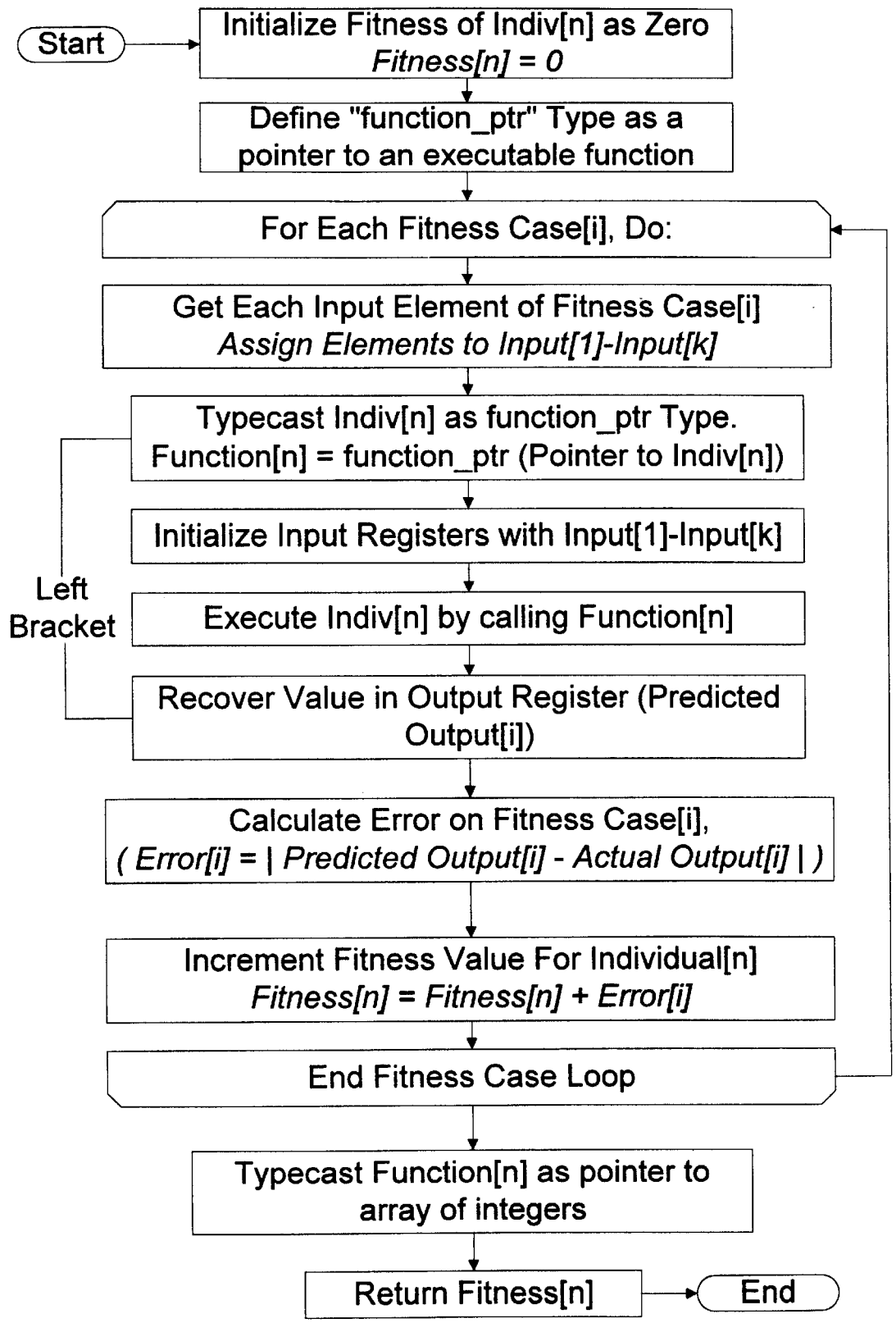
Figure 22H:
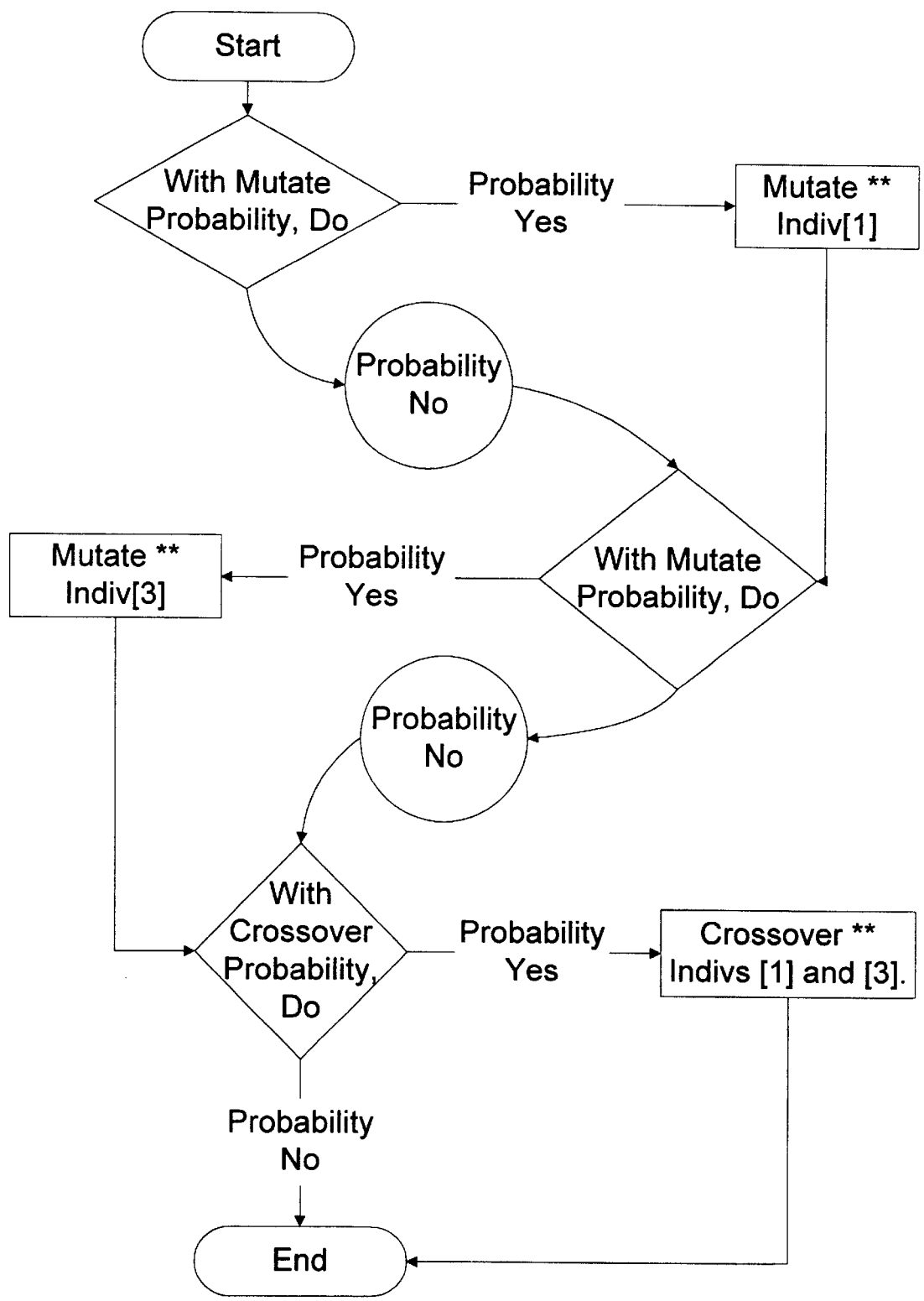
Figure 22I:
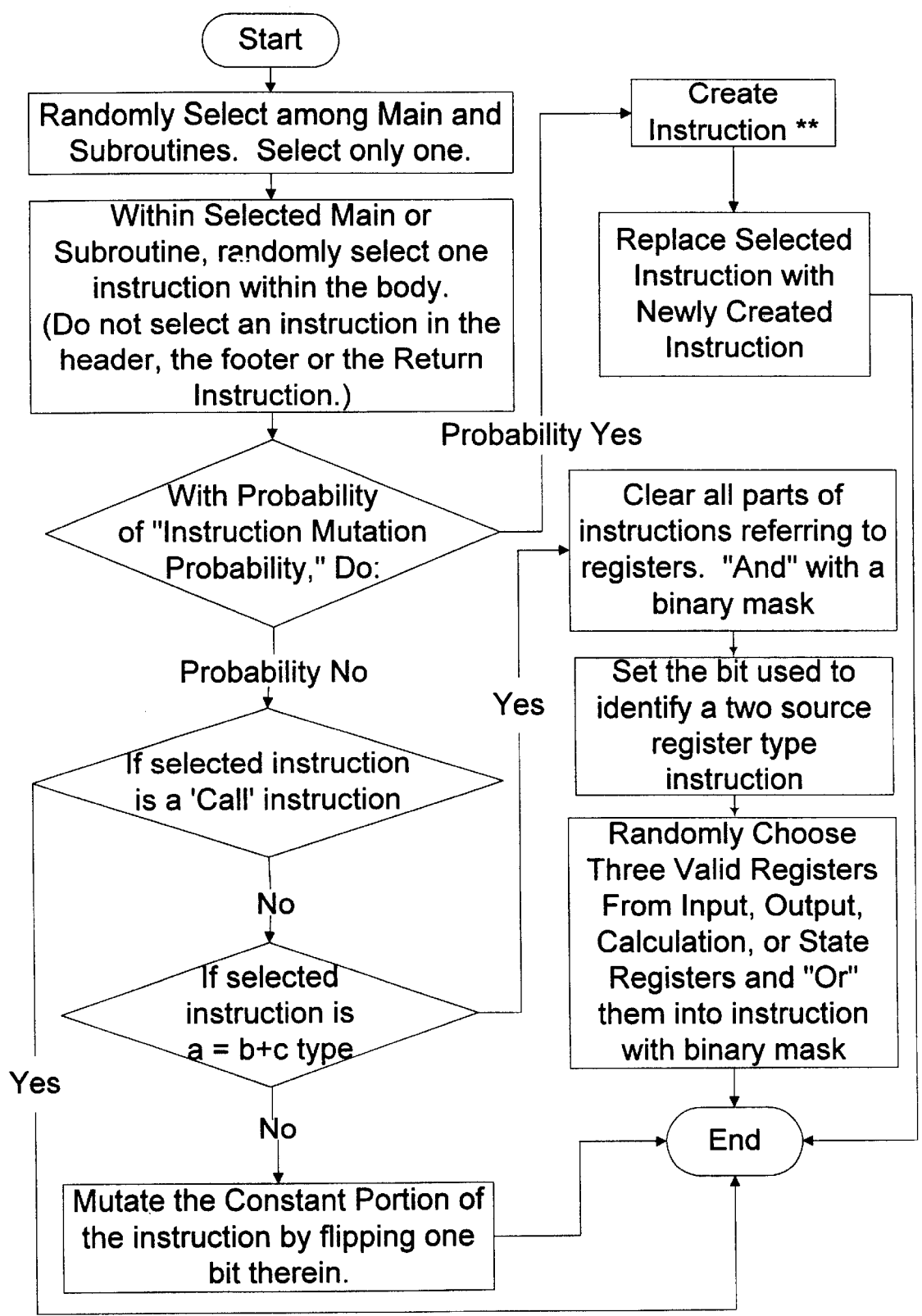

FIG. 22e illustrates the details of a block CREATE INSTRUCTION in FIGS. 22c and 22i;

FIG. 22f illustrates the details of a block MAIN CGPS LOOP in FIG. 22a.

FIG. 22g illustrates the details of a block CALCULATE INDIV[N] FITNESS in FIG. 22f. The steps indicated by a left bracket are performed by a C-instruction "Predicted_Output [i]=((function_ptr) Indiv[n]0(input[1] . . . Input[k])".

FIG. 22h illustrates the details of a block PERFORM GENETIC OPERATIONS in FIG. 22f.

FIG. 22i illustrates the details of a blocks MUTATE INDIV[1] and MUTATE INDIV[3] in FIG. 22h.

Figure 22J:
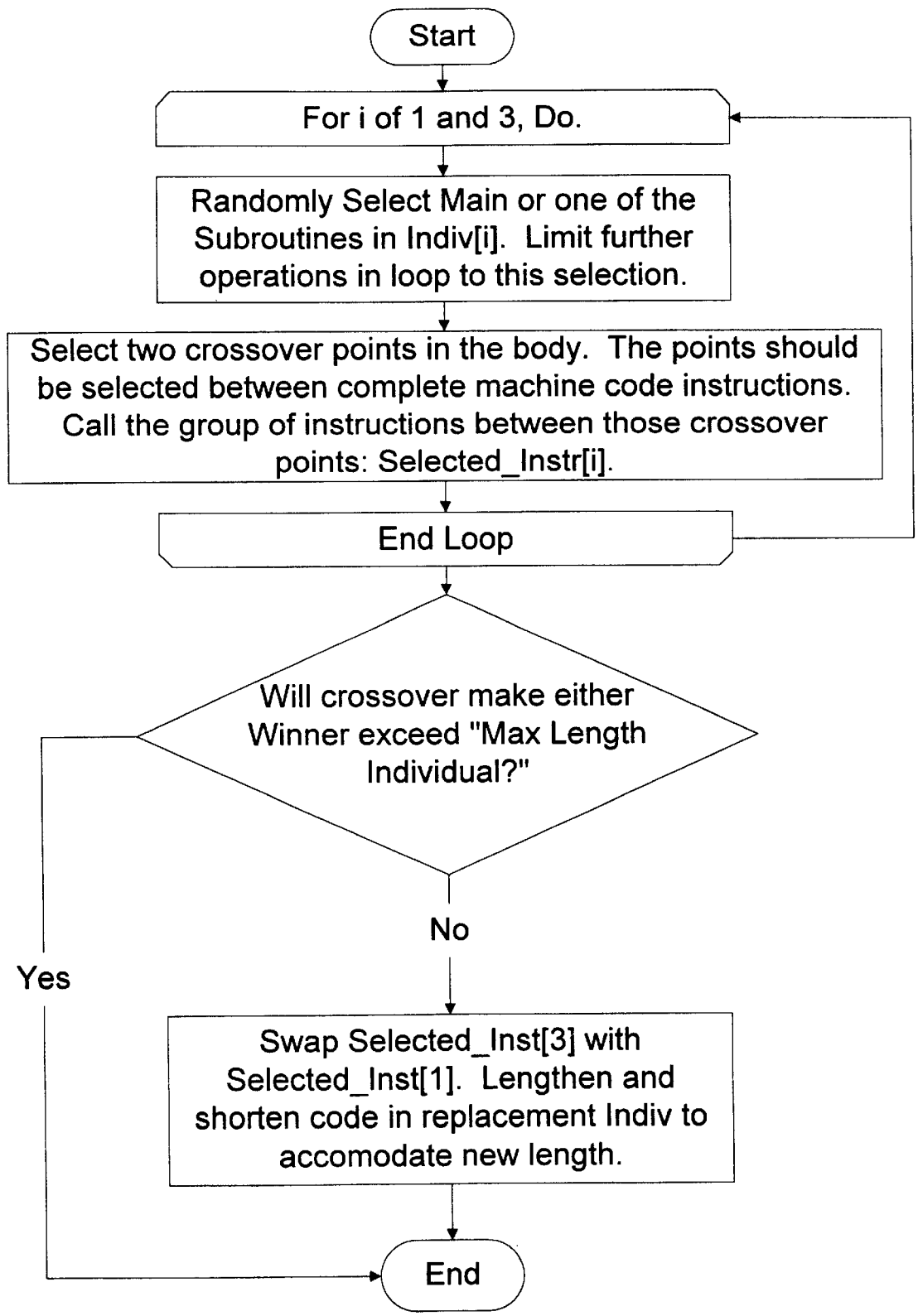

FIG. 22j illustrates the details of a block CROSSOVER INDIVS [1] and [3] in FIG. 22h.

Figure 22K:
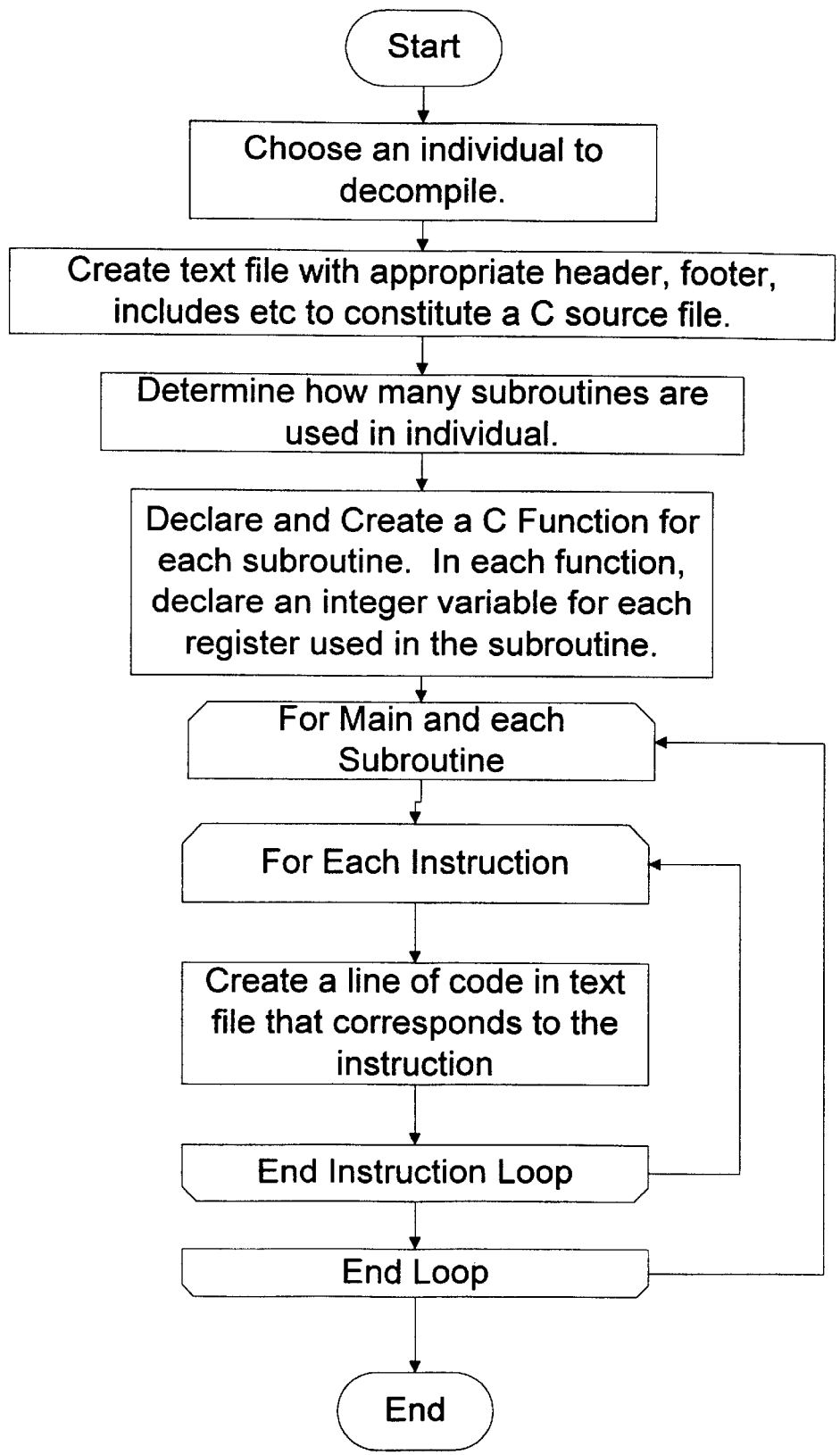

FIG. 22k illustrates the details of a block DECOMPILE CHOSEN SOLUTION in FIG. 22a.

Explicitly Defined Introns

Implicitly defined introns are redundant data structures which are created by genetic operations, especially crossover. Examples of such introns include instructions such as a=a+0, b=b*1, etc., in which the output variable is the same as the input variable.

Introns are found in biological genetic structures on which the present genetic machine learning methodology is modelled. Analogs to these biological introns are found in variable length genetic algorithms as described in the previous paragraph. It is believed that these introns reduce the level of destructive crossover operations by providing additional crossover points at which crossover will not produce undesirable results.

The present invention improves on this natural mechanism by providing Explicitly Defined Introns (EDIs) which provide a similar function as the implicitly defined introns. The present EDIs, rather than being generated by the genetic operations themselves, are explicitly defined or created, and manipulated by the high level program that performs the genetic operations on the data structures. The principal advantage of EDIs are faster execution, smaller individuals and improved generalization and fitness.

More specifically, the EDIs are structured as an array of integers that are associated with individuals (machine code functions) in the population. There is an intron (element) in the array for each possible crossover point in the individuals.

Crossover points are limited to the points between instructions in the functions. Each element in the EDI array holds a value between 0 and, for example, 65,000.

Initialization of the EDI Array

There are two basic methods for initializing the EDI array.

1. Pick a range within 0–65,000. Initialize the EDI array values uniformly in that range. The ranges initially used were 0 to 100 through 0 to 1,000. The reason for this initialization technique were primarily for research purposes.

2. The alternative and preferred method is to pick an average value in the range 0 to 65,000. So for example, the average EDI value could be 32,500. Then initialize the EDI's in the array in a gaussian distribution around that average. This is the preferred implementation for real world applications.

Crossover Using the EDI Array

1. Perturb the EDI vector by randomly mutating each EDI element. The use of techniques such as evolutionary programming or evolutionary strategies for this step would be preferred. In any event, each element in the EDI array or vector would be changed so that the likelihood of large changes was less than the likelihood of small changes.

2. To pick the crossover point(s) in an individual pick a point randomly but weighted so that the probability that it is picked is proportional to the EDI value for that crossover point.

3. When two individuals are crossed over, so too are their EDI arrays.

4. At the crossover point, each parent had an EDI value. EDI[1] and EDI[2] for the two parents. Those EDI values are distributed at the crossover points in the two children by summing EDI[1] and EDI[2] and then randomly distributing that value between the EDI values at the crossover point in the two children.

The following articles were physically included in this application as originally filed, and constitute part of the original disclosure thereof. Although the articles themselves have been deleted by amendment during the pendency of the application, they are incorporated herein by reference in their entirety.

1. EXPLICITLY DEFINED INTRONS AND DESTRUCTIVE CROSSOVER IN GENETIC PROGRAMMING, by Peter Nordin et al, Advances in Genetic Programming II, MIT Press, Cambridge, Mass., 1995.

2. THE EFFECT OF EXTENSIVE USE OF THE MUTATION OPERATOR ON GENERALIZATION IN GENETIC PROGRAMMING USING SPARSE DATA SETS, by Wolfgang Banzhaf et al, Department of Computer Science, Dortmund University, Dortmund, Germany, 1996.

3. BENCHMARKING THE GENERALIZATION CAPABILITIES OF A COMPILING GENETIC PROGRAMMING SYSTEM USING SPARSE DATA SETS, by Frank D. Francone et al, Department of Computer Science, Dortmund University, Dortmund, Germany, 1996.

4. REAL TIME EVOLUTION OF BEHAVIOR AND A WORLD MODEL FOR A MINIATURE ROBOT USING GENETIC PROGRAMMING, by Peter Nordin et al, Department of Computer Science, Dortmund University, Dortmund, Germany, Nov. 1995.

In summary, the present invention overcomes the drawbacks of the prior art by eliminating all compiling, interpreting or other steps that are required to convert a high level programming language instruction such as a LISP S-expression into machine code prior to execution or that are required to access Learned Elements or run-time data in data structures. The system also improves on the prior by providing a built-in defense against destructive crossover and a built-in way for a genetic learning system to evolve useful building blocks during evolution.

This makes possible the practical solutions to problems which could not heretofore be solved due to excessive computation time. For example, a solution to a difficult problem can be produced by the present system in hours, whereas a comparable solution might take years using conventional techniques.

Various modifications will become possible for those skilled in the art after receiving the teachings of the present disclosure without departing from the scope thereof.

In particular, and without limiting the foregoing, any manner of evolving the liklihood of crossover or mutation occuring at a particular location in a genetic or evolutionary learning process is within the spirit and scope of this invention.

We claim:

1. A computer implemented method, comprising the steps of:
   (a) providing a computer model which defines a relationship between inputs, outputs, and corresponding fitnesses;
   (b) accessing the computer model to determine, in response to an applied input, an output for which a corresponding fitness meets a predetermined criterion; and
   (c) applying the output determined by the computing unit to control a real-time process.

2. A method as in claim 1, in which step (a) comprises configuring the computer model such that at least one applied input represents a parameter relating to the real-time process.

3. A method as in claim 1, in which step (a) comprises configuring the computer model to define fitness as including a "pain" component and a "pleasure" component.

4. A method as in claim 1, further comprising the steps of:
   (d) providing a learning unit; and
   (e) controlling the learning unit to derive the computer model using a learning algorithm.

5. A method as in claim 4, in which step (d) comprises configuring the learning unit to derive the computer model using regression.

6. A method as in claim 4, in which step (d) comprises configuring the learning unit to derive the computer model using regression.

7. A method as in claim 4, in which step (d) comprises configuring the learning unit to derive the computer model using a matching learning system.

8. A method as in claim 4, in which step (d) comprises configuring the learning unit to derive the computer model using a compiling genetic programming system.

9. A method as in claim 4, in which step (d) comprises configuring the learning unit to derive the computer model using a fitting algorithm applied to training data.

10. A method as in claim 4, in which steps (b) and (d) in combination comprise controlling the computing unit and the learning unit operate independently and interact intermittently.

11. A method as in claim 4, which step (e) comprises controlling the learning unit to derive the computer model by altering a single entity.

12. A method as in claim 4, in which step (e) comprises controlling the learning unit to derive the computer model by altering a plurality of a population of entities.

13. A method as in claim 4, in which step (e) comprises controlling the learning unit to derive different computer models at different times.

14. A method as in claim 4, in which:
   step (d) comprises configuring the learning unit to store a plurality of vectors, each of which includes an input, an output, and a corresponding fitness;
   step (d) further comprises configuring the learning unit to comprise a derivation unit; and
   step (e) comprises controlling the derivation unit to derive the computer model using the vectors as a training set.

15. A method as in claim 14, in which:
   the fitness in at least one of the vectors is an empirical fitness; and
   the fitness defined by computer model is a predicted fitness.

16. A method as in claim 14, in which step (d) comprises configuring the learning unit to prevent at least one of the vectors stored in memory from being removed.

17. A method as in claim 14, in which step (d) comprises configuring the learning unit to temporarily prevent at least one of the vectors stored in memory from being removed according to a predetermined criterion.

18. A method as in claim 14, in which step (d) comprises configuring the learning unit to make at least one of the vectors stored in memory more difficult to remove than at least one other vector stored in memory.

19. A method as in claim 1, further comprising the steps of:
 (d) providing an autonomous agent; and
 (e) applying said output to control the autonomous agent.

20. A method as in claim 19, in which said fitness includes a "pain" component and a "pleasure" component.

21. A method as in claim 20, in which:
 the "pain" component increases as the behavior of the autonomous agent becomes less desirable; and
 the "pleasure" component increases as the behavior of the autonomous agent becomes more desirable.

22. A method as in claim 19, in which step (d) comprises configuring the autonomous agent to comprise a robot.

* * * * *